United States Patent
Conti et al.

(10) Patent No.: US 9,693,649 B2
(45) Date of Patent: Jul. 4, 2017

(54) ELECTRIC STIRRING TOWER WITH LID

(71) Applicant: Whirlpool Corporation, Benton Harbor, MI (US)

(72) Inventors: Michael P. Conti, St. Joseph, MI (US); Christopher A. Gregory, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 474 days.

(21) Appl. No.: 14/070,001

(22) Filed: Nov. 1, 2013

(65) Prior Publication Data

US 2014/0245903 A1    Sep. 4, 2014

Related U.S. Application Data

(63) Continuation-in-part of application No. 13/783,193, filed on Mar. 1, 2013, now Pat. No. 9,241,595.

(51) Int. Cl.
| | |
|---|---|
| A47J 43/044 | (2006.01) |
| A47J 27/00 | (2006.01) |
| A47J 36/16 | (2006.01) |
| A47J 43/07 | (2006.01) |

(52) U.S. Cl.
CPC ........... *A47J 27/002* (2013.01); *A47J 27/004* (2013.01); *A47J 36/165* (2013.01); *A47J 43/044* (2013.01); *A47J 43/0705* (2013.01)

(58) Field of Classification Search
CPC ...... A47J 27/002; A47J 27/004; A47J 36/165; A47J 43/044; A47J 43/0705
USPC ........ 366/197–207, 144–149, 347, 244–252, 366/309, 312, 313, 297–301; 99/348
See application file for complete search history.

(56) References Cited

U.S. PATENT DOCUMENTS

| | | | |
|---|---|---|---|
| 2,305,288 | A | 12/1942 | Cavalleri |
| 2,905,452 | A | 9/1959 | Appleton |
| 3,635,147 | A | 1/1972 | Lee |

(Continued)

FOREIGN PATENT DOCUMENTS

| | | |
|---|---|---|
| DE | 202010012730 U1 | 12/2010 |
| EP | 1430824 A1 | 6/2004 |

(Continued)

OTHER PUBLICATIONS

European Patent Application No. 14157100.0 filed Feb. 27, 2014, Applicant: Whirlpool Corporation, European Search Report re: same, mail date Jul. 29, 2014.

(Continued)

*Primary Examiner* — David Angwin
*Assistant Examiner* — Frederick Calvetti
(74) *Attorney, Agent, or Firm* — Price Heneveld LLP

(57) ABSTRACT

A cooking appliance kit includes a housing having a plurality of walls defining a heating cavity. A cooking vessel is configured to be inserted into the heating cavity. The cooking vessel includes a first rounded end, a second rounded end, and an intermediate necked portion that defines first and second wells that at least partially intersect. First and second distinct heater plates are disposed in the first and second wells, respectively. First and second drive arms are removable coupled to the housing in an operable communication with the drive system. The first drive arm includes a flipping wand and the second drive arm includes a stirring wand.

20 Claims, 52 Drawing Sheets

(56) References Cited

U.S. PATENT DOCUMENTS

| | | | |
|---|---|---|---|
| 3,960,369 A | 6/1976 | Sommer | |
| 4,429,624 A * | 2/1984 | Linn | A47J 36/165 366/245 |
| 4,649,810 A | 3/1987 | Wong | |
| 4,693,610 A | 9/1987 | Weiss | |
| 4,817,512 A | 4/1989 | Vangen | |
| 4,820,054 A | 4/1989 | Wong | |
| 4,854,717 A | 8/1989 | Crane et al. | |
| 4,878,627 A | 11/1989 | Otto | |
| 4,942,807 A | 7/1990 | Wong | |
| 4,959,517 A | 9/1990 | Jump et al. | |
| 5,022,315 A | 6/1991 | Bertram et al. | |
| 5,816,136 A | 10/1998 | Stallings | |
| 5,823,675 A | 10/1998 | Myerly | |
| 5,839,356 A * | 11/1998 | Dornbush | A21B 7/005 99/331 |
| 6,035,766 A | 3/2000 | Schirmer | |
| 6,188,046 B1 | 2/2001 | Barrow | |
| 6,259,068 B1 | 7/2001 | Barrow | |
| 6,321,641 B1 | 11/2001 | Wang | |
| 6,373,031 B1 | 4/2002 | Barrow | |
| 6,805,312 B2 | 10/2004 | Capp | |
| 7,314,308 B2 | 1/2008 | Fallowes et al. | |
| 7,461,589 B2 | 12/2008 | Sinton | |
| 7,993,694 B2 | 8/2011 | Goderiaux et al. | |
| 8,210,737 B2 | 7/2012 | Wong | |
| 8,438,971 B1 | 5/2013 | Thurley | |
| 2001/0032856 A1 | 10/2001 | Casey | |
| 2004/0145965 A1 * | 7/2004 | Chan | B01F 7/00058 366/197 |
| 2005/0058018 A1 * | 3/2005 | Hooper | A47J 43/044 366/197 |
| 2006/0044935 A1 * | 3/2006 | Benelli | A47J 27/004 366/145 |
| 2006/0254429 A1 * | 11/2006 | Sinton | A47J 27/004 99/348 |
| 2008/0213447 A1 * | 9/2008 | Payen | A47J 37/0641 426/438 |
| 2008/0271609 A1 * | 11/2008 | Pahl | A47J 36/165 99/348 |
| 2009/0120301 A1 | 5/2009 | Severnak | |
| 2010/0028514 A1 * | 2/2010 | Goderiaux | A47J 36/165 426/438 |
| 2011/0017750 A1 | 1/2011 | Fortkamp | |
| 2011/0063941 A1 * | 3/2011 | Seidler | A47J 36/06 366/145 |
| 2011/0185917 A1 * | 8/2011 | Goderiaux | A47J 36/165 99/348 |
| 2011/0214574 A1 | 9/2011 | Chang | |
| 2013/0074700 A1 | 3/2013 | Cheung | |
| 2015/0000534 A1 * | 1/2015 | Hager | A47J 36/165 99/328 |
| 2015/0201787 A1 * | 7/2015 | Holzbauer | A47J 43/046 99/348 |
| 2015/0238042 A1 * | 8/2015 | Tonelli | A47J 31/4489 99/323.3 |

FOREIGN PATENT DOCUMENTS

| | | |
|---|---|---|
| EP | 2508110 A1 | 10/2012 |
| FR | 2939298 A1 | 6/2010 |
| GB | 2459309 A | 10/2009 |
| WO | 2014033592 A1 | 3/2014 |

OTHER PUBLICATIONS

European Patent Application No. 14157093.7 filed Feb. 27, 2014, Applicant: Whirlpool Corporation, European Search re: same, mail date Jul. 29, 2014.

European Patent Application No. 14157097.8 filed Feb. 27, 2014, Applicant: Whirlpool Corporation, European Search re: same, mail date Jul. 9, 2014.

* cited by examiner

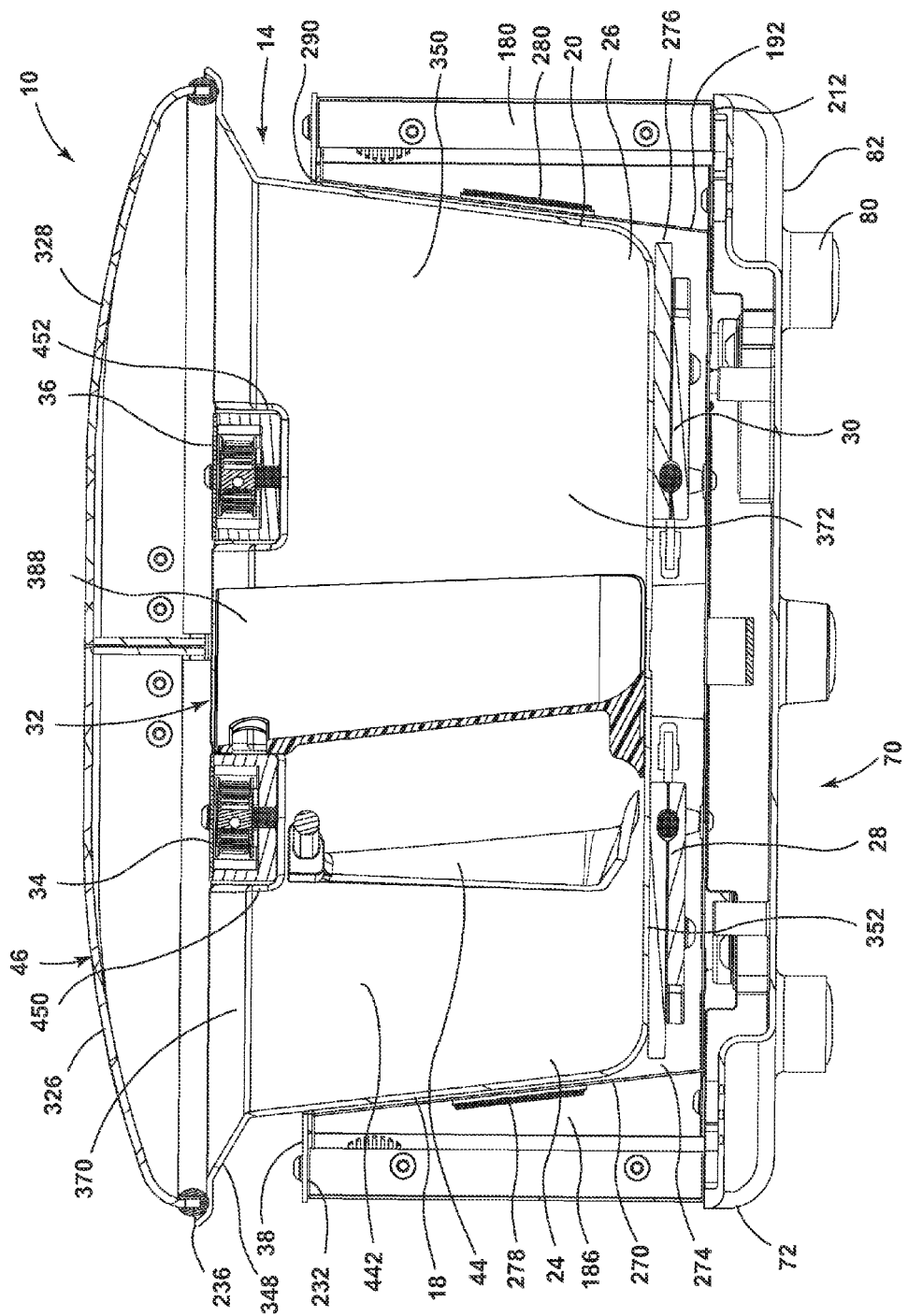

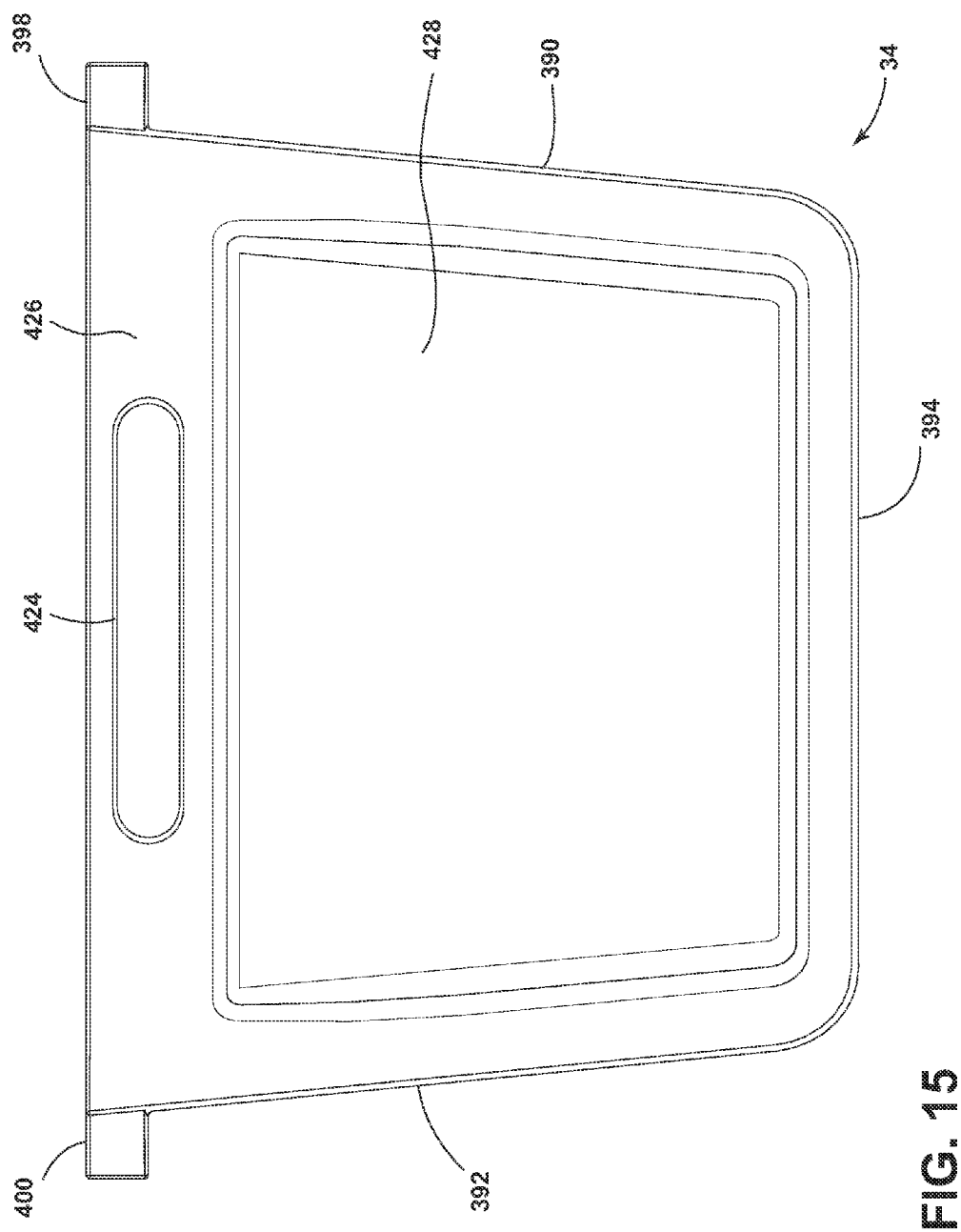

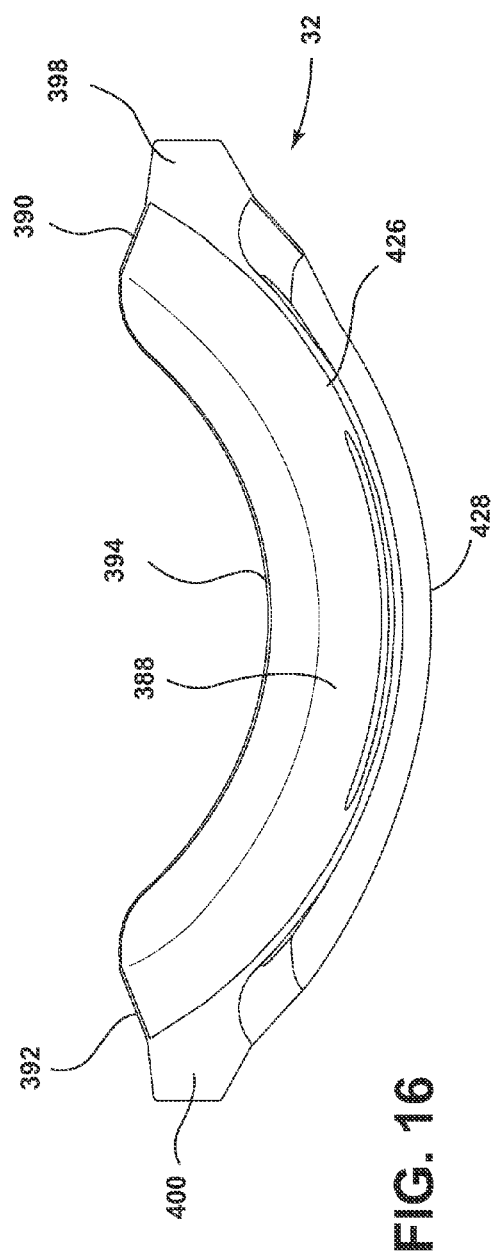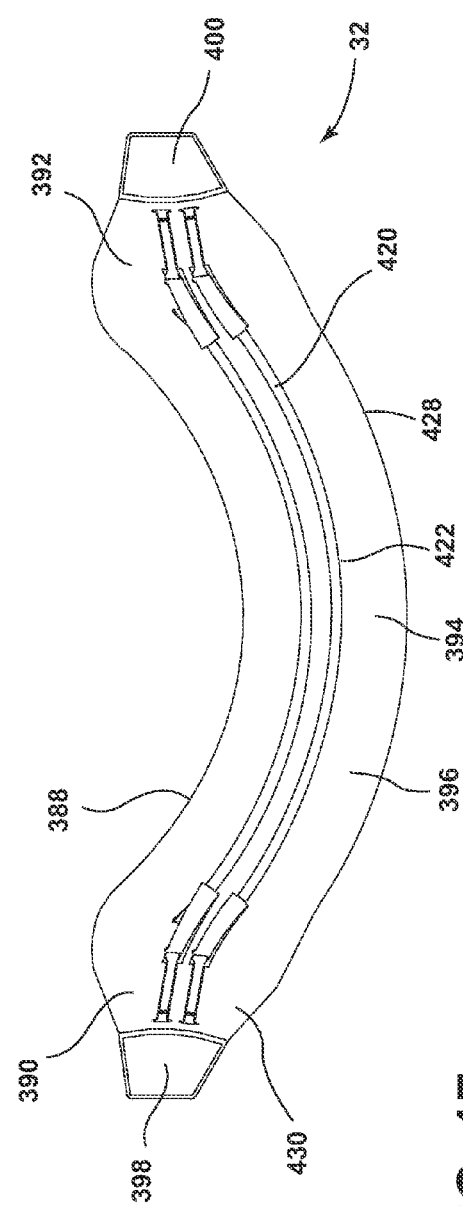

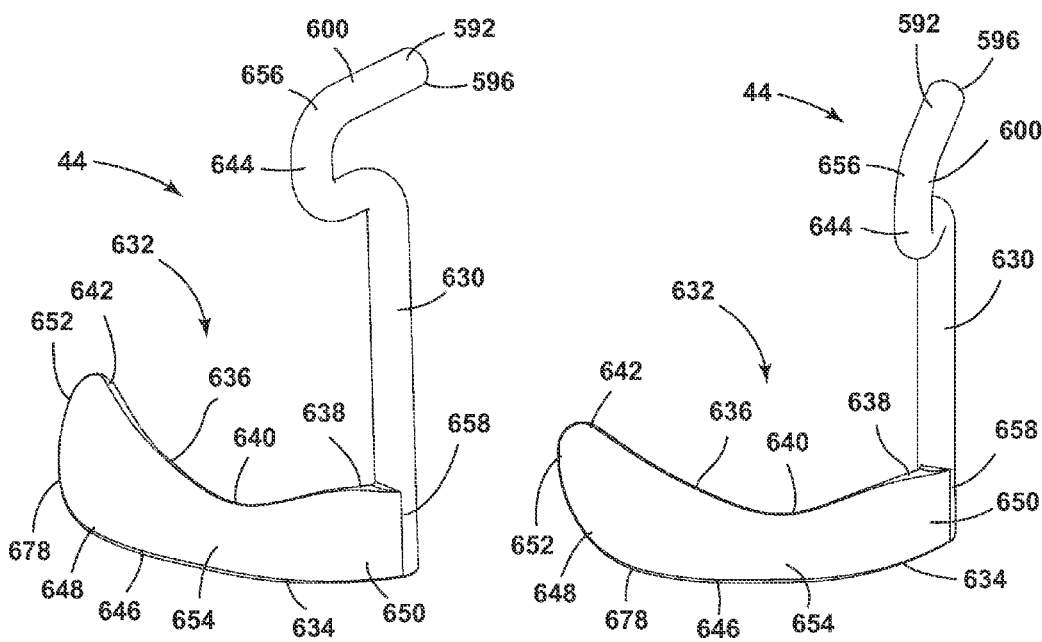
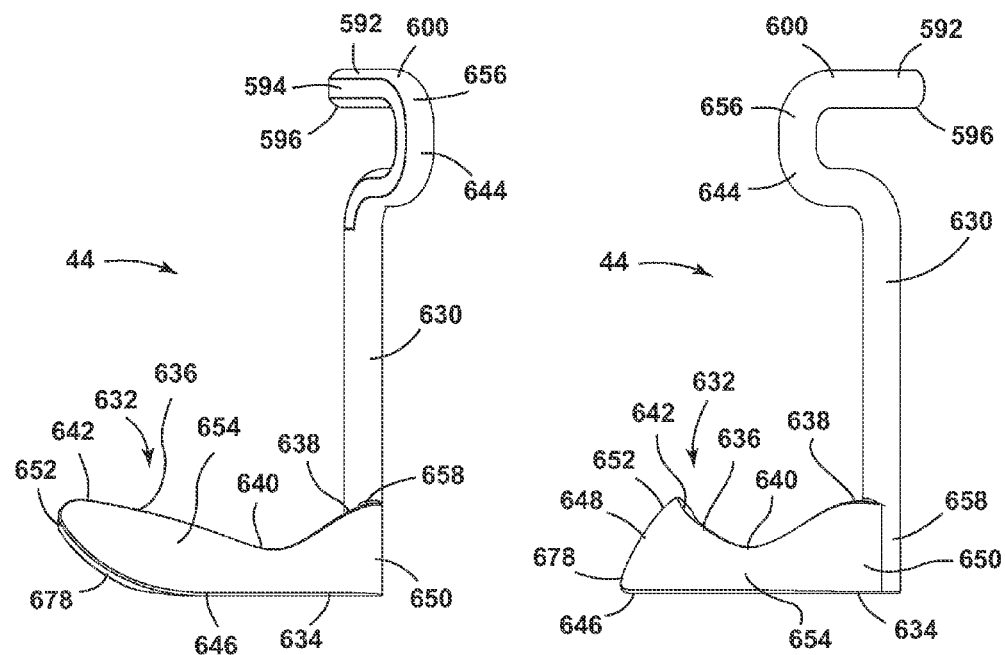

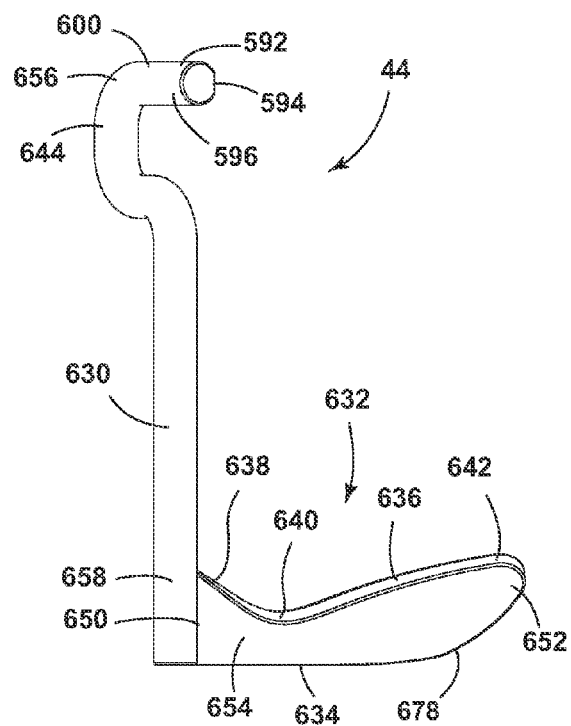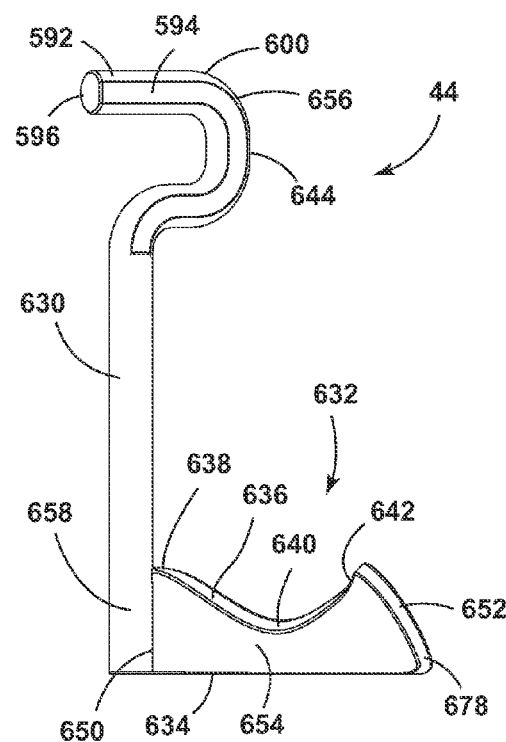
FIG. 36  FIG. 37
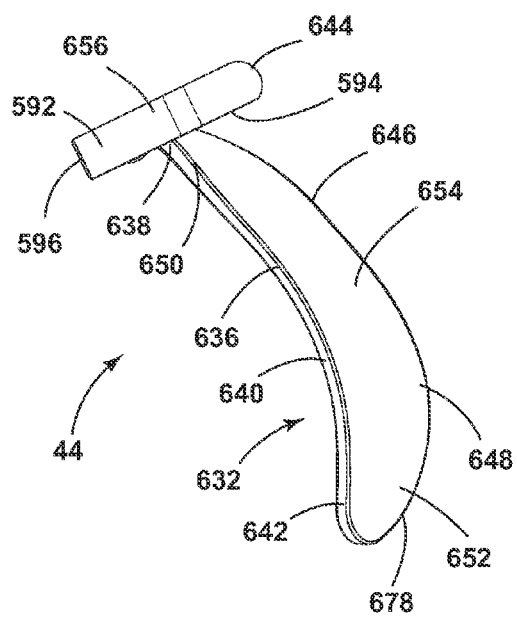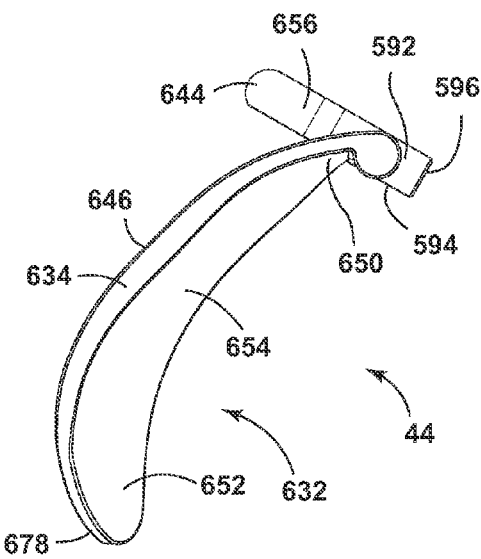
FIG. 38  FIG. 39

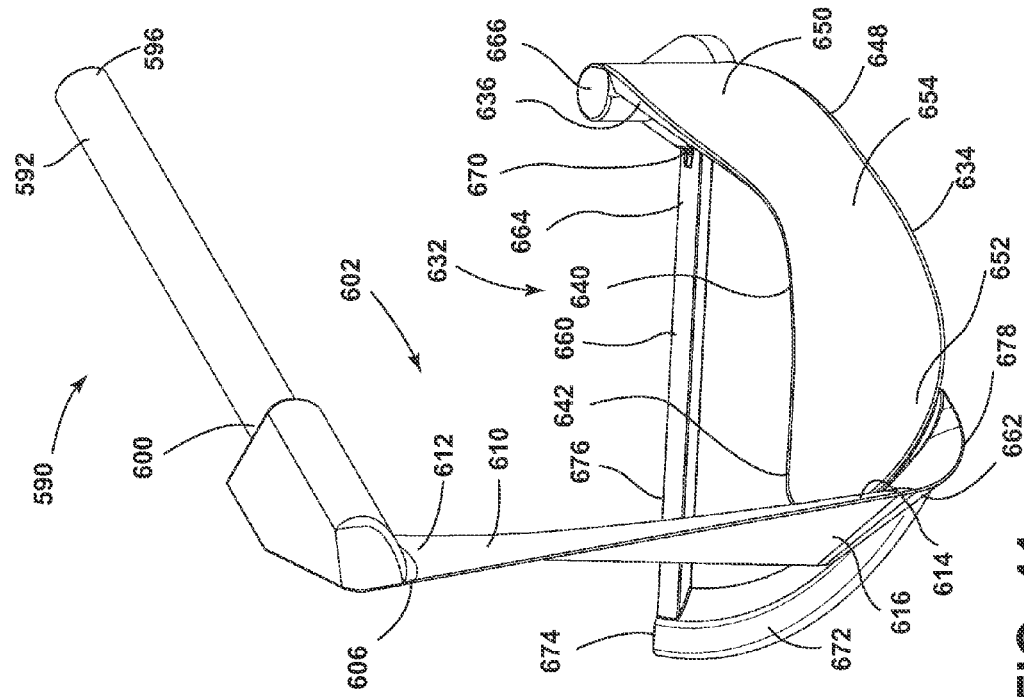
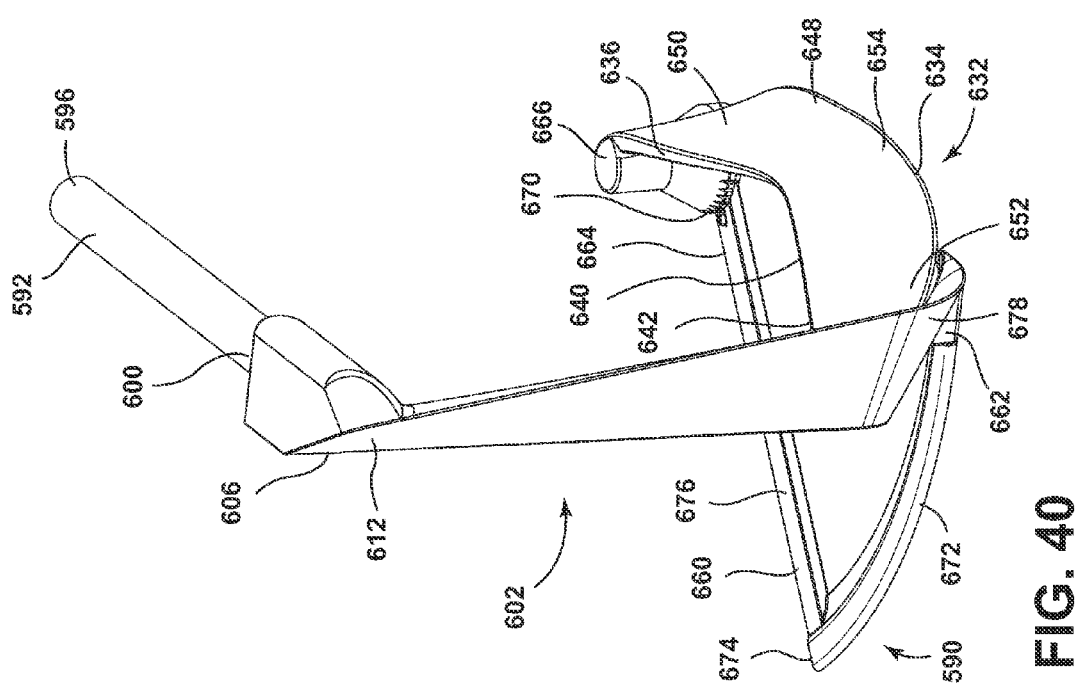

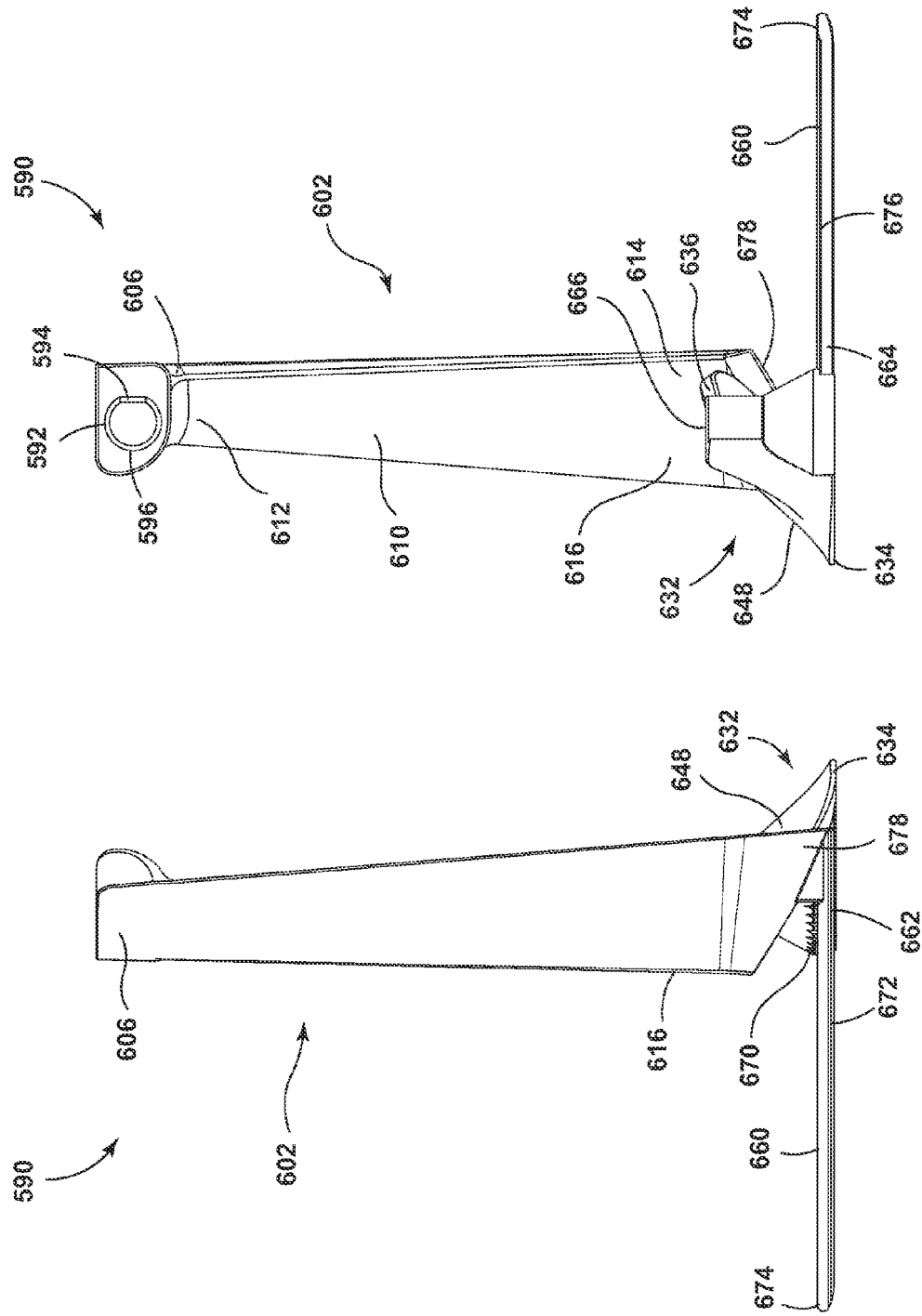

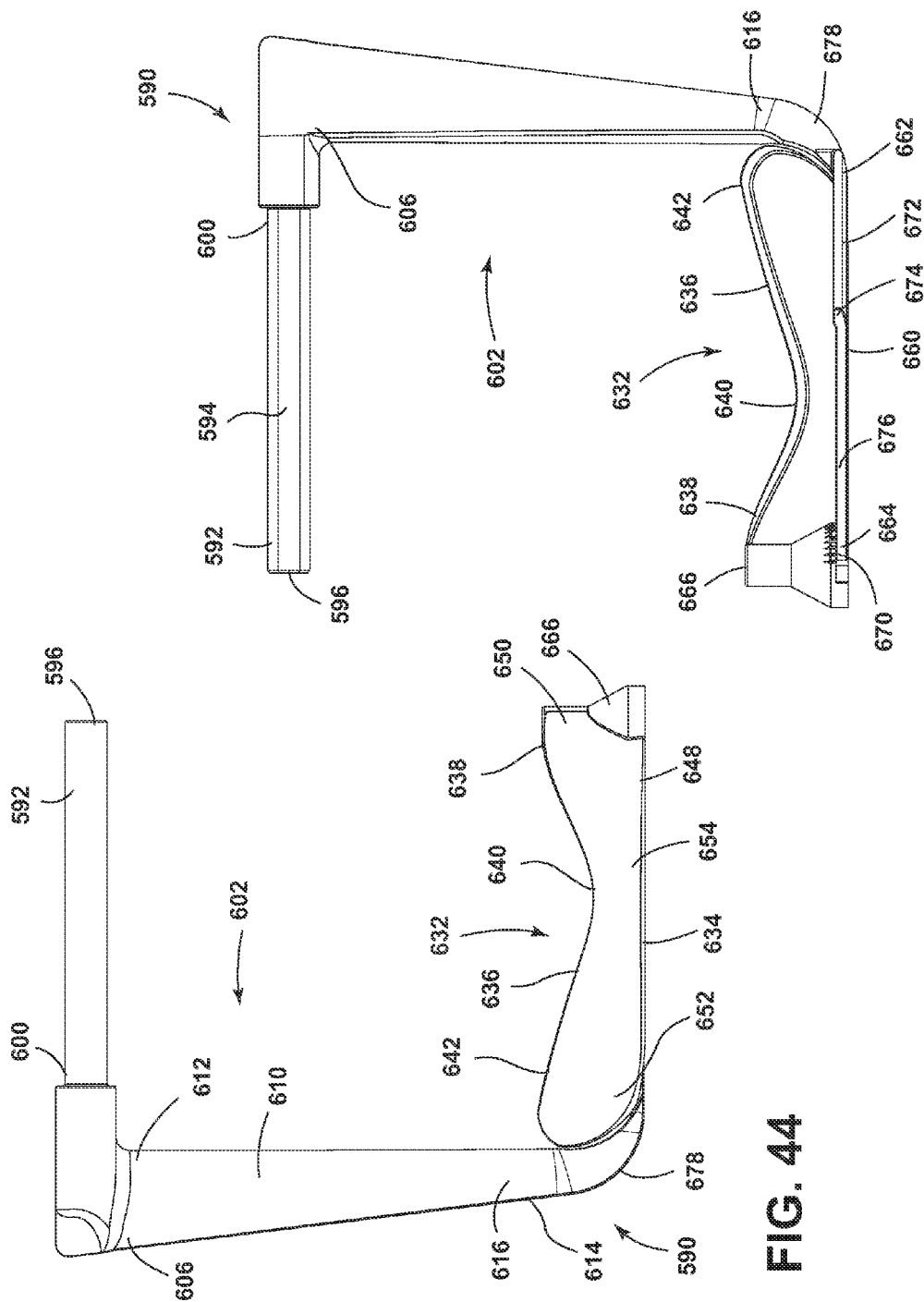

ELECTRIC STIRRING TOWER WITH LID

CROSS-REFERENCE TO RELATED APPLICATIONS

The present application is a continuation-in-part of U.S. patent application Ser. No. 13/783,193, filed Mar. 1, 2013, entitled COOKING AND MIXING APPLIANCE KIT, now U.S. Pat. No. 9,241,595, which is incorporated herein by reference in its entirety. The present application is also related to co-pending U.S. patent application Ser. No. 14/070,015 filed Nov. 1, 2013, entitled STIRRING WAND; and co-pending U.S. patent application Ser. No. 14/070,030, filed Nov. 1, 2013, entitled MULTI COOKER AND STIR TOWER WITH DOCKING STATION, both of which are incorporated herein by reference in their entireties.

BACKGROUND

The device is in the field of electrical appliances for cooking and mixing food items within a container.

SUMMARY

In at least one aspect, a cooking appliance kit includes a housing having a plurality of walls defining a heating cavity and a cooking vessel configured to be inserted into the heating cavity. The cooking vessel includes a first rounded end, a second rounded end, and an intermediate necked portion that defines first and second wells that at least partially intersect. The housing also includes first and second and distinct heater plates disposed in the first and second wells, respectively. An arcuate dividing wall is disposed in the heating cavity between the first and second distinct heater plates. First and second drive arms are removably engaged to a top portion of the housing and in operable communication with a drive system. A flipping wand is configured for removable engagement with the first drive arm and a stirring wand is configured for removable engagement with the second drive arm. A lid is pivotally coupled to the housing and operable between the open and closed positions.

In at least another aspect, a cooking appliance kit includes a housing having a drive system and a plurality of walls that define a heating cavity. A cooking vessel is configured to be inserted into the heating cavity where the cooking vessel includes first and second wells that at least partially intersect. An arcuate dividing wall is disposed in the heating cavity and removably coupled to the cooking vessel. First and second distinct heater plates are disposed on the first and second wells, respectively. First and second drive arms are removably coupled to the housing in an operable communication with the drive system.

In at least another aspect, a cooking appliance kit includes a housing having a plurality of walls defining a heating cavity. A cooking vessel is configured to be inserted into the heating cavity. The cooking vessel includes a first rounded end, a second rounded end, and an intermediate necked portion that defines first and second wells that at least partially intersect. First and second distinct heater plates are disposed in the first and second wells, respectively. First and second drive arms are removable coupled to the housing in an operable communication with the drive system. The first drive arm includes a flipping wand and the second drive arm includes a stirring wand.

These and other features, advantages, and objects of the present device will be further understood and appreciated by those skilled in the art by reference to the following specification, claims, and appended drawings.

BRIEF DESCRIPTION OF THE DRAWINGS

In the drawings:

FIG. 8A is a cross-sectional view of the cooking appliance kit of FIG. 4, taken at line VIIIA-VIIIA;

FIG. 15 is a rear elevational view of the dividing wall of FIG. 14;

FIG. 16 is a top plan view of the dividing wall of FIG. 14;

FIG. 17 is a bottom plan view of the dividing wall of FIG. 14;

FIG. 32 is a top perspective view of one embodiment of the flipping wand;

FIG. 33 is a top perspective view of the flipping wand of FIG. 32;

FIG. 34 is a first side elevational view of the flipping wand of FIG. 32;

FIG. 35 is a second side elevational view of the flipping wand of FIG. 32;

FIG. 36 is a third side elevational view of the flipping wand of FIG. 32;

FIG. 37 is a fourth side elevational view of the flipping wand of FIG. 32;

FIG. 38 is a top plan view of the flipping wand of FIG. 32;

FIG. 39 is a bottom plan view of the flipping wand of FIG. 32;

FIG. 40 is a top perspective view of one embodiment of the combination wand;

FIG. 41 is a top perspective view of the combination wand of FIG. 40;

FIG. 42 is a first side elevational view of the combination wand of FIG. 40;

FIG. 43 is a second side elevational view of the combination wand of FIG. 40;

FIG. 44 is a third side elevational view of the combination wand of FIG. 40;

FIG. 45 is a fourth side elevational view of the combination wand of FIG. 40;

DETAILED DESCRIPTION

Figure 1:
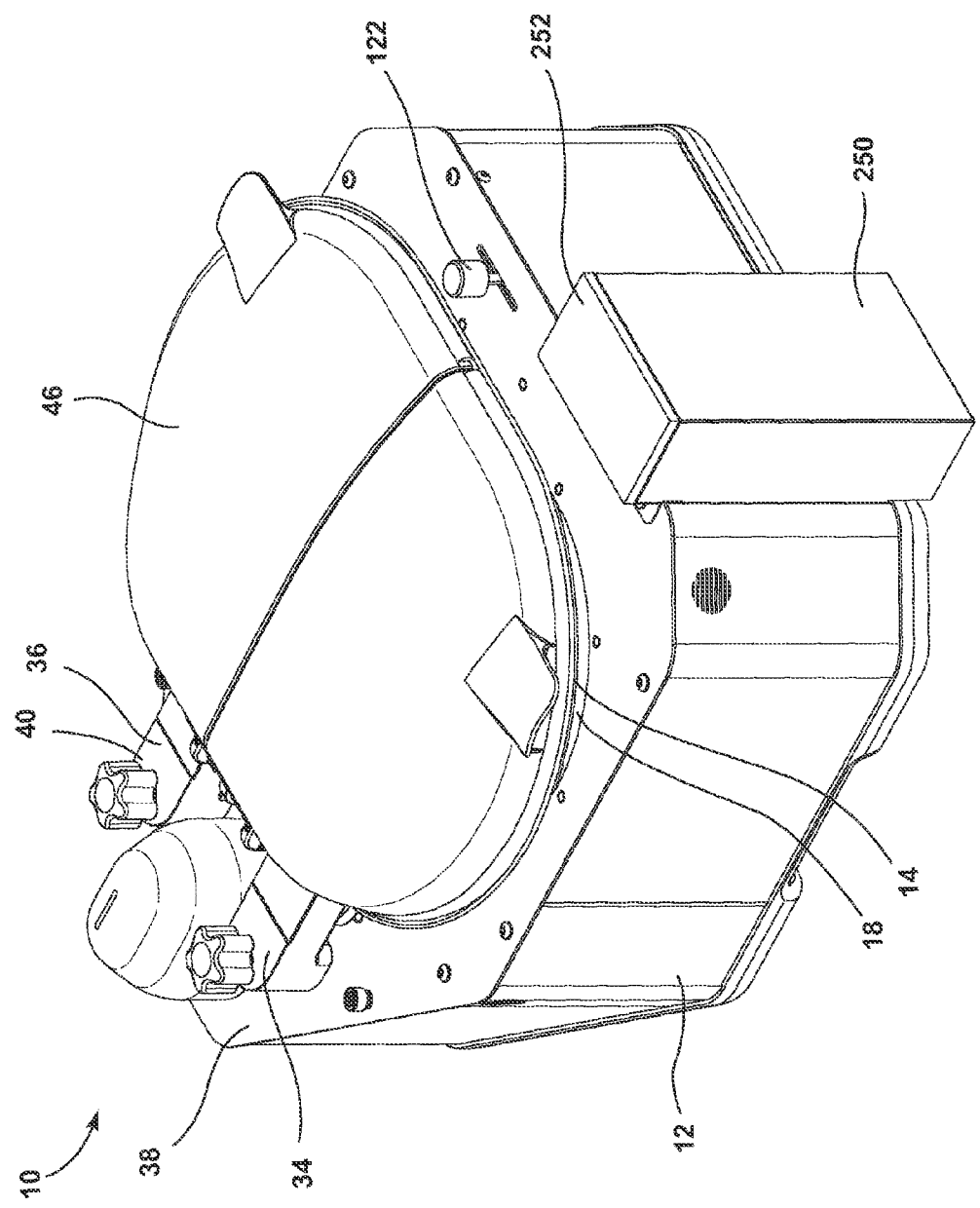
FIG. 1 is a top perspective view of one embodiment of the cooking appliance kit.

For purposes of description herein, the terms "upper," "lower," "right," "left," "rear," "front," "vertical," "horizontal," and derivatives thereof shall relate to the device as oriented in FIG. 1. However, it is to be understood that the device may assume various alternative orientations except for expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-10, the reference numeral 10 generally refers to a cooking appliance kit that includes a housing 12 and a cooking vessel 14. The housing 12 has a plurality of walls that define a heating cavity 16. The cooking vessel 14 is configured to be inserted into the heating cavity 16, where the cooking vessel 14 includes a first rounded end 18, a second rounded end 20 and an intermediate necked portion 22 that defines first and second wells 24, 26 that at least partially intersect. First and second distinct heater plates 28, 30 are disposed proximate the first and second wells 24, 26, respectively. An arcuate dividing wall 32 is disposed in the heating cavity 16 between the first and second distinct heater plates 28, 30. First and second drive arms 34, 36 are removably engaged to a top flange 38 of the housing 12 and are in operable communication with a drive system 40. A flipping wand 44 is configured for removable engagement with the first drive arm 34, and a stirring wand 42 is configured for removable engagement with the second drive arm 36. A lid 46 is pivotally coupled to the housing 12 and is operable between open and closed positions.

Referring again to FIGS. 1-10, the housing 812 includes a bottom panel 70 that includes an exterior flange 72 having wall support members 74. The bottom panel 70 is disposed below the heating cavity 16 of the housing 812. The bottom panel 70 also includes a drive support structure 76 for receiving and supporting an electric motor 78 and the drive system 40 of the cooking appliance kit 10. A plurality of support feet 80 are also disposed on an underside 82 of the bottom panel 70. A plurality of venting members 84 are disposed in the bottom panel 70 to allow heat to escape a housing interior 86. At least one of the venting members 84 is disposed on a recessed portion 88 of the bottom panel 70.

Figure 10:
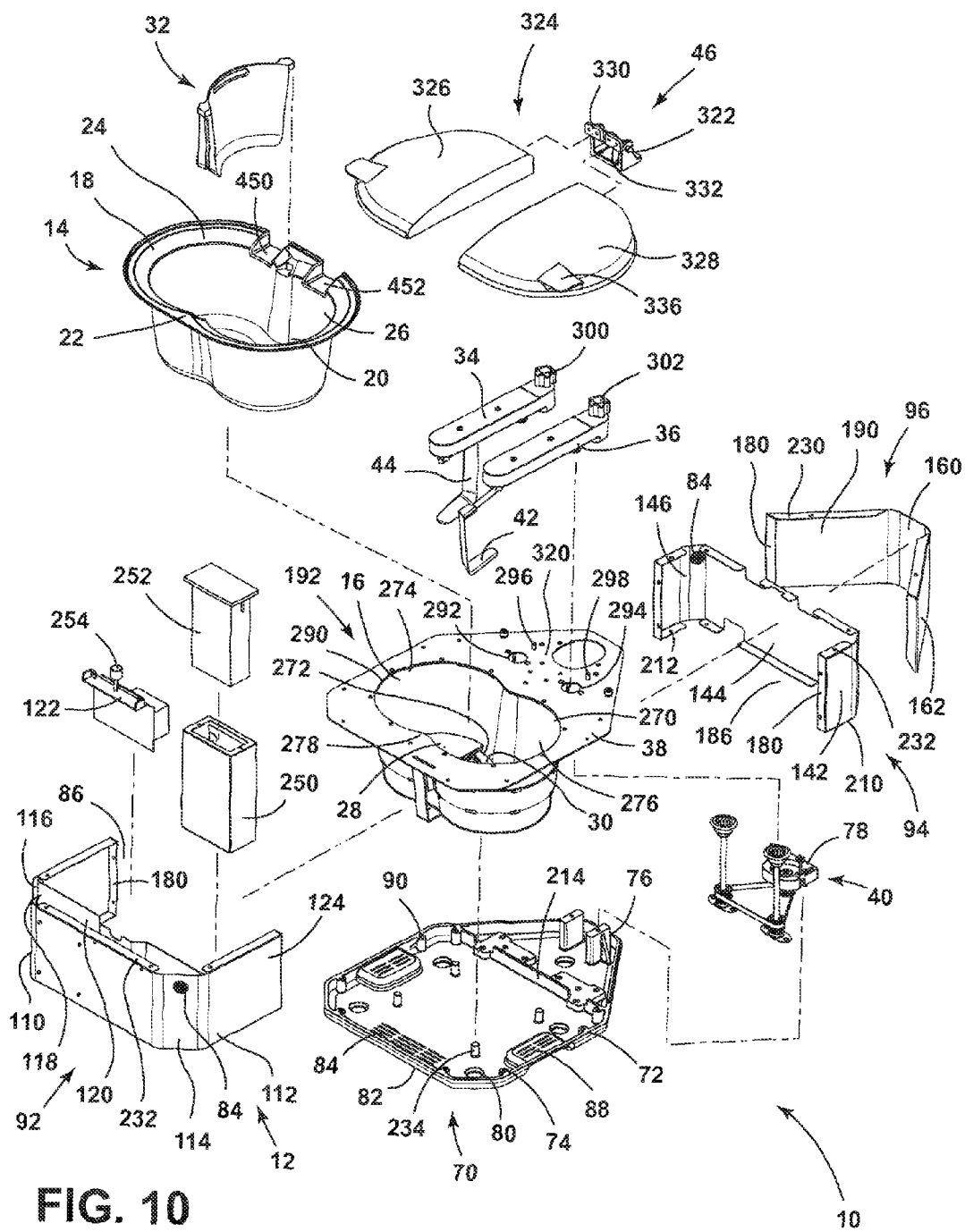
FIG. 10 is an exploded top perspective view of the cooking appliance kit of FIG. 1.
Figure 11:
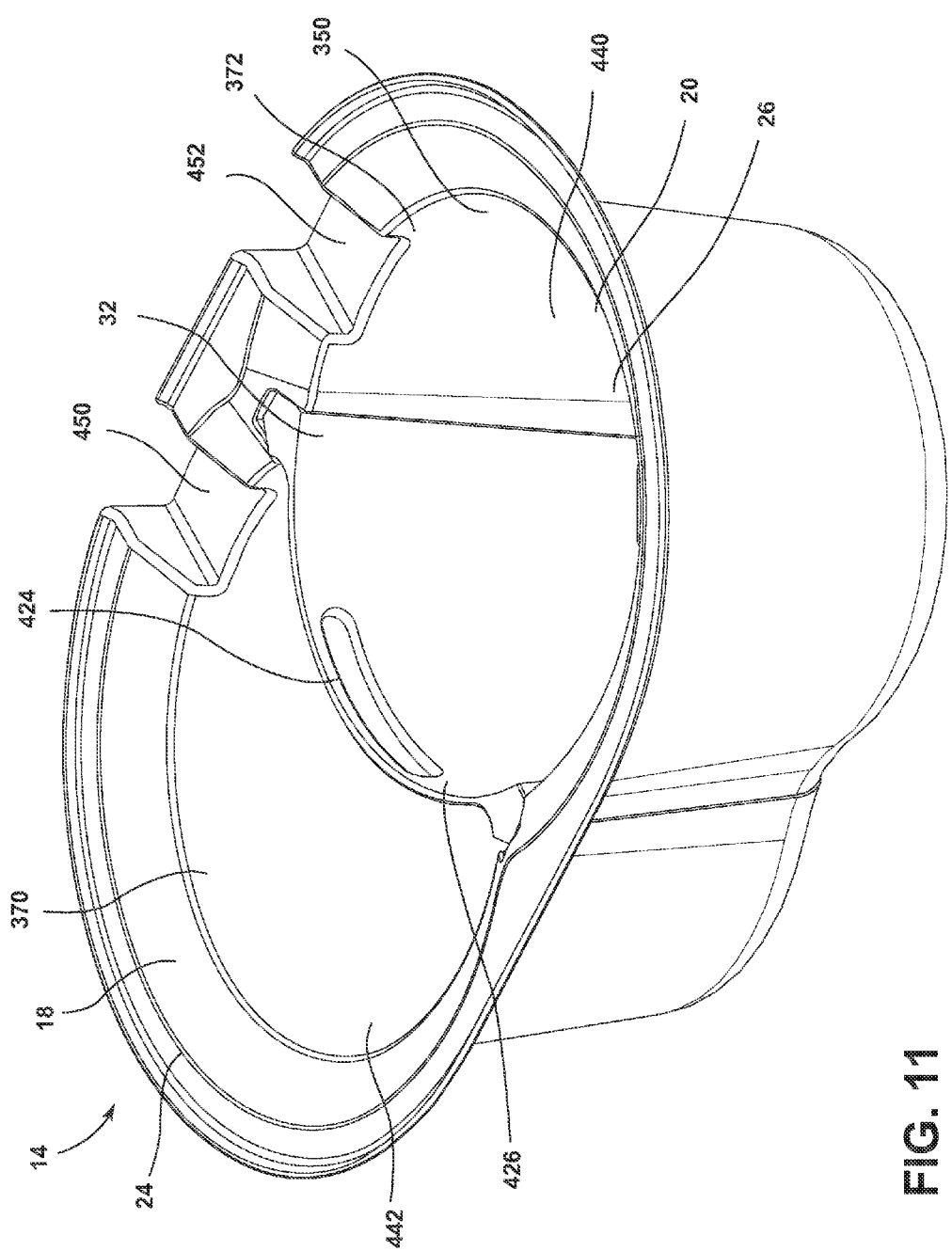
FIG. 11 is a top perspective view of one embodiment of the cooking vessel and dividing wall.

As shown in FIGS. 8A and 10, The exterior flange 72 and wall support members 74 are disposed around a perimeter of the bottom panel 70 where the wall support members 74 are disposed proximate an inward surface 90 of the exterior flange 72. The wall support members 74 are configured to receive mechanical fasteners to support a front wall 92, an intermediate wall 94 and a rear wall 96 that define the housing 12. The front wall 92 includes a front panel 110 and two side panels 112. Front quarter panels 114 connect the front panel 110 and the two side panels 112. An interior panel 116 is coupled between the two side panels 112, where an interior surface 118 of the front wall 92 defines an interstitial cavity 120. As will be more fully described herein, the interstitial cavity 120 is designed to receive controls 122 of the cooking appliance kit 10. Venting members 84 are disposed on the front quarter panels 114 to provide a fluid communication between the interstitial cavity 120 on the housing exterior 124 to provide ventilation within the interstitial cavity 120 and to allow heat to escape the interstitial cavity 120.

As also shown in FIGS. 8A and 10, an intermediate wall 94 can also be included, wherein the intermediate wall 94 includes two intermediate side panels 142, an intermediate panel 144 and two intermediate quarter panels 146 that connect the intermediate panel 144 with the two intermediate side panels 142 of the intermediate wall 94. Additional venting members 84 can be disposed in the intermediate quarter panels 146 to provide fluid communication between the housing interior 86 and the housing exterior 124 and to allow heat to escape the housing interior 86. A rear wall 96 includes a rear panel 160 and two rear quarter panels 162.

Additionally, as illustrated in FIGS. 8A and 10, a plurality of connecting flanges 180 are disposed on ends of the front, intermediate, and rear walls 92, 94, 96. Each connecting flange 180 of the front and intermediate walls 92, 94 are configured to engage another connecting flange 180 to couple the front wall 92 and the intermediate wall 94 that, at least partially, define a main cavity 186. Each connecting flange 180 of the rear wall 96 couples with an outer surface 188 of the intermediate wall 94 to define a secondary cavity 190. As will be more fully described below, the main cavity 186 is configured to receive a heating cavity wall 192, and the secondary cavity 190 is configured to receive mechanical aspects of the cooking appliance kit 10, including, but not limited to, the electric motor 78 and at least a portion of the drive system 40.

As also shown in FIGS. 8A and 10, the lower edges 210 of the front, intermediate, and rear walls 92, 94, 96 include a plurality of lower support flanges 212. The plurality of lower support flanges 212 are configured to be coupled to the wall support members 74 of the bottom panel 70. In addition, at least one lower support flange 212 of the intermediate wall 94 is adapted to be coupled with an interior flange 214 of the bottom panel 70. In this manner, the front, intermediate, and rear walls 92, 94, 96 are coupled to the bottom panel 70. The front wall 92, the intermediate wall 94 and the bottom panel 70 define the main cavity 186. The connecting flanges 180 of the rear wall 96 are configured to connect with the outer surface 188 of the intermediate wall 94 proximate the intermediate panel 144 and the two intermediate quarter panels 146. The rear wall 96, the intermediate panel 144, and the bottom panel 70 define a secondary cavity 190.

In addition, as shown in FIGS. 8A and 10, upper edges 230 of the front, intermediate, and rear walls 92, 94, 96 that comprise a plurality of upper support flanges 232, each of which is configured to couple with the heating cavity wall 192. In this manner, the heating cavity wall 192 is coupled to the front, intermediate, and rear walls 92, 94, 96. In addition, the bottom panel 70 can also include a plurality of cavity supports 234 for receiving a base of the heating cavity wall 192.

Further, as illustrated in FIGS. 8A and 10, the bottom panel 70 can be made of substantially rigid material that is able to be formed, where such materials can include, but are not limited to, plastics, metals, composite materials, or a combination thereof. The front, intermediate, and rear walls 92, 94, 96 and the heating cavity wall 192, can be made of a substantially rigid material that can be easily formed and can also withstand heating levels that are commonly experienced within kitchen cooking appliances. These materials can include, but are not limited to, metals. While less preferred, plastics and composite materials can also be used.

In addition, as shown in FIGS. 8A and 10, the front wall 92, the intermediate wall 94 and the rear wall 96 are connected together using rigid connections that can include, but are not limited to, welds or adhesives. In addition, these connections can include mechanical fasteners that include, but are not limited to, screw fasteners, nut and bolt fasteners, and the like. The welding, adhesive and mechanical fasteners described above can also be used to connect the heating cavity wall 192 to the front, intermediate, and rear walls 92, 94, 96. The front, intermediate, and rear walls 92, 94, 96 are connected to the bottom panel 70 through the use of mechanical fasteners as described above and disposed through the lower support flanges 212 and the wall support members 74. In alternate embodiments, depending upon the material used to form the bottom panel 70, and the front 92, intermediate 94, and rear 96 walls, welds or adhesives can also be used.

Referring back to FIGS. 1, 2, 4-6 and 8-10, the illustrated embodiment includes a storage container 250 having a storage container insert 252 operably coupled with the housing exterior 124. In addition, as will be more fully described below, the controls 122 for the various aspects of the cooking appliance kit 10 can be disposed within the interstitial cavity 120, and a user interface 862 for the controls 122 can be disposed on the housing exterior 124 proximate the interstitial cavity 120. As will be more fully discussed below, it is contemplated that the user interface 254 can include manual controls such as levers, switches, dials, knobs, and the like. In alternate embodiments, it is contemplated that the user interface 862 can also include, but are not limited to, electrical, digital, pushbutton, or touch screen controls.

Referring again to FIGS. 8A and 10, the heating cavity wall 192 includes opposing arcuate sidewalls 270 and a substantially leminiscate base 272 that cooperatively define the heating cavity 16. The opposing arcuate sidewalls 270 define substantially frusto-conical first and second heating subcavities 274, 276 where the first and second heating subcavities 274, 276 at least partially intersect. The first and second distinct heater plates 28, 30 are disposed within the first and second heating subcavities 274, 276, respectively, proximate the leminiscate base 272. The first and second distinct heater plates 28, 30 are separated by an intermediate heating cavity portion 278 defined by the intersection of the opposing arcuate sidewalls 270 of the heating cavity 16.

As shown in FIGS. 8A and 10, the first and second distinct heater plates 28, 30 are configured to be in communication with at least a portion of the controls 122. The controls 122 are configured, in part, to selectively and independently control the flow of voltage to the first and second distinct heater plates 28, 30 and to allow the first and second distinct heater plates 28, 30 to independently control the heating levels within the first and second heating subcavities 274, 276. In addition, first and second distinct side heaters 278, 280 are disposed adjacent to the arcuate sidewalls 270. The first and second distinct side heaters 278, 280 are configured to apply additional heat to the cooking vessel 14.

As illustrated in FIGS. 1-10, the top flange 38 of the heating cavity wall 192 extends outward from cavity wall rim 290 of the heating cavity 16. The top flange 38 is configured to be received by and connected to the upper support flanges 232 of the front, intermediate, and rear walls 92, 94, 96. In addition, and as will be more fully described below, the top flange 38 defines first and second drive shaft openings 292, 294 that provide a fluid communication between the secondary cavity 190 and the top surface of the top flange 38, such that the drive system 40 can pass through the first and second drive shaft openings 292, 294 and fluidly communicate with the first and second heating subcavities 274, 276. The top flange 38 can also include first and second drive arm interfaces 296, 298 that are configured to selectively receive first and second arm connectors 300, 302 of the first and second drive arms 34, 36 to secure the first and second drive arms 34, 36 to the top flange 38.

Also, as shown in FIGS. 3-5 and 9-10, the top flange 38 also includes a hinge receptacle 320 for receiving the lid hinge 322 of a lid assembly 324. The lid assembly 324 includes the lid 842 having first and second lid members 326, 328, coupled with a lid hinge 322 including operable first and second operable hinge plates 330, 332 that are coupled with the lid hinge 322. A hinge pin 334 couples the first and second operable hinge plates 330, 332 to the lid hinge 322. The first and second operable hinge plates 330, 332 are coupled to the first and second lid members 326, 328, wherein the first and second lid members 326, 328 are independently and selectively operable between open and closed positions. The first and second lid members 326, 328 can include a handle portion 336 to enable a user of the cooking appliance kit 10 to operate the first and second lid members 326, 328 between the open and closed positions. The lid assembly 324 is disposed at the top flange 38 and is configured such that the first and second lid members 326, 328 independently define closed positions where the first and second lid members 326, 328 extend over the first and second heating subcavities 274, 276, respectively.

Referring again to FIGS. 1-10, the lid hinge 322 of the lid assembly 324 can include a stop mechanism 338 that defines an open position for the first and second lid members 326, 328, wherein the first and second lid members 326, 328 are allowed to rotate about the hinge pin 334 greater than 90° and selectively engage the stop mechanism 338 to substantially prevent the first and second lid members 326, 328 from falling closed and also to substantially prevent the user from having to continuously hold open the first and second lid members 326, 328 in order to access the heating cavity 16 or the first or second heating subcavities 274, 276. In addition, one of the first and second lid members 326, 328 may include a support tab such that raising one of the lids 326, 328 will also raise the other of the lids 326, 328.

As illustrated in FIGS. 1-10, the first and second lid members 326, 328 can be made of a glass or plastic material that can substantially resist heating levels commonly seen in kitchen heating appliances. The first and second lid members 326, 328 are also substantially translucent to allow a user to view the various cooking and mixing operations of the cooking appliance kit 10 without opening either of the first or second lid members 326, 328. In other alternate embodiments, the first and second lid members 326, 328 can be made of metals, ceramics, or other substantially heat resistant material.

In alternate embodiments, the lid assembly 324 can include a single lid 46. In another alternate embodiment, the lid assembly 324 can include a lid coupling mechanism that selectively couples the first and second lid members 326, 328 such that the first and second lid members 326, 328 are collectively operable between open and closed positions.

Referring again to the illustrated embodiment, as best illustrated in FIGS. 8A and 11-18, the cooking appliance kit 10 includes a cooking vessel 14 and a selectively operable arcuate dividing wall 32. The cooking vessel 14 is configured to be selectively inserted into the heating cavity 16 and includes first and second rounded ends 18, 20. The intermediate necked portion 22 is defined by the intersection of the first and second rounded ends 18, 20. Moreover, the first and second rounded ends 18, 20 and the intermediate necked portion 22 cooperatively define the first and second wells 24, 26 that at least partially intersect. The cooking vessel 14 can be made of heat conductive materials that include, but are not limited to glass, ceramic materials, and the like.

Figure 12:
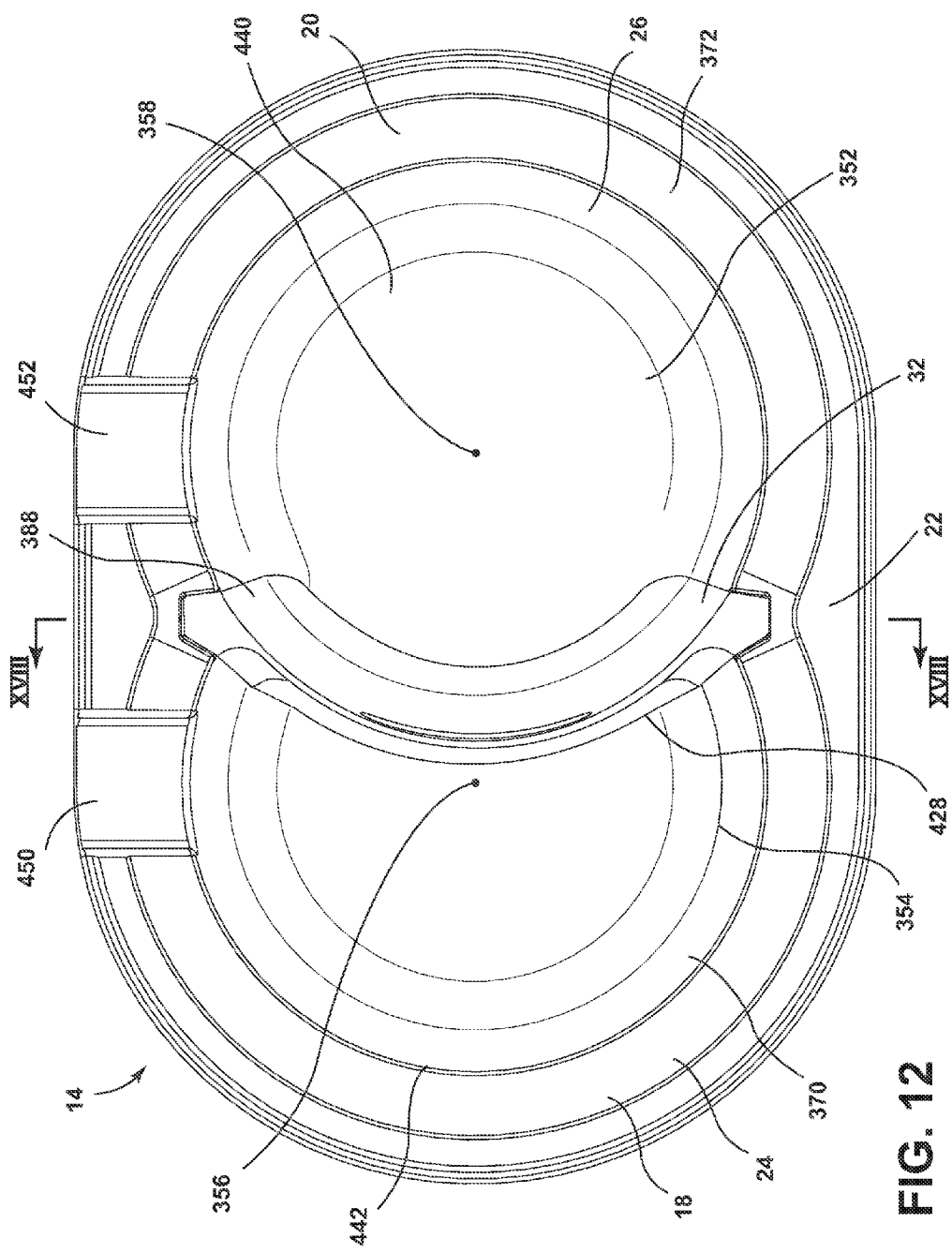
FIG. 12 is a top plan view of the cooking vessel and dividing wall of FIG. 11.

As illustrated in FIG. 12, the first and second rounded ends 18, 20 and the intermediate necked portion 22 define a substantially leminiscate cooking vessel volume 350 and a substantially leminiscate cooking vessel base 352. The cooking vessel base 352 is configured to rest on the first and second distinct heater plates 28, 30 proximate the leminiscate base 272 of the heating cavity wall 192 (shown in FIG. 10). In this manner, the first and second distinct heater plates 28, 30 provide selective independent heating to the first and second wells 24, 26 of the cooking vessel 14, respectively, and provide selective thermal communication between the first and second distinct heater plates 28, 30 and the cooking vessel volume 350.

Referring again to FIGS. 2, 8, 8A, and 9, the first and second rounded ends 18, 20 of the cooking vessel 14 can be configured to selectively engage at least a portion of the heating cavity wall 192. Upper ends 230 of the first and second rounded ends 18, 20 and the intermediate neck portion define a rim 236 of the cooking vessel 14. The rim 236 can include a flared rim flange 348 that extends outwardly from the first and second wells 24, 26. The flared rim flange 348 can be configured to selectively extend over at least a portion of the cavity wall rim 290 of the heating cavity wall 192.

As illustrated in FIGS. 8A and 11-13, in various embodiments, the intermediate necked portion 22 of the cooking vessel 14 is disposed within the cooking vessel volume 350 proximate the intersection of the first and second wells 24, 26. The first and second rounded ends 18, 20 include a substantially oblong outer surface 386 of the cooking vessel 14. The first and second round ends 18, 20 and the intermediate necked portion 22 define a leminiscate cooking vessel volume 350.

Figure 18:
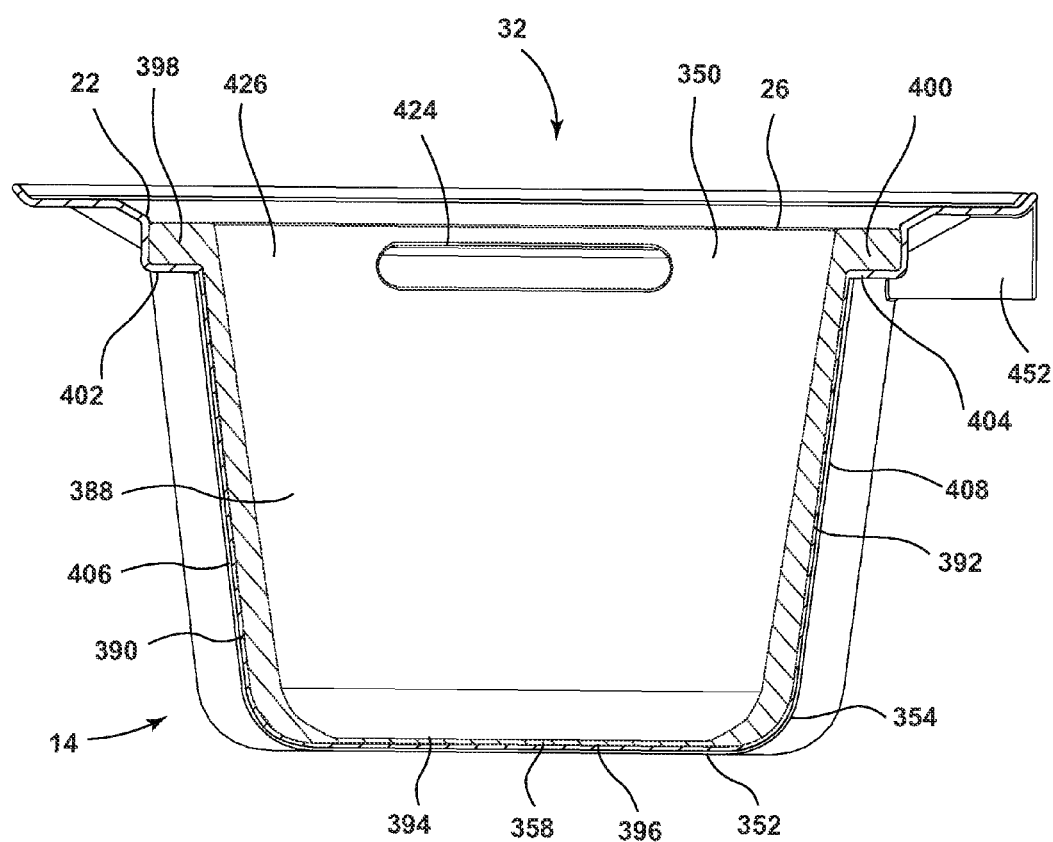
FIG. 18 is a cross-sectional view of the cooking vessel and dividing wall of FIG. 12 taken at line XVIII-XVIII.

As shown in FIGS. 12 and 18, the cooking vessel base 352 can include a perimeter fillet 354 that extends from a perimeter of the cooking vessel base 352 and couples the cooking vessel base 352 to the first and second rounded ends 18, 20 of the cooking vessel 14. The perimeter fillet 354 substantially rounds the cooking vessel volume 350 between the cooking vessel base 352 and the first and second rounded ends 18, 20 and substantially directs the contents of the cooking vessel volume 350 toward the respective first and second well centers 356, 358 of the first and second wells 24, 26.

Also, as illustrated in FIGS. 8A and 11-13, the first and second wells 24, 26 substantially define frusto-conical volumes that at least partially intersect at the intermediate necked portion 22. As will be further described below, the first and second wells 24, 26 define first and second mixing zones 370, 372, respectively. The intersection of the first and second wells 24, 26 further defines an intersection 368 of the first and second mixing zones 370, 372, wherein food contents contained within the cooking vessel volume 350 can be cooperatively mixed within the first and second mixing zones 370, 372, thereby increasing the mixing ability of the cooking appliance kit 10 within each of the first and second wells 24, 26, and the cooking vessel volume 350 as a whole. The first and second mixing zones 370, 372 can intersect in the area defined by the intermediate necked portion 22. In an alternate embodiment, the walls of the vessel 14 include a stepped configuration in order to accommodate, accept or rest cooking accessory inserts, such as steaming baskets, raised warming plates for bread, etc.

Referring now to FIGS. 8A and 13-18, another aspect of the cooking appliance kit 810 includes an arcuate dividing wall 32 that is selectively removable from the cooking vessel 818. The arcuate dividing wall 32 is defined by first and second side edges 390, 392, a bottom edge 394 and a concave surface 388 defining a curvature substantially similar to that of the first and second wells 24, 26. The first and second side edges 390, 392 and the bottom edge 394 of the arcuate wall define an engagement surface 396 configured to be selectively received by the intermediate necked portion 22 of the cooking vessel 14. The arcuate dividing wall 32 can include first and second engagement members 398, 400 that extend from at least a portion of the first and second side edges 390, 392, respectively. First and second notches 402, 404 can be disposed in first and second sides 406, 408 of the intermediate necked portion 22 of the cooking vessel 818, respectively. The first and second notches 402, 404 are configured to selectively receive the first and second engagement members 398, 400. It should be understood that the first notch 402 can receive the first and second engagement members 398, 400 wherein the second notch 404 would receive the other of the first and second engagement members 398, 400. In this manner, the concave surface 388 of the arcuate dividing wall 32 can be oriented towards either the first well 24 or the second well 26.

Figure 13:
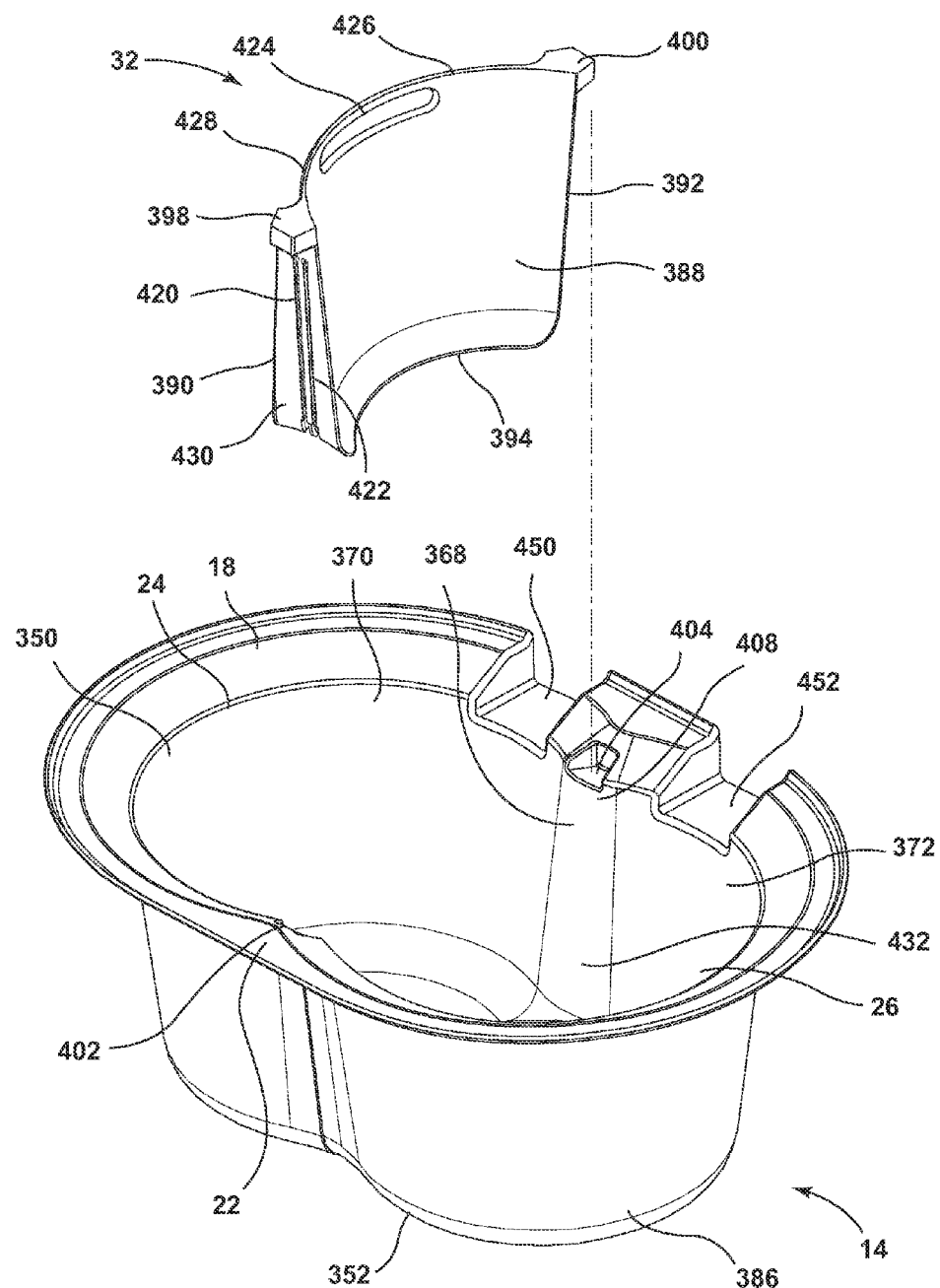
FIG. 13 is an exploded top perspective view of the cooking vessel and dividing wall of FIG. 11.
Figure 14:
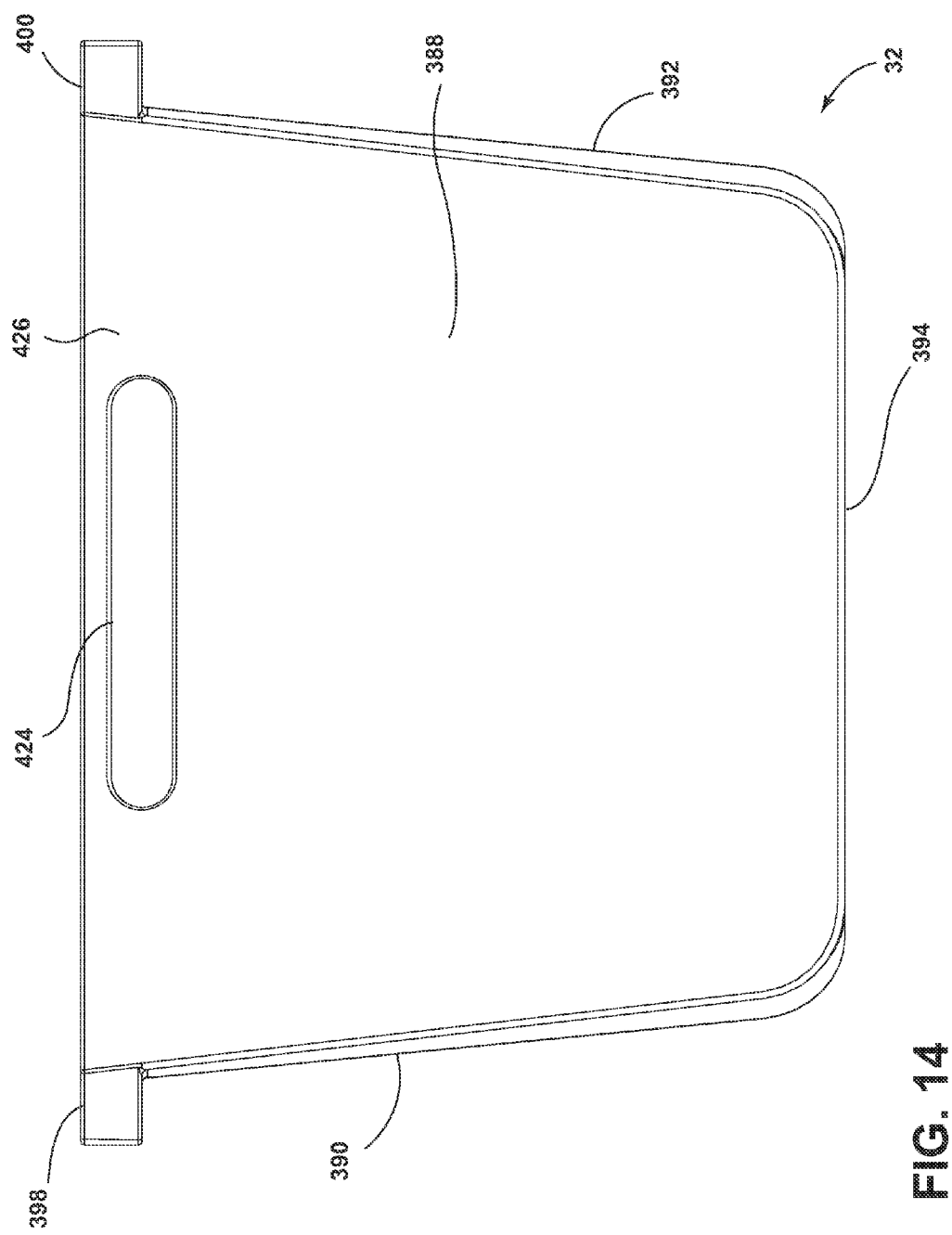
FIG. 14 is a front elevational view of one embodiment of the dividing wall.

As illustrated in FIG. 13, the first and second engagement members 398, 400 of the arcuate dividing wall 32 and the first and second notches 402, 404 of the cooking vessel 818 have a substantially trapezoidal lateral cross section. It should be understood that the shape and size of the notches 402, 404 and matingly configured engagement members 398, 400 can vary. By way of explanation, and not limitation, the engagement members 398, 400 can have an arcuate or orthogonal shape or a combination of arcuate and orthogonal shapes. It should also be understood, that the shape of the notches 402, 404 can be different from the shape of the engagement members 398, 400 so long as the notches 402, 404 are configured to receive the first and second engagement members 398, 400. In this manner, the shape of the notches 402, 404 and the shape of the engagement members 398, 400 can differ without decreasing the efficiency or usefulness of the cooking appliance kit 10.

Referring again to the illustrated embodiment, as illustrated in FIGS. 13 and 17, one or more gaskets 420 can be disposed on at least a portion of the engagement surface 396. The one or more gaskets 420 run along the engagement surface 396 and substantially follow the curvature of the concave surface 388 of the arcuate dividing wall 32. In alternate embodiments, the gasket 420 is made to be disposed only on the first and second side edges 390, 392 of the engagement surface 396. Alternatively, in other embodiments, the gasket 420 may be disposed only on the bottom edge 394 of the engagement surface 396.

As shown in FIGS. 13 and 17, the two or more gaskets 420 extend from the engagement surface 396 and are configured to be received by the intermediate necked portion 22 of the cooking vessel 14. It should be understood, that the number, shape and configuration of the one or more gaskets 420 can vary. By way of explanation, and not limitation, a single gasket 420 may be disposed on the engagement surface 396 where the gasket 420 defines a linear protrusion disposed along the engagement surface 396. In such an embodiment, the cross-sectional shape of the linear protrusion can include, but not be limited to, arcuate or rectilinear cross sections. In other alternate embodiments, the linear protrusion can include an extruded cavity within the length of the linear protrusion, wherein the coupling of the engagement surface 396 to the intermediate necked portion 22 of the cooking vessel 14 can compress the linear protrusion and define a seal between the first well 24 and the second well 26. Alternatively, the gasket 420 may take on a non-linear configuration.

Referring back to the illustrated embodiment, as shown in FIGS. 11-18, the arcuate dividing wall 32 is made of a substantially rigid material including, but not limited to, metals, plastics, rubberized materials, glass or ceramic material or other substantially rigid material. The material selected for the arcuate dividing wall 32 should also be of a material that can substantially withstand deformation when exposed to heat levels experienced in kitchen cooking appliances.

As illustrated in FIGS. 13 and 17, the illustrated gasket 420 is made of a substantially flexible material such as a rubberized material or plastic material that can create the desired seal between the first and second wells 24, 26 when the arcuate dividing wall 32 is engaged with the intermediate necked portion 22 of the cooking vessel 818. In addition, in certain embodiments, it is contemplated that the one or more gaskets 420 may be selectively removable from the engagement surface 396 of the arcuate dividing wall 32. In this embodiment, the engagement surface 396 can include a gasket receptacle portion 422 for receiving the one or more gaskets 420.

Alternatively, in other embodiments, the one or more gaskets 420 may be formed with and be an integral part of the arcuate dividing wall 32. In such an embodiment, it is preferred that the arcuate dividing wall 32 be made of a plastic or rubberized material so that the one or more gaskets 420 can create the desired selective seal between the arcuate dividing wall 32 and the cooking vessel 14.

Referring again to the illustrated embodiment, as shown in FIGS. 11, 13-15 and 18, the arcuate dividing wall 32 can also include a handle portion 424 disposed proximate an upper portion 426 of the arcuate dividing wall 32. The handle portion 424 can define an opening proximate an upper portion of the arcuate dividing wall 32. In alternate embodiments, the handle portion 424 can include a gripping ridge disposed proximate the upper portion 426 of the arcuate dividing wall 32. In other embodiments, the handle portion 424 can be a separate piece coupled proximate the upper portion 426 of the arcuate dividing wall 32.

As shown in the illustrated embodiment of FIGS. 8A, 13, 16 and 17, a convex surface 428 of the arcuate dividing wall 32 is configured to be substantially vertical, while the concave surface 388 is substantially slanted to match the frusto-conical curvature of the first and second wells 24, 26. The substantially vertical orientation of the convex surface 428 and the substantially slanted configuration of the concave surface 388 defines a tapered vertical cross-section of the arcuate dividing wall 32 having a narrow upper portion 426 and a widened bottom edge 394 that at least partially defines the engagement surface 396.

In an alternate embodiment, the first and second sides 406, 408 of the intermediate necked portion 22 can include an engagement mechanism for receiving the one more gaskets 420 of the arcuate dividing wall 32. In this embodiment, the engagement mechanism can include an engagement channel configured to receive the one or more gaskets 420 of the arcuate dividing wall 32, where the engagement channel can at least partially include the first and second notches 402, 404.

Alternatively, the engagement mechanism can include an engagement protuberance that extends from the first and second sides 406, 408 of the intermediate necked portion 22 where the engagement protuberance is configured to be received by the one more gaskets 420 of the arcuate dividing wall 32. In these alternate embodiments, the engagement channel and the engagement protuberance cooperatively engage at least a portion of the one or more gaskets 420 of the arcuate dividing wall 32. In this manner, the engagement mechanism slidably receives the arcuate dividing wall 32 and the one or more gaskets 420 of the arcuate dividing wall 32.

In the various embodiments that include the engagement channel, the cooking vessel 818 can include first and second filler members that can be slidably engaged into the engagement channels when the arcuate dividing wall 32 is selectively removed from the cooking vessel 14 to substantially prevent the contents of the cooking vessel 818 from entering the engagement channel.

Referring again to the illustrated embodiment, as shown in FIGS. 13 and 17, the first and second side edges 390, 392 of the arcuate dividing wall 32 are contoured thereby defining an engagement channel 430 that substantially matches the curvature of the first and second sides 406, 408 of the intermediate necked portion 22 of the cooking vessel 14 defining an engagement protuberance 432. In this manner, the engagement channel 420 of the arcuate dividing wall 32 slidably engages the engagement protuberance 432 of the intermediate necked portion 22 and defines a lateral interference connection between the first and second side edges 390, 392 of the arcuate dividing wall 32 and the first and second sides 406, 408 of the intermediate necked portion 22. This lateral interference connection substantially limits the lateral movement of the arcuate dividing wall 32 within the intermediate necked portion 22, while allowing the desired operable vertical movement of the arcuate dividing wall 32 within the intermediate necked portion 22.

As best illustrated in FIG. 12, the concave surface 388 of the arcuate dividing wall 32 and the second well 26 define a circular cooking zone 440 that is configured to define the second mixing zone 372. The convex surface 428 of the arcuate dividing wall 32 and the first well 24 define a crescent cooking zone 442, where the mixing functions of the cooking appliance kit 810 are substantially inoperable. As discussed above, the arcuate dividing wall 32 can be reversed such that the circular cooking zone 440 is at least partially defined by the first rounded end 18 and the crescent cooking zone 442 is at least partially defined by the second rounded end 20.

Also, as best illustrated in FIGS. 8-11, the flared rim flange 348 of the cooking vessel 14 includes first and second drive arm receptacles 450, 452. As will be more fully described below, the first and second drive arm receptacles 450, 452 are configured to receive the first and second drive arms 34, 36. The first and second drive arm receptacles 450, 452 are further configured to selectively orient the first drive arm 34 over the first well 24 and the second drive arm 36 over the second well 26. In alternate embodiments, the drive arms can be switched such that the first and second drive arm receptacles 450, 452 orient the first drive arm 34 over the second well 26 and the second drive arm 36 over the first well 24.

Additionally, as shown in FIGS. 8-11, the first and second drive arm receptacles 450, 452 are substantially rectangular to match the illustrated first and second drive arms 34, 36. In alternate embodiments, the drive arm receptacles 450, 452 and the drive arms can be rounded or have a different polygonal cross-sectional shape. The first and second drive arm receptacles 450, 452 and the first and second drive arms 34, 36 cooperate to define a substantially close fit to substantially prevent the contents of the cooking vessel 14 from escaping the cooking vessel 818 during use.

In other alternate embodiments, the drive arm receptacles 450, 452 can include receptacle gaskets that provide a seal between the first and second drive arms 34, 36 and the first and second drive arm receptacles 450, 452, respectively. Such a seal can further prevent liquids and other contents from escaping the cooking vessel 14 during cooking or mixing operations, or both.

Figure 19:
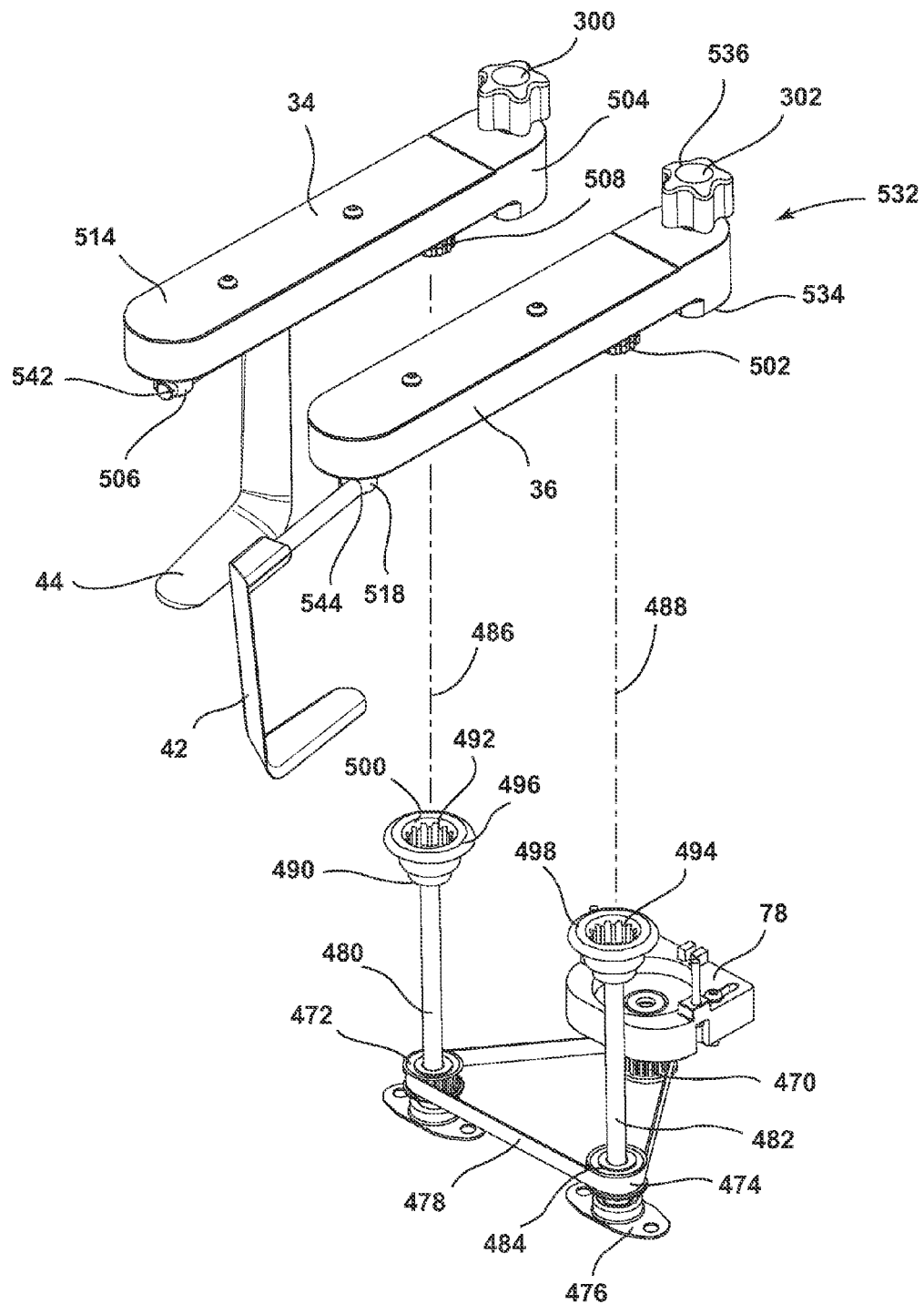
FIG. 19 is an exploded perspective view of one embodiment of the drive arms and drive system.

Referring again to the illustrated embodiment, as best illustrated in FIGS. 10 and 19-22, the cooking appliance kit 10 includes a drive system 40 where the first and second drive arms 34, 36 are configured to be removably engaged and in operable communication with the drive system 40. The drive arms 34, 36 may be laterally pivotable relative to the cooking appliance kit 10. It is also contemplated that the drive arms 34, 36 could be independently upwardly pivotable. Further, the drive arms 34, 36 could be pivotable with the lid 46, such that when a user lifts the lid 46, the drive arms 34, 36 are also lifted. As shown in FIG. 19, the drive system 40 includes an electric motor 78 coupled with and in operable communication with a drive wheel 470. First and second idler wheels 472, 474 are disposed proximate the drive wheel 470. A plurality of wheel plates 476 are configured to secure the electric motor 78 and the idler wheels 472, 474 to the bottom panel 70 of the housing 12 within the secondary cavity 190. The wheel plates 476 are configured to secure the idler wheels 472, 474 and the drive wheel 470 to the bottom panel 70 and also allow for the rotational movement of the idler wheels 472, 474 and the drive wheel 470.

As shown in FIG. 19, a drive belt 478 is configured to engage the drive wheel 470 and the first and second idler wheels 472, 474, and define an operable communication between the drive wheel 470 and the first and second idler wheels 472, 474. First and second drive shafts 480, 482 extend from proximate ends 484 at the first and second idler wheels 472, 474 and are disposed co-linear with first and second rotational drive axes 486, 488 of the first and second idler wheels 472, 474, respectively, to distal ends 490 of the drive shafts 480, 482 proximate the first and second drive shaft openings 292, 294 of the top flange 38 of the heating cavity wall 192.

FIG. 19 also shows first and second drive receptacles 492, 494 that are coupled to distal ends 490 of the first and second drive shafts 480, 482 wherein the first and second drive receptacles 492, 494 extend through the first and second drive shaft openings 292, 294 (shown in FIG. 10) and are further configured to rotate within the first and second drive shaft openings 292, 294. First and second grommets 496, 498 are coupled to the first and second drive shaft openings 292, 294, respectively, and secure the first and second drive receptacles 492, 494 within the first and second drive shaft openings 292, 294 while allowing the rotational movement of the first and second drive receptacles 492, 494 within the first and second grommets 496, 498.

As further illustrated in FIG. 19, to allow for the desired rotational movement of the first and second drive receptacles 492, 494 within the first and second grommets 496, 498, the first and second drive receptacles 492, 494 can be coupled to an inner-facing surface 500 of the first and second grommets 496, 498 by a rotational sliding assembly that can include, without limitation, ball bearings, cylindrical bearings, lubricated members, or other rotationally slidable interface.

Figure 22:
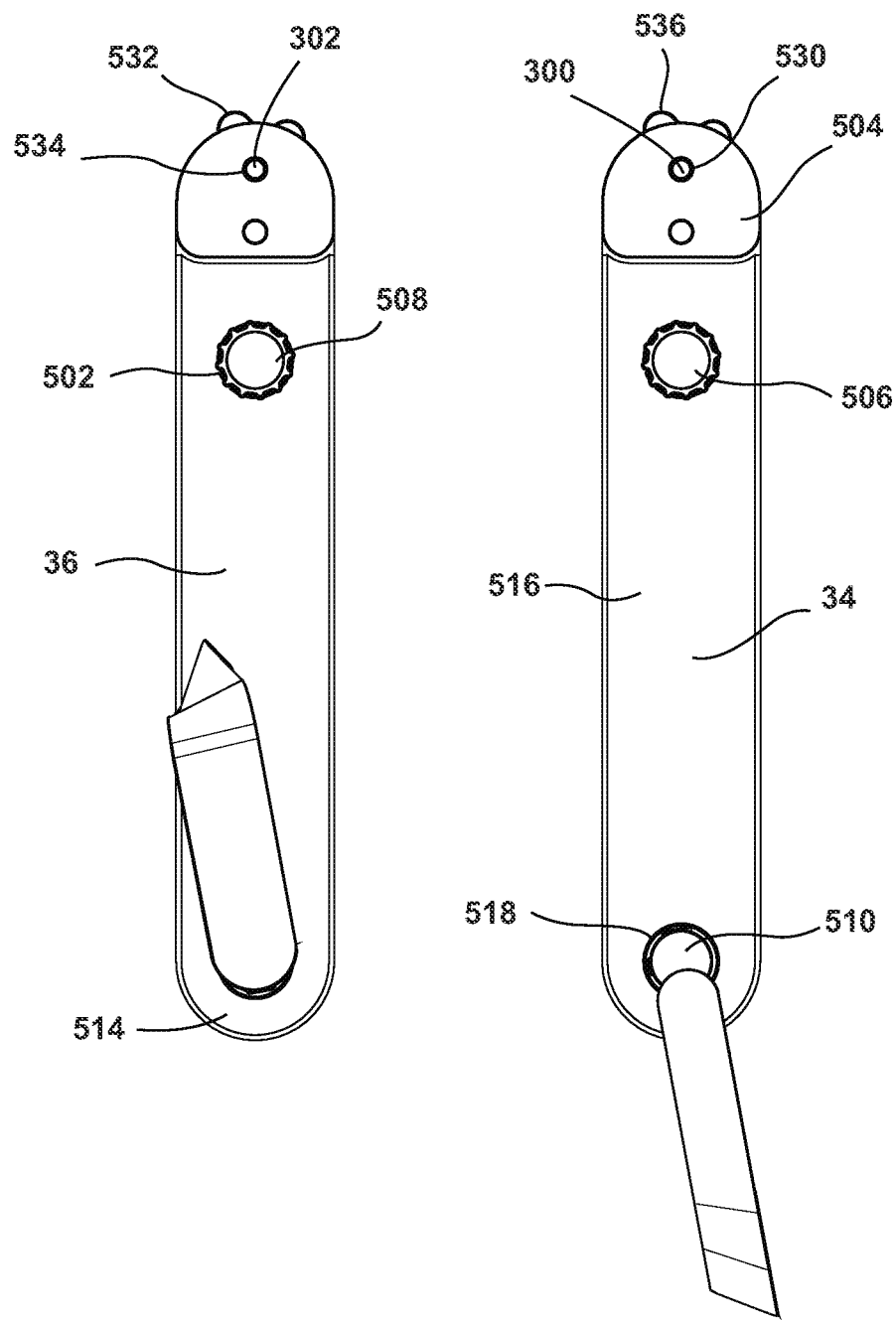
FIG. 22 is a bottom plan view of the drive arms of FIG. 19.

Also, as illustrated in FIGS. 19 and 22, the first and second drive arms 34, 36 each include an engagement gear 502 disposed at engagement ends 504 of the first and second drive arms 34, 36 that are configured to be selectively received by at least one of the first and second drive receptacles 492, 494. In this manner, each engagement gear 502 is in operable communication with at least one of the drive shafts 482, 484 and at least one of the idler wheels 472, 474, and the drive wheel 470 of the electric motor 78. Each drive arm 34, 36 contains a drive train 506 having a first train end 508 including the engagement gear 502 and a second train end 510 including a tool impeller 518 disposed at rotational ends 514 of the first and second drive arms 34, 36. A drive arm enclosure 516 is configured to receive the drive train 506 and secure the drive train 506 within the drive arm enclosure 516 by limiting the vertical and lateral movement of the drive train 506 within the drive arm enclosure 516 and also allowing the rotational movement of the drive train 506 such that the engagement gear 502 of the drive train 506 is in operable communication with the tool impeller 518 of the drive train 506.

As shown in FIGS. 19-22, each drive arm includes the first and second arm connectors 300, 302 disposed on the engagement end 504 of the first and second drive arms 34, 36. Each of the first and second arm connectors 300, 302 can include a tubular channel 530 extending vertically through the drive arm enclosure 516 proximate the engagement end 504 of the drive arms 34, 36 and a connecting assembly 532 having a connector end 534 extending upward through the tubular channel 530 to a knob end 536 for turning the connector end 534. The connector end 534 is configured to be received by the first and second drive arm interfaces 296, 298 in the top flange 38 of the heating cavity wall 192. As discussed above, the drive arms 34, 36 are configured to engage the drive system 40 and the top flange 38 of the heating cavity wall 192, such that the rotational ends 514 of the first and second drive arms 34, 36 are disposed over central axes of the first and second wells 24, 26 thereby defining the at least partially intersecting first and second mixing zones 370, 372 within the first and second wells 24, 26, respectively (shown in FIGS. 8 and 9).

Figure 20:
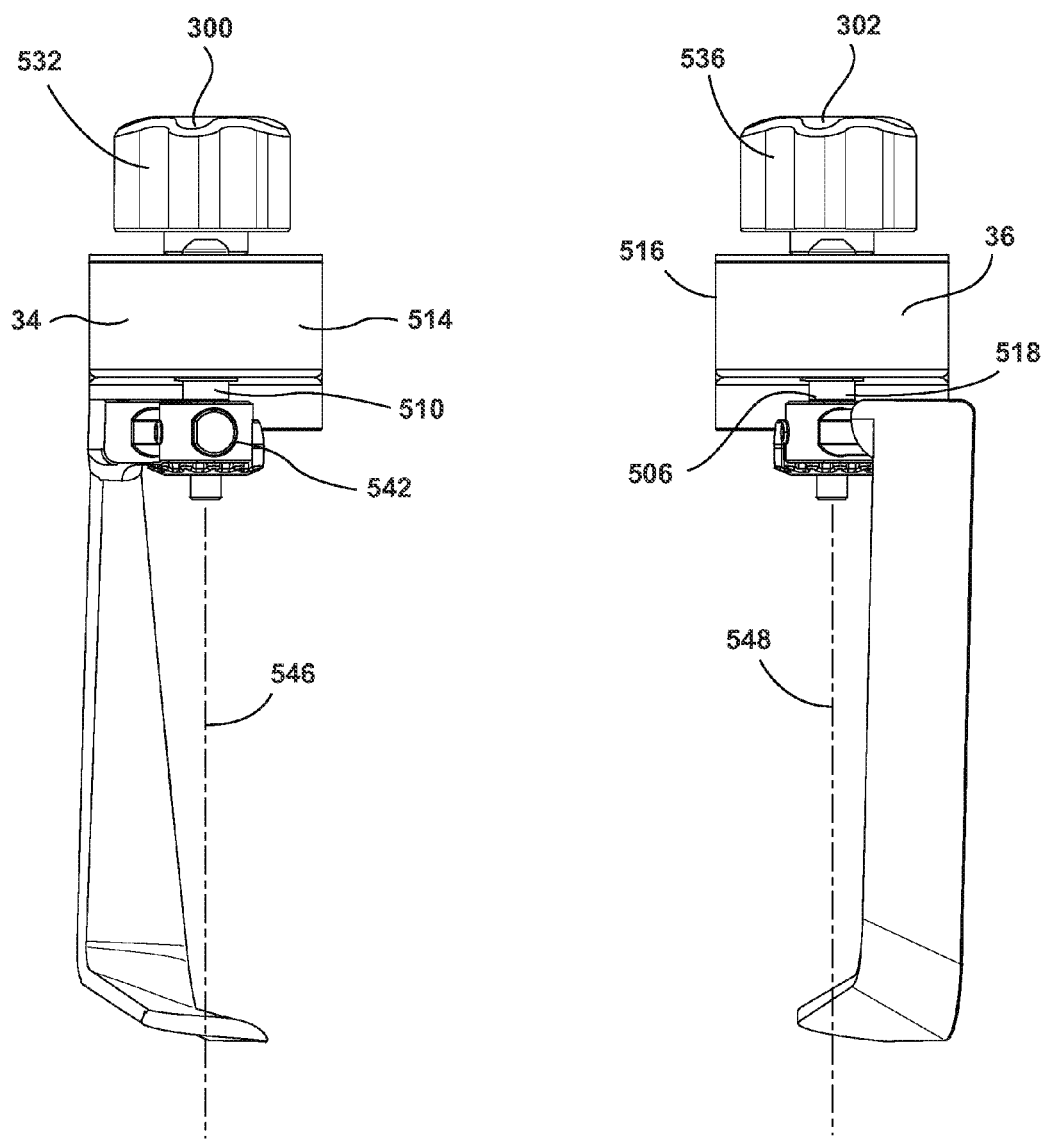
FIG. 20 is a front elevational view of the drive arms of FIG. 19.
Figure 21:
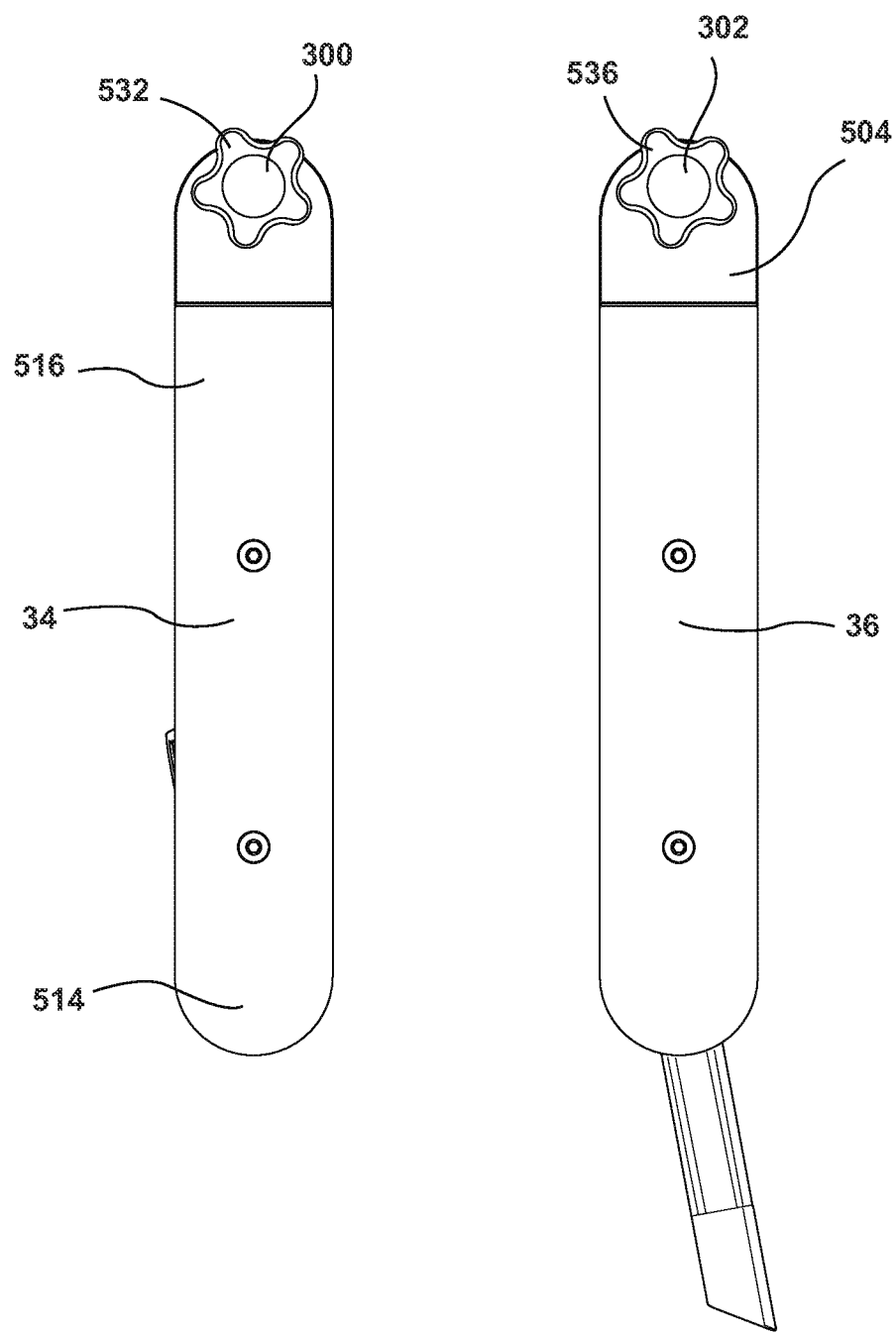
FIG. 21 is a top plan view of the drive arms of FIG. 19.

As illustrated in FIGS. 19 and 20, first and second tool receptacles 542, 544 are disposed within the tool impellers 518 of the first and second drive arms 34, 36, respectively. The each tool impeller 518 of the first and second drive arms, 34, 36 defines first and second rotational mixing axes 546, 548 that are selectively and substantially intersect the first and second well centers 356, 358.

In alternate embodiments, the drive system 40 can include a drive gear coupled to the electrical motor 78 and first and second idler gears coupled with and operably engaged with the drive gear where the first and second drive shafts 480, 482 are coupled with the idler gears and where the drive shafts 480, 482 define first and second rotational axes of the idler gears. This embodiment can operate without a drive belt 478 and can substantially prevent slippage between the drive belt 478 and the first and second idler gears and the drive gear.

Figure 2:
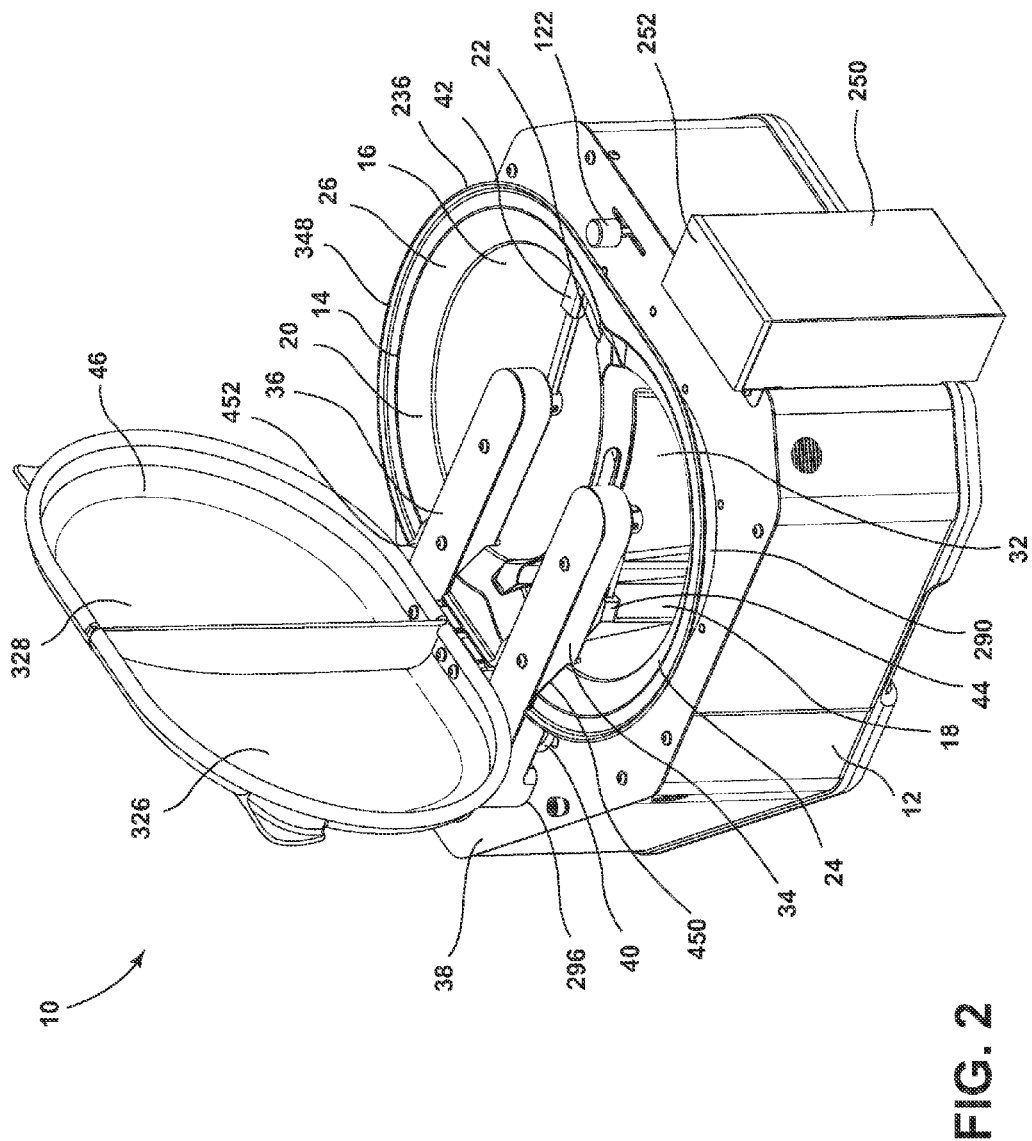
FIG. 2 is a top perspective view of the cooking appliance kit of FIG. 1 showing the lid in an open position.
Figure 3:
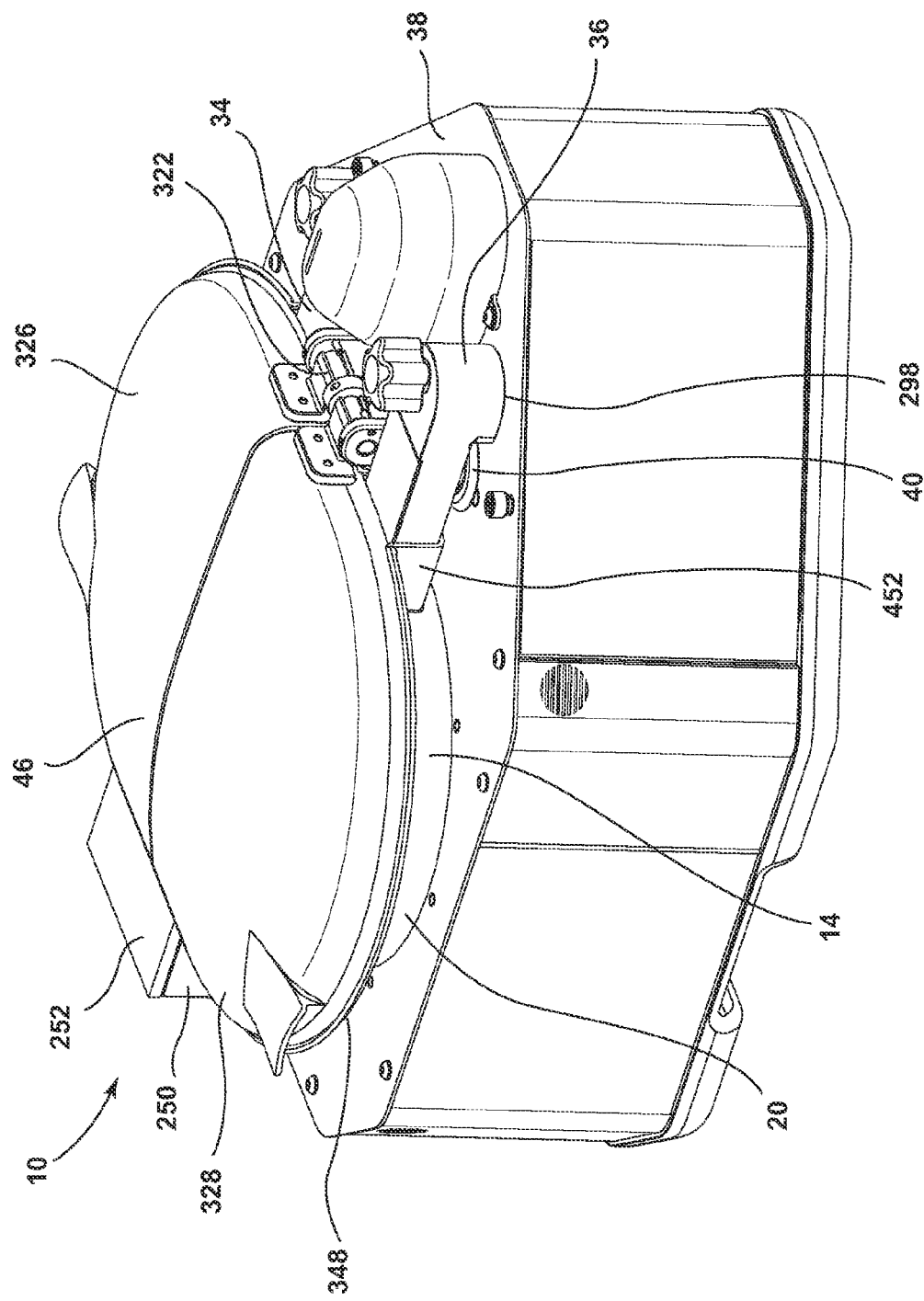
FIG. 3 is a top rear perspective view of the cooking appliance kit of FIG. 1.
Figure 4:
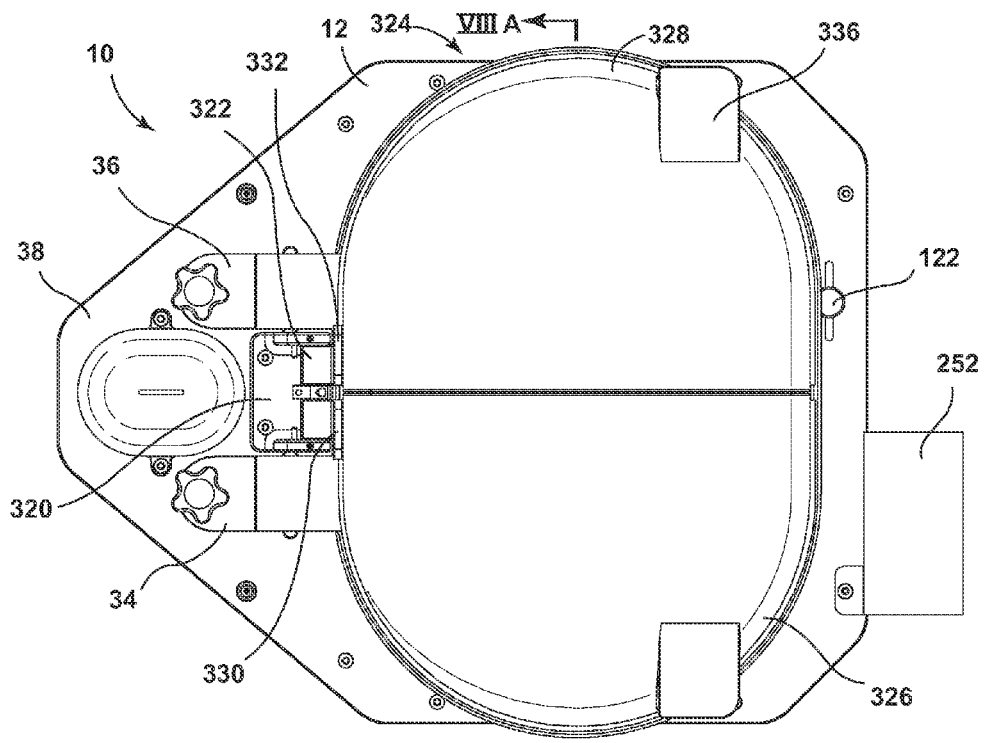
FIG. 4 is a top plan view of the cooking appliance kit of FIG. 1.
Figure 5:
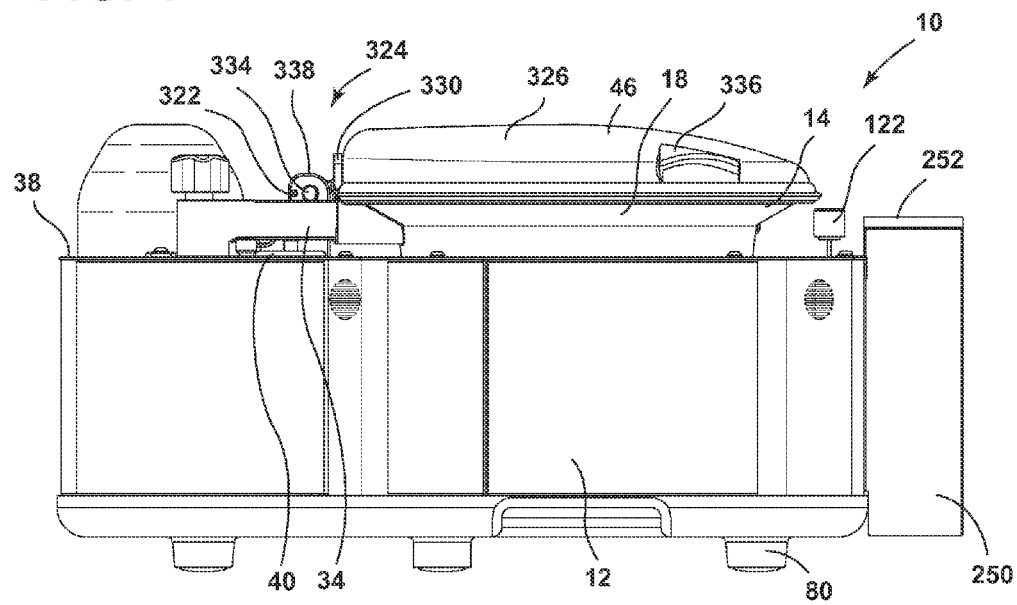
FIG. 5 is a first side elevational view of the cooking appliance kit of FIG. 1.
Figure 6:
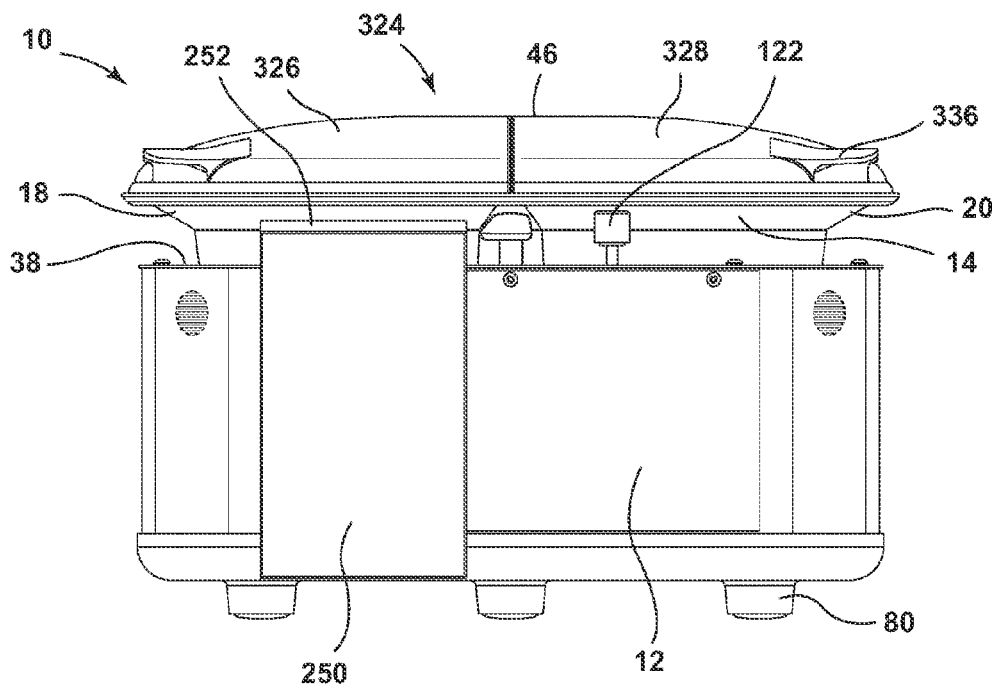
FIG. 6 is a front side elevational view of the cooking appliance kit of FIG. 1.
Figure 7:
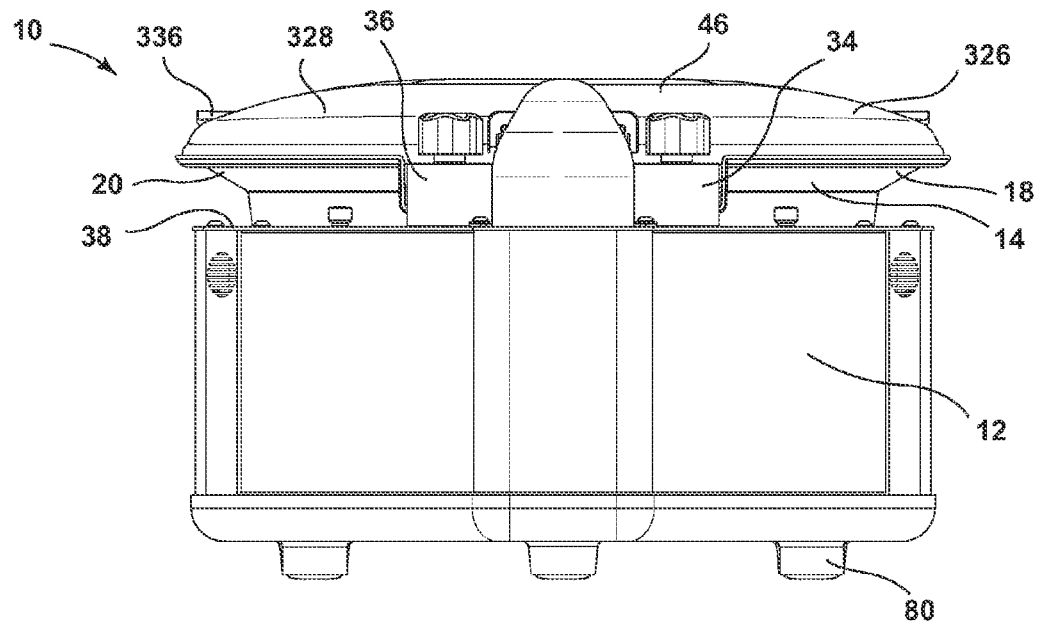
FIG. 7 is a rear side elevational view of the cooking appliance kit of FIG. 1.
Figure 8:
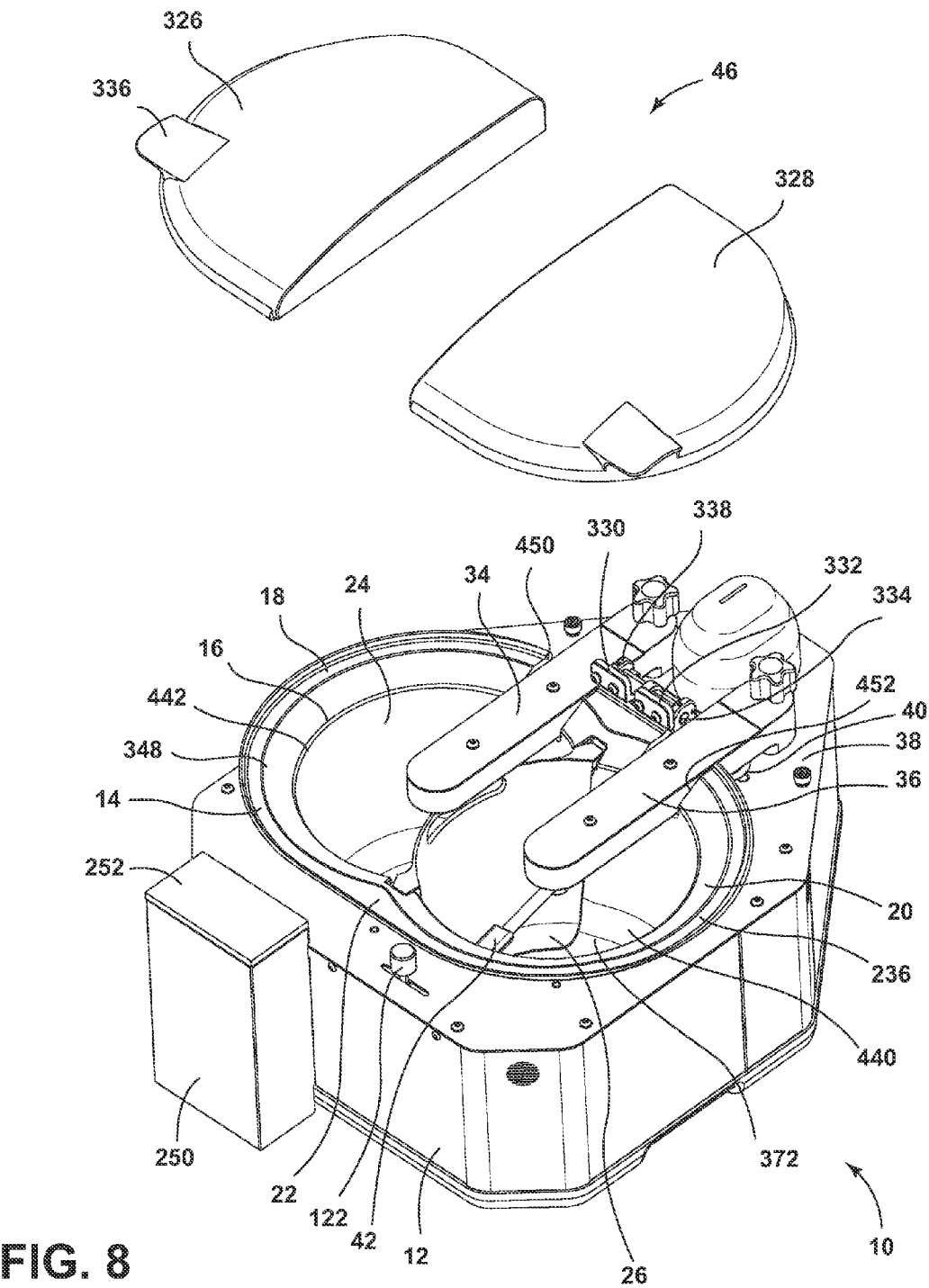
FIG. 8 is a partially exploded top perspective view of the cooking appliance kit of FIG. 1 with the lids removed.

Referring again to the illustrated embodiment of FIGS. 2 and 3, when the drive arms 34, 36 are selectively engaged with the housing 12 in the first and second drive interfaces 296, 298, the drive arms 34, 36 are received by the first and second drive arm receptacles 450, 452 of the flared rim flange 348 of the cooking vessel 14. In this manner, the first and second lid members 326, 328 are configured to define closed positions wherein the perimeters of the first and second lid members 326, 328 engage the flared rim flange 348 of the cooking vessel 14, without the first and second lid members 326, 328 interfering with the extension of the first and second drive arms 34, 36 over the first and second wells 24, 26, respectively.

As discussed above, and as further shown in FIG. 8, the selective engagement of the arcuate dividing wall 32 within the intermediate necked portion 22 defines a non-mixing area within the crescent cooking zone 442. In this configuration, the first or second drive arm 34, 36 that extends over the crescent cooking zone 442 can be selectively removed without interfering with the selectively engaged first or second drive arm 34, 36 coupled to the drive system 40 and that extends over the circular cooking zone 440 and defining one of the first and second mixing zones 370, 372 within the circular cooking zone 440.

It is contemplated that drive arm spacers can be inserted into at least one of the first and second drive arm receptacles 450, 452 when either the first drive arm 34, the second drive arm 36, or both are disengaged from the housing 12. The drive arm spacers can be configured to have a cross-sectional shape similar to that of the first and second drive arm receptacles 450, 452. In this manner, the drive arm spacers can selectively and substantially occupy the first and second drive arm receptacles 450, 452 to substantially prevent contents of the cooking vessel 14 from being expelled from the cooking vessel 14 through the first or second drive arm receptacles 450, 452 during use of the cooking appliance kit 10.

Referring back to the illustrated embodiments as shown in FIGS. 8-9 and 19-22, the stirring and flipping wands 42, 44 are configured for selective engagement within at least one of the first and second tool receptacles 542, 544. The selective engagement of the stirring and flipping wands 42, 44 further defines the first and second mixing zones 370, 372 (shown in FIG. 9). The selective engagement of the first and second drive arms 34, 36 to the drive system 40 further defines a mixing pattern of the first and second mixing zones 370, 372 wherein the first and second mixing zones 370, 372 at least partially intersect. The drive system 40 and the drive arms 34, 36 are further configured such that the rotation of the stirring or flipping wand 42, 44 connected to the first drive arm 34 does not interfere with the rotational movement of the stirring or flipping wand 42, 44 selectively coupled with the second drive arm 36 as the stirring and flipping wands 42, 44 rotate through the intermediate necked portion 22. In this manner, the first and second mixing zones 370, 372 are allowed to intersect without the stirring and flipping wands 42, 44 colliding during operation of a mixing function at the cooking appliance kits 10.

As illustrated in FIG. 19, the drive belt 478 couples to the drive wheel 470 and first and second idler wheels 472, 474 creates a common directional rotation of the first and second idler wheels 472, 474 thereby creating a common directional of rotation for the remainder of the drive system 40 and the drive arms 34, 36. In this manner, the stirring and flipping wands 42, 44 can be configured to rotate in the same direction (i.e. clockwise or counterclockwise).

In alternate embodiments, the drive system 40 and the drive arms 34, 36 can be configured to have opposite directional rotations such that one of the stirring or flipping wands 42, 44 will rotate clockwise and the other stirring or flipping wand 42, 44 will rotate counterclockwise. By way of explanation and not limitation, this opposite rotation can be accomplished by two drive belts where one drive belt couples the drive gear 470 to the first idler wheel 472 and the second drive belt couples the first idler wheel 472 to the second idler wheel 474. Alternatively, the configuration of the connection between the drive train 506 and the engagement gear 502 can create the opposite directional rotation of the first and second drive arms 34, 36.

Figure 23:
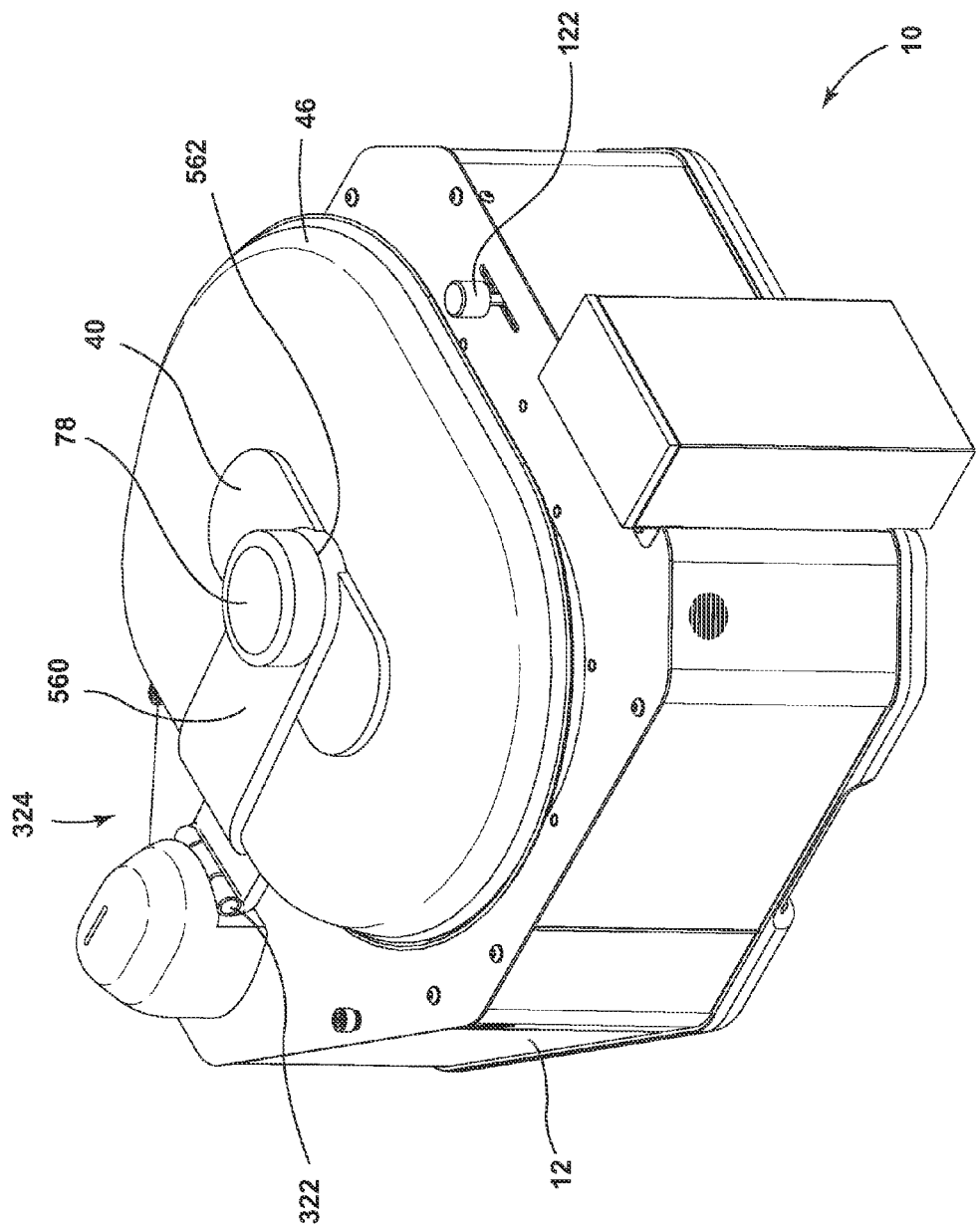
FIG. 23 is a top perspective view of an alternate embodiment of the cooking appliance kit.
Figure 24:
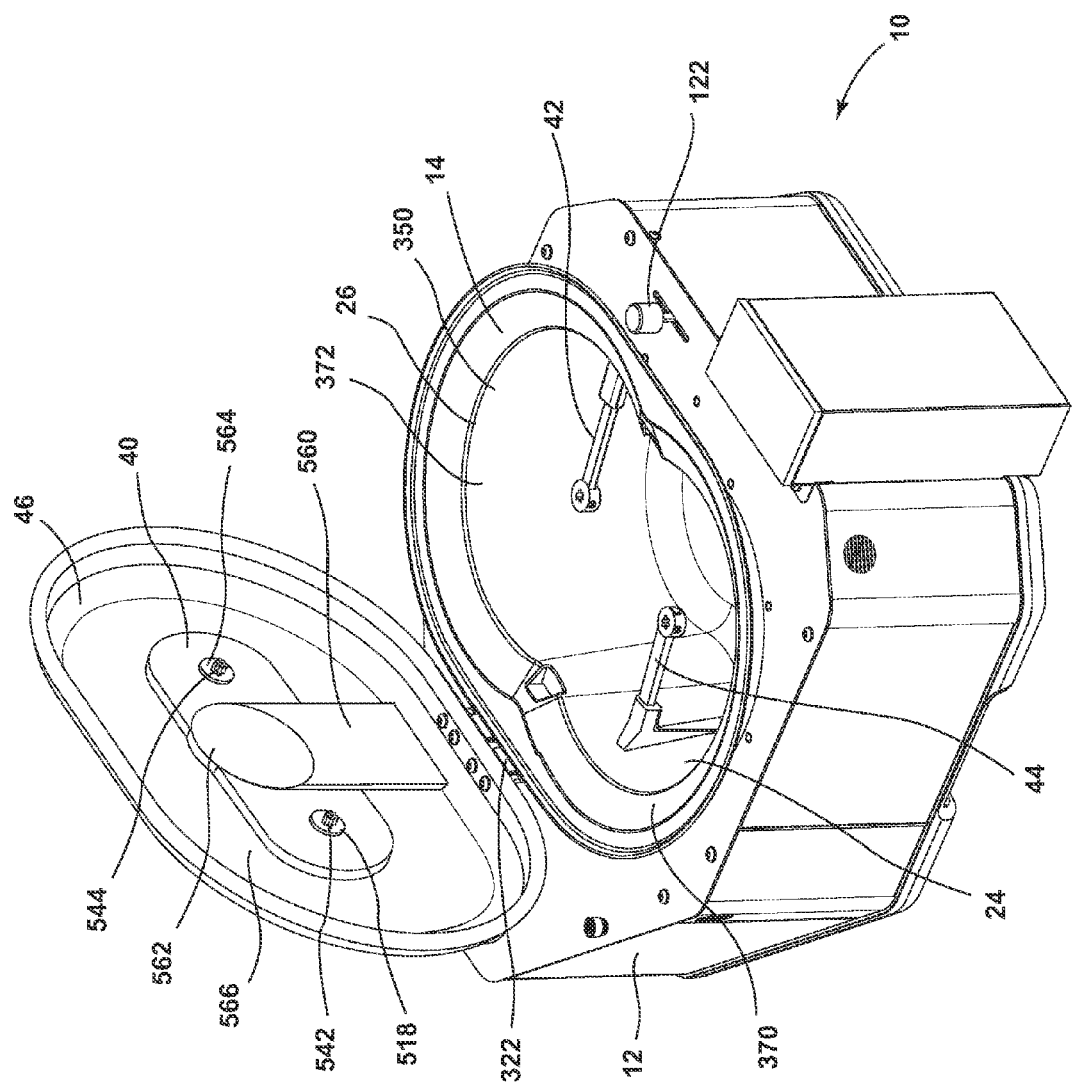
FIG. 24 is a top perspective view of the cooking appliance kit of FIG. 23 with the lid in the open position.
Figure 25:
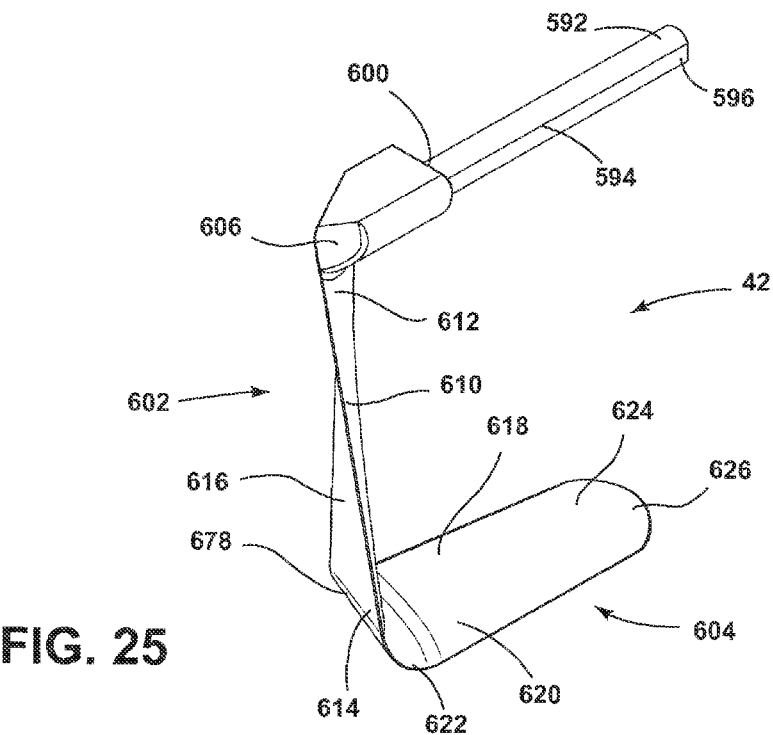
FIG. 25 is a top perspective view of one embodiment of a stirring wand.
Figure 26:
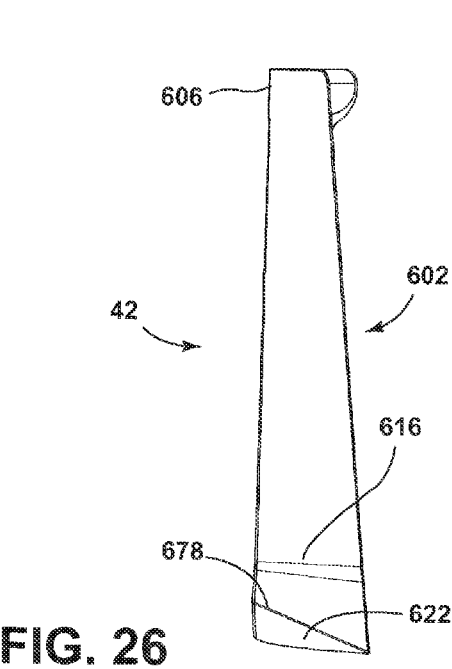
FIG. 26 is a first side elevational view of the stirring wand of FIG. 25.
Figure 27:
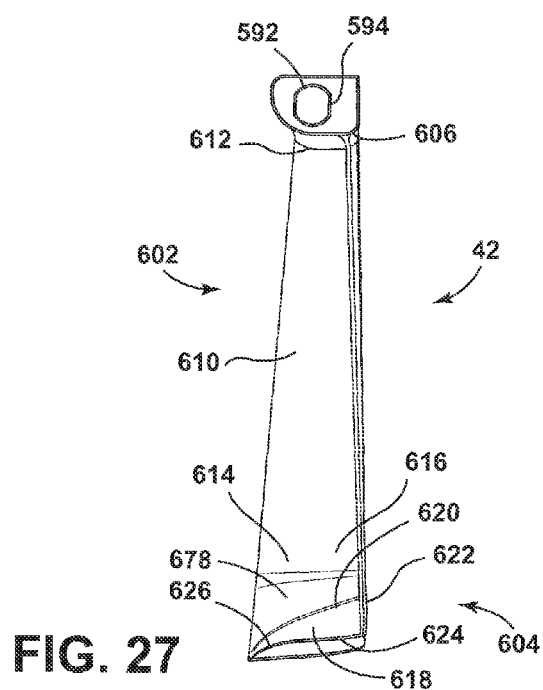
FIG. 27 is a second side elevational view of the stirring wand of FIG. 25.
Figure 28:
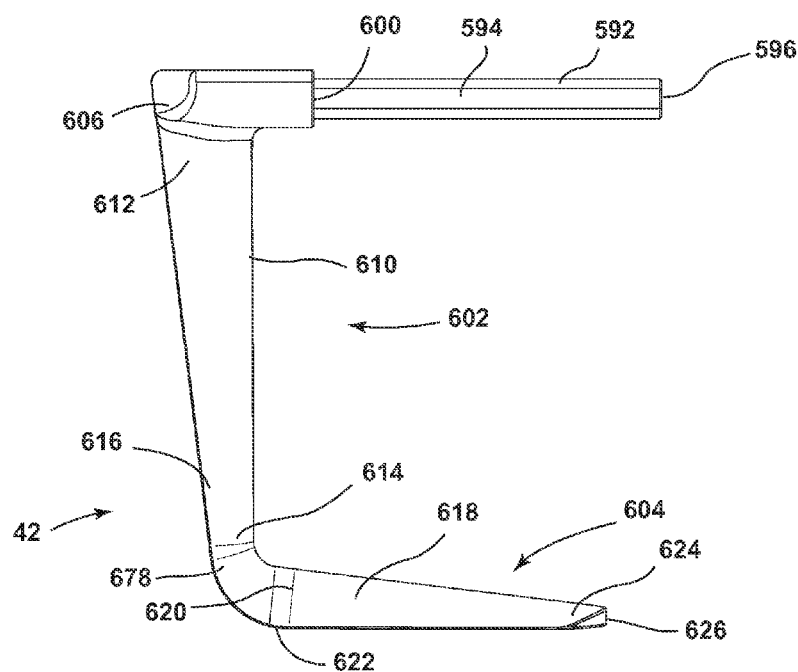
FIG. 28 is a third side elevational view of the stirring wand of FIG. 25.
Figure 29:
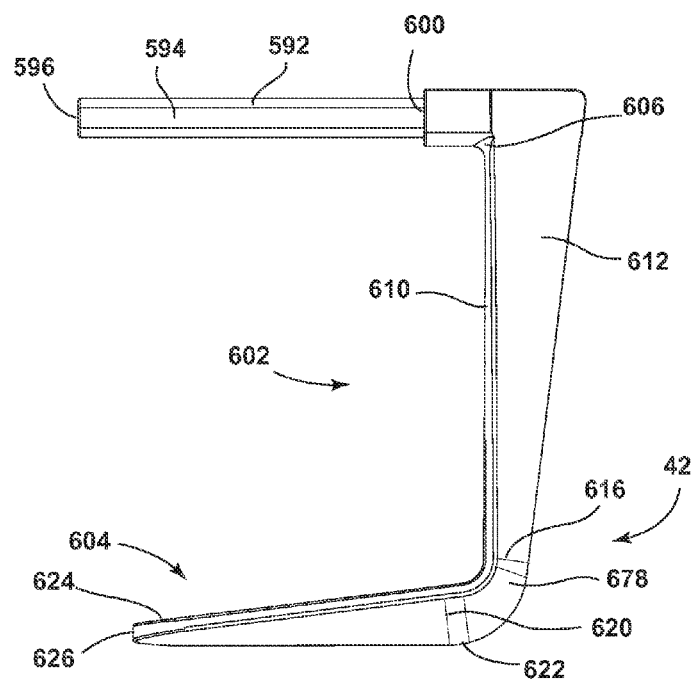
FIG. 29 is a fourth side elevational view of the stirring wand of FIG. 25.
Figure 30:
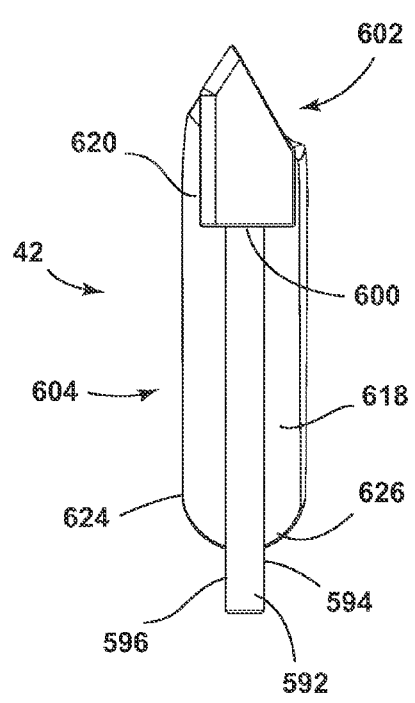
FIG. 30 is a top plan view of the stirring wand of FIG. 25.
Figure 31:
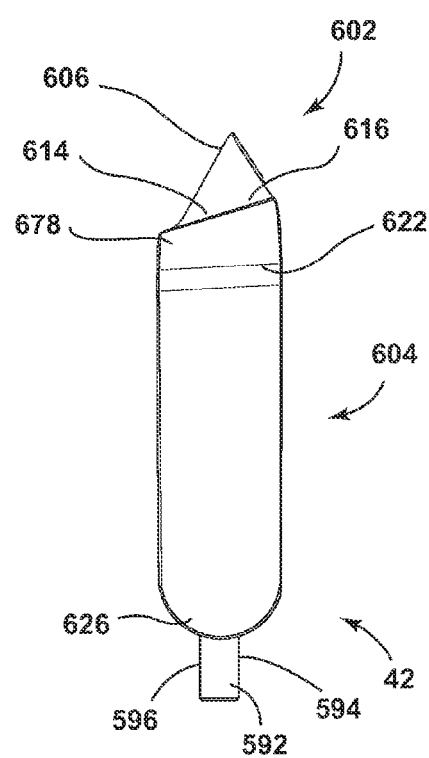
FIG. 31 is a bottom plan view of the stirring wand of FIG. 25.

In an alternate embodiment as shown in FIGS. 23 and 24, the drive system 40 is disposed within the lid assembly 324 such that when the lid 46 is in the closed position, the drive system 40 is disposed over the cooking vessel volume 350. A service channel 560 is disposed within the lid 46 and extends from the drive system 40 to the lid hinge 322 and into the housing 12, such that the drive system 40 can be coupled with the controls 122 to create a fluid communication between the drive system 40 and the controls 122 while still containing equipment and wiring within the service channel 560. A drive gear 562 and idler gears 564 are disposed on the underside 566 of the lid 46 in an operable communication with the motor 78. In this alternate configuration, no drive arms are present and the tool impellers 518 and tool receptacles 542, 544 are disposed at centers of the idler gears 564.

In addition, as shown in FIGS. 23 and 24, when the lid 46 is in the closed position, the idler gears 564 are disposed above the first and second wells 24, 26, respectively. The selective engagement of the stirring and flipping wands 42, 44 within the first and second tool receptacles 542, 544 defines the first and second mixing zones 370, 372 within the cooking vessel 14, wherein the first and second mixing zones 370, 372 at least partially intersect. The lid 46 and the service channel 560 cooperate to provide rotational movement of the lid 46 without interfering with the equipment and wiring disposed in the service channel 560.

Referring now to FIGS. 25-47 of the illustrated embodiment, another aspect of the cooking appliance kit 10, includes a mixing tool set including a pair of stirring wands 42, a pair of flipping wands 44, and a pair of combination wands 590 having stirring and flipping surfaces. Each of the stirring, flipping and combination wands 42, 44, 590 is configured for selective engagement in either of the first and second tool receptacles 542, 544 (FIGS. 19-20). In addition, each of the stirring, flipping and combination wands 42, 44, 590 includes a substantially cylindrical coupling arm 592 having a first end 596 configured to be received by either of the first or second tool receptacles 542, 544 (shown in FIGS. 19-20). The cylindrical coupling arm 592 further includes at least one orienting surface 594, that can include a flat surface along the length of the coupling arm 592 that is configured to orient the stirring, flipping and combination wands 42, 44, 590 within the tool receptacles 542, 544 such that the stirring, flipping and combination wands 42, 44, 590 are in a substantially vertical position.

As best illustrated in FIGS. 25-31, the stirring wand 42 includes a substantially vertical stirring portion 602 configured to slide along the first or second rounded ends 18, 20 of the cooking vessel 14 and a substantially horizontal stirring portion 604 configured to slidably rotate over the cooking vessel base 352 (shown in FIG. 12). The coupling arm 592 of the stirring wand 42 is coupled with an upper end 606 of the substantially vertical stirring portion 602 at a second end 600 of the coupling arm 592. The first end 596 of the coupling arm 592, as described above, is configured to engage the first or second tool receptacle 542, 544 (shown in FIGS. 19 and 20).

As shown in FIGS. 25-31, the substantially vertical stirring portion 602 includes a first tapered stirring surface 610 defined by a first pitch angle 612 located proximate the upper end 606 of the substantially vertical stirring portion 602 and a second pitch angle 614 located proximate a lower end 616 of the substantially vertical stirring portion. The first pitch angle 612 is greater than the second pitch angle 614. As illustrated, the first and second pitch angles 612, 614 are 60 degrees and 25 degrees, respectively. However, alternate configurations of the first and second pitch angles 612, 614 can be implemented, where the second pitch angle 614 is greater than or equal to the first pitch angle 612, without departing or interfering with the spirit of the illustrated embodiments.

Additionally, as illustrated in FIGS. 25-31, a second tapered stirring surface 618 is defined by the substantially horizontal stirring member 604. The second tapered stirring surface 618 includes a third pitch angle 620 proximate the lower end 616 of the substantially vertical stirring portion 602 defining a wand base 622 of the substantially horizontal stirring member 604, and a fourth pitch angle 624 proximate a wand tip 626 of the substantially horizontal stirring member 604. As illustrated, the third and fourth pitch angles 620, 624 are 28.7 degrees and 13.75 degrees, respectively. The third pitch angle 620 is greater than the fourth pitch angle 624. However, as discussed above, the configuration of the third and fourth pitch angles 620, 624 can vary such that the fourth pitch angle 624 is greater than or equal to the third pitch angle 620.

Figure 9:
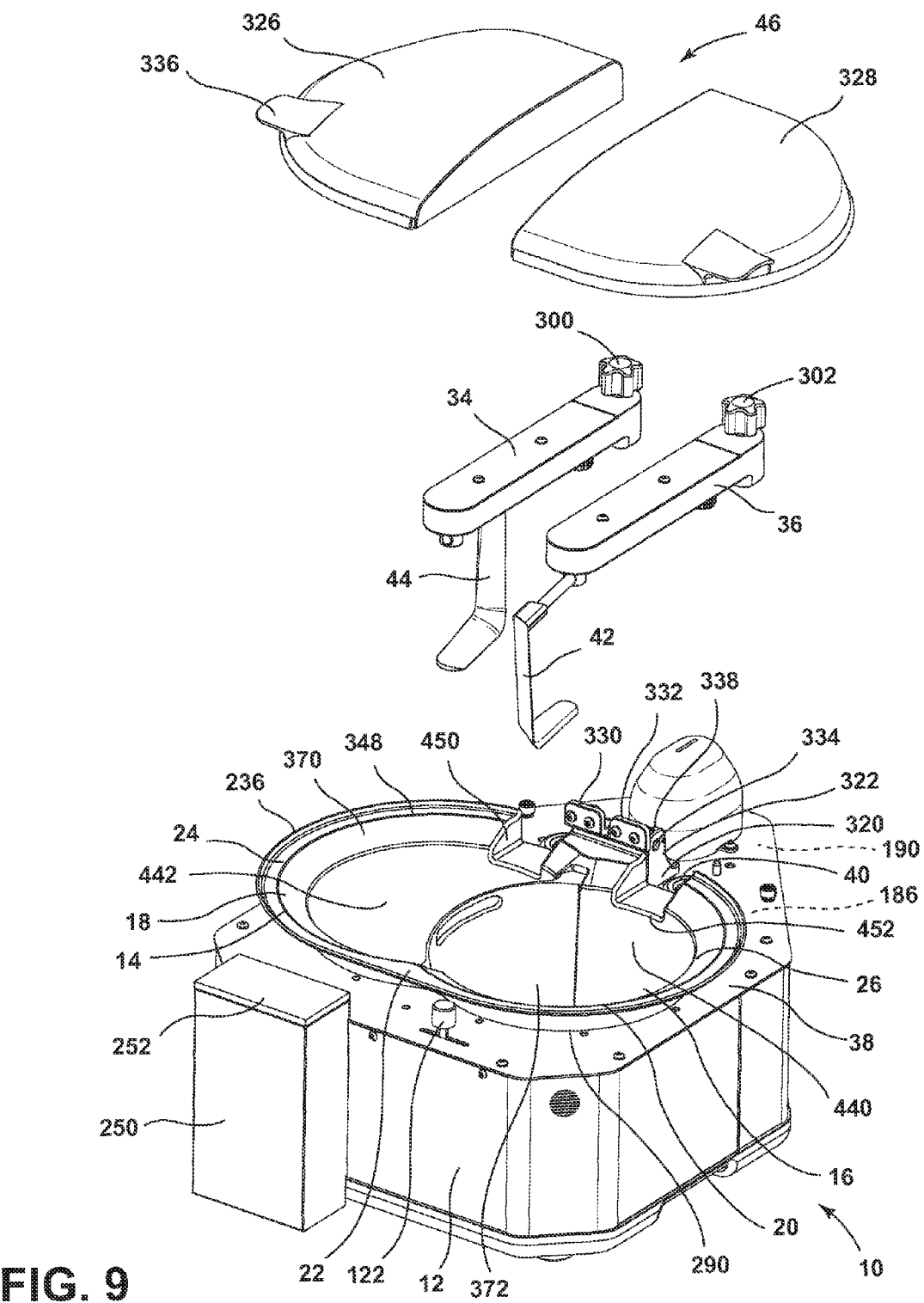
FIG. 9 is an exploded top perspective view of the cooking appliance kit of FIG. 1 with the lid and the drive arms removed.

Also, as illustrated in FIGS. 8-9 and 25-31, the selective operable engagement of the stirring wands 42 within the first and second tool receptacles 542, 544 define the first and second mixing zones 370, 372 that at least partially intersect at the intermediate necked portion 22 (shown in FIG. 9).

In an alternate embodiment of the stirring wand 42, the coupling arm 592 includes a vertical support member that extends along the rotational axis of the tool impeller 518 and connects with the tip of the substantially horizontal stirring member. In this embodiment, the first end 596 of the coupling arm 592 engages at least one of the first and second tool receptacles 542, 544 in a substantially horizontal orientation. A curved realignment member extends from the first end 596 of the coupling arm 592 and is configured to realign at least a portion of the coupling arm 592 and the vertical supporting member of the coupling arm 592 within the rotational axis of the tool impeller 518 (similar to as shown in FIGS. 32-39).

Referring again to the illustrated embodiments as best shown in FIGS. 32-39, the flipping wand 44 includes a vertical support member 630 with an upper portion 656 that defines the coupling arm 592 and a lower portion 658 that extends to a substantially horizontal flipping portion 632 that includes a bottom surface 634 that slidably rotates over the cooking vessel base 352 (shown in FIG. 12) and a top surface 636 that includes a proximal portion 638, an intermediate portion 640 and a distal portion 642 where the height of the intermediate portion 640 is less than the height of the proximal portion 638 and the distal portion 642. The height of the distal portion 642 is greater than the height of the proximal portion 638. The coupling arm 592 is disposed at the upper portion 656 of the vertical support member 630. The second end 600 of the coupling arm 592 couples to a curved realignment member 644 that connects the coupling arm 592 to the lower portion 658 of the vertical support member 630, and orients the lower portion 658 of the vertical support member 630 within the rotational axis of the tool impeller 518 (FIGS. 19 and 20). The lower portion 658 couples to the substantially horizontal flipping portion 632 proximate the distal portion 642.

As illustrated in FIGS. 32-39, the substantially horizontal flipping portion 632 of the flipping wand 44 defines a substantially arcuate leading edge 646 disposed proximate the bottom surface 634. A tapered flipping surface 648 is defined by the substantially horizontal flipping portion 632 where the tapered flipping surface 648 extends from the bottom surface 634 to the top surface 636. The tapered flipping surface 648 includes a first flipping angle 650 proximate the proximal portion 638, a second flipping angle 652 proximate the distal portion 642, and a third flipping angle 654 proximate the intermediate portion 640. The third flipping angle 654 is less than the first and second flipping angles 650, 652 and the second flipping angle 652 is less than the first flipping angle 650. As illustrated, the first, second, and third flipping angles, 650, 652, 654 are 62.8 degrees, 49.8 degrees, and 38.8 degrees, respectively. In addition, the selective engagement of the flipping wands 44 within the first and second tool receptacles 542, 544 defines the first and second mixing zones 370, 372 within the first and second wells 24, 26 wherein the first and second mixing zones 370, 372 at least partially intersect within the intermediate necked portion 22 (shown in FIG. 9).

In an alternate embodiment of the flipping wand 44, the coupling arm 592 extends horizontally from the first end 596 to the second end 600 that couples with the upper portion 656 of the vertical support member 630. The vertical support member 630 extends from the upper portion 656 coupled with the coupling arm 592 to the lower portion 658 that is coupled to the substantially horizontal flipping portion 632 distal from the distal portion 642.

As discussed above, in various alternate embodiments, the configuration of the first, second and third flipping angles 650, 652, 654 can vary such that the second flipping angle 652 can be greater than or equal to the first flipping angle 650 and the third flipping angle 654 can be greater than or equal to the first or second flipping angles 650, 652, or both.

Figures 46, 47:
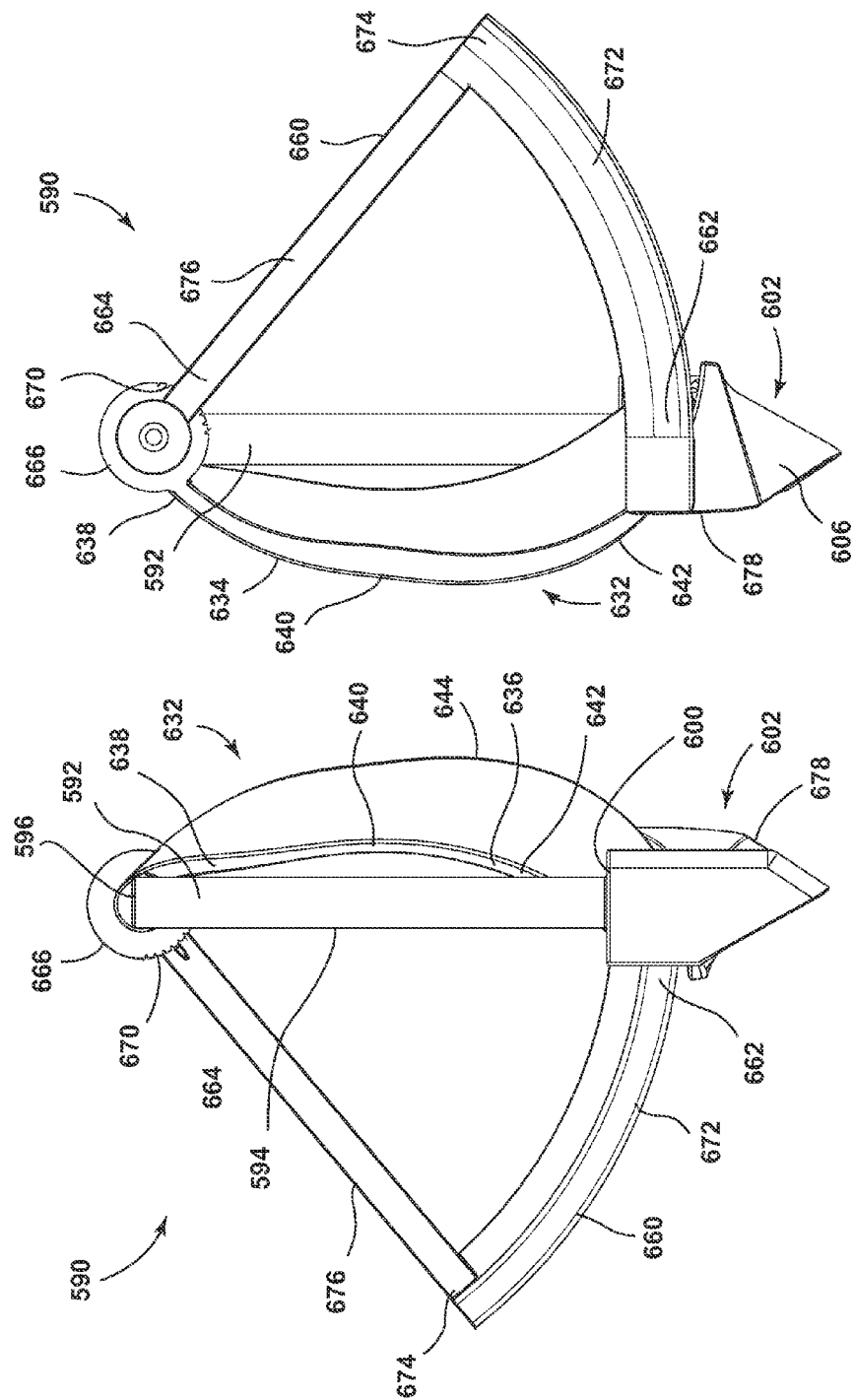
FIG. 46 is a top plan view of the combination wand of FIG. 40.
FIG. 47 is a bottom plan view of the combination wand of FIG. 40.

Referring once again to the illustrated embodiments, as best illustrated in FIGS. 40 47, the combination wand 590 includes the substantially vertical stirring portion 602 of the stirring wand 42 and the substantially horizontal flipping portion 632 of the flipping wand 44. The substantially vertical stirring portion 602 is configured to slide along the first or second rounded ends 18, 20 of the cooking vessel 818 and the substantially horizontal flipping portion 632 includes the bottom surface 634 that slidably rotates over the cooking vessel base 352 (shown in FIG. 12) and the top surface 636 that includes the proximal portion 638, the intermediate portion 640, and the distal portion 642, where the height of the intermediate portion 640 is less than the height of the proximal portion 638 and the distal portion 642. The height of the distal portion 642 is greater than the height of the proximal portion 638. The combination tool 590 further includes a coupling arm 592 having a first end 596 that is configured to selectively engage the first or second tool receptacle 542, 544 (shown in FIGS. 19 and 20), and a second end 600 that is configured to connect to the upper end 606 of the substantially vertical stirring portion 602.

Additionally, as shown in FIGS. 40-47, the substantially vertical stirring portion 602 includes the tapered stirring surface 610 defined by the first pitch angle 612 proximate the upper end 606 and the second pitch angle 614 proximate the lower end 616 of the substantially vertical stirring portion 602. The substantially horizontal flipping portion 632 defines the tapered flipping surface 648 that extends from the bottom surface 634 to the top surface 636. The tapered flipping surface 648 includes the first flipping angle 650 proximate the proximal portion 824, the second flipping angle 652 proximate the distal portion 642, and the third flipping angle 654 proximate the intermediate portion 640. The third flipping angle is less than the first and second flipping angles 650, 652 and the second flipping angle 654 is less than the first flipping angle 650. As discussed above, in various embodiments, the pitch and flipping angles can vary such that the second pitch angle 614 is greater than or equal to the first pitch angle 612. Also, in other embodiments, the second flipping angle 652 can be greater than or equal to the first flipping angle 650 or the third flipping angle 654 can be greater than or equal to the first or second flipping angles 650, 652, or both.

As illustrated in FIGS. 40-47, the substantially horizontal flipping portion 632 is not directly connected to the substantially vertical stirring portion 602. Rather, a support member 660 is coupled to the lower end 616 of the substantially vertical stirring portion 602 at a first support end 662. The second support end 664 of the support member 660 is coupled with and defines a hub 666 where the selective engagement of the combination wand 590 defines a rotational axis of the hub 666 that is selectively and substantially co-linear with the rotational axis of the tool impeller 518. The hub 666 is coupled to the substantially horizontal flipping portion 632 proximate the proximal portion 638. The substantially horizontal flipping portion 632 is configured to at least partially and independently rotate about the rotational axis of the hub 666 between first and second positions. The combination wand 590 can also include a ratcheting mechanism 670 disposed proximate the hub 666, whereby the substantially horizontal flipping portion 632 can be configured in a plurality of positions between the first and second position. Also, the substantially horizontal flipping portion 632 defines the substantially arcuate leading edge 646 disposed proximate the bottom surface 634 of the substantially horizontal flipping portion 632.

As shown in FIGS. 40-47, the support member 660 includes an arcuate member 672 that extends from the lower end 616 of the substantially vertical stirring portion 602 and away from the tapered stirring surface 610 about the rotational axis of the hub 666 to an arcuate member end 674. A spoke 676 extends from the arcuate member end 674 to the hub 666, and thereby provides structural support for the substantially horizontal flipping portion 632.

In an alternate embodiment of the combination wand 590, the substantially horizontal flipping surface 632 is directly coupled with the substantially vertical stirring portion 602 at the lower end 616 of the substantially vertical stirring portion 602. In such an embodiment, there is no structural member 660 and no hub 666, and the substantially horizontal flipping member 632 is not independently rotatable.

Referring again to FIGS. 25-47, the stirring, flipping and combination wands 42, 44, 590 can include a fillet portion 678 that is configured to slide along the perimeter fillet 354 of the cooking vessel 14 (shown in FIG. 9). In the various embodiments of the stirring, flipping and combination wands 42, 44, 590, the fillet portion 678 can be disposed on the lower end 616 of the substantially vertical stirring portion 602, the proximal portion 638 of the substantially horizontal flipping member 632 or at the connection between the substantially vertical stirring portion 602 and the substantially horizontal flipping member 632.

In various embodiments, as illustrated in FIGS. 25-47, the coupling arms 592 of the stirring, flipping and combination wands 42, 44, 590 are made of substantially rigid materials that include, but are not limited to, metals and plastics. The substantially vertical portions and the substantially horizontal portions that are configured to engage the cooking vessel 14 can be made of materials that include, but are not limited to, plastics, ceramics, rubberized materials, or coated metals that will permit the slidable movement of the stirring, flipping and combination wands 42, 44, 590 within the cooking vessel 14 and will not substantially scratch or otherwise mar the first and second wells 24, 26 of the cooking vessel 14.

Figure 48:
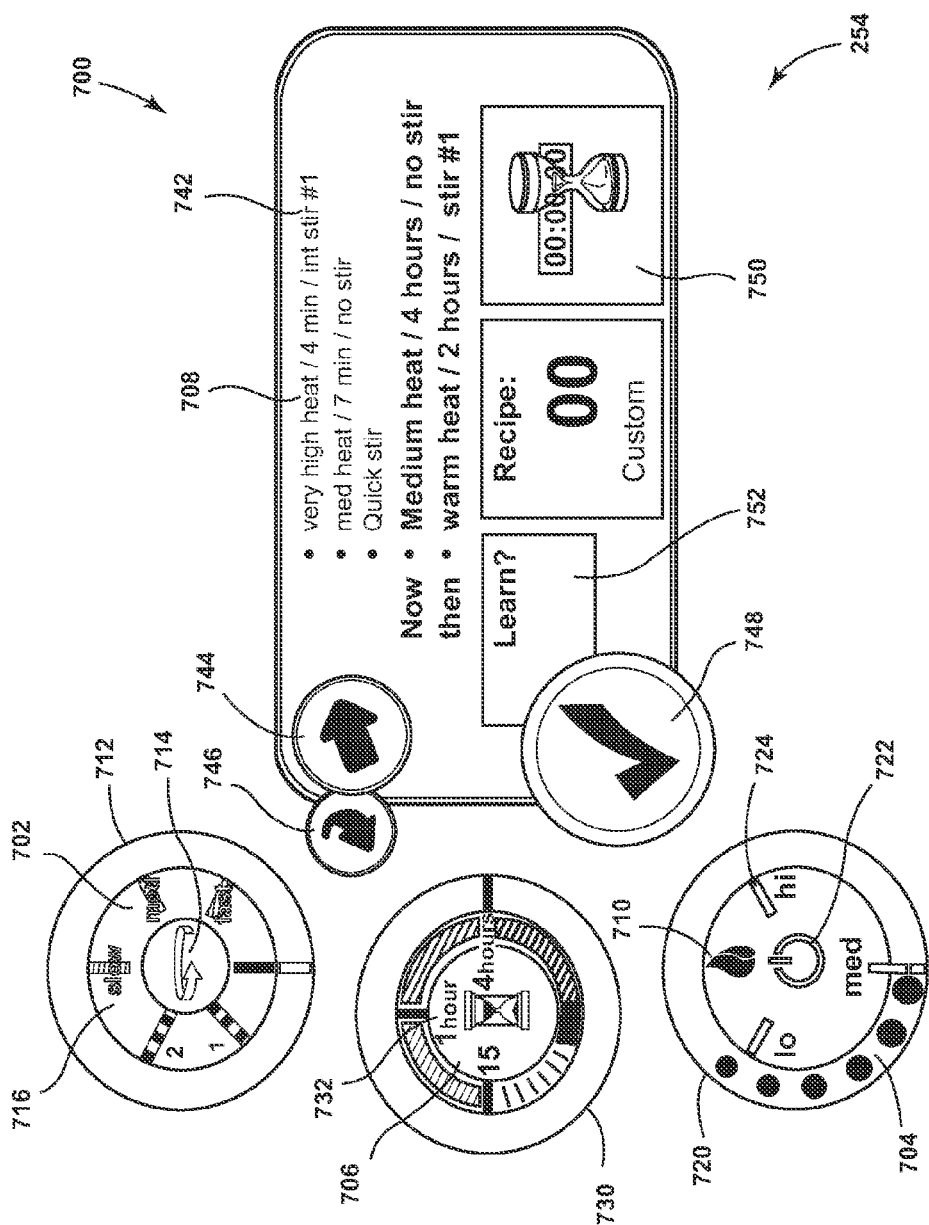
FIG. 48 is a schematic view of one embodiment of the user interface.
Figure 49:
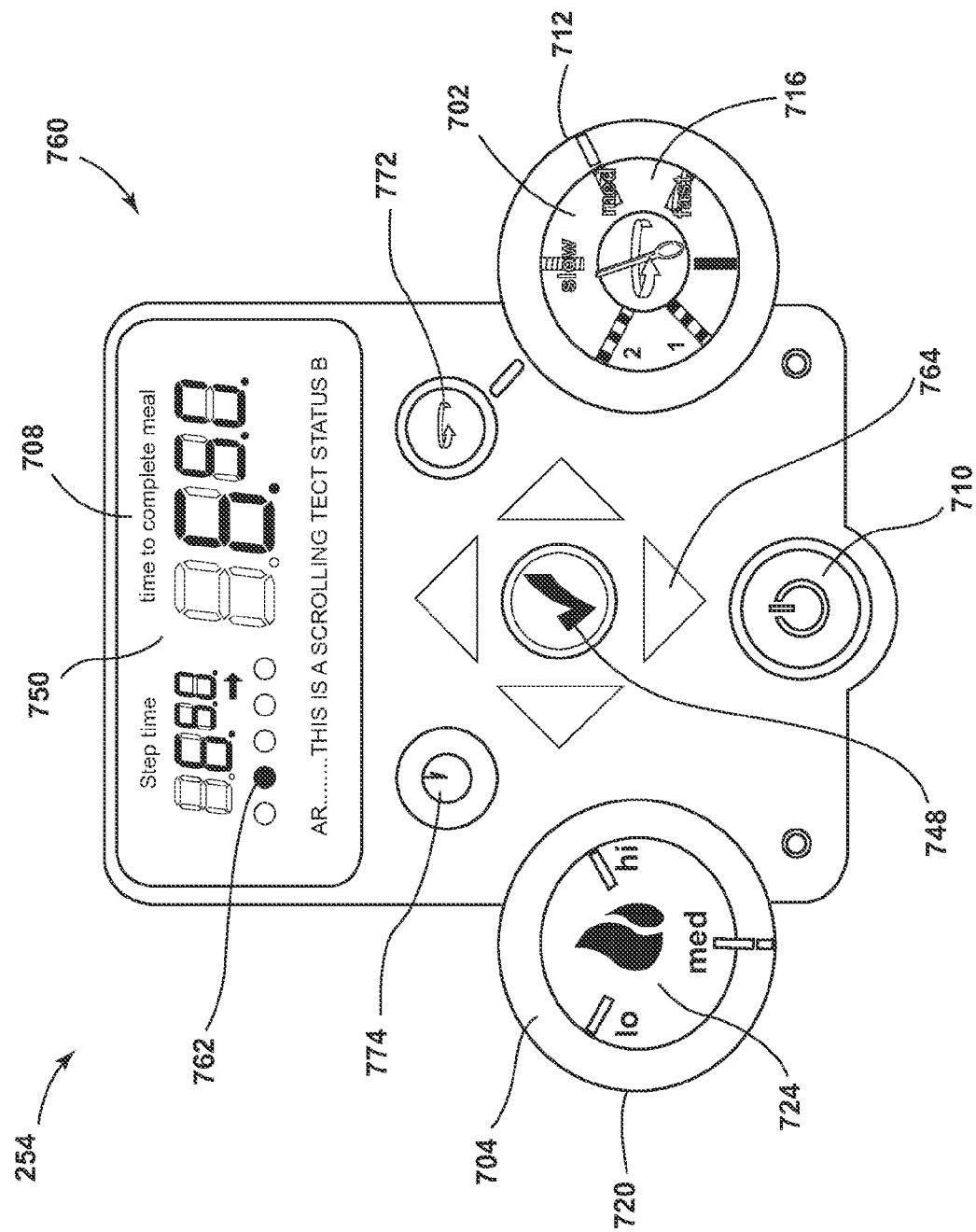
FIG. 49 is a schematic view of an alternate embodiment of the user interface.
Figure 50:
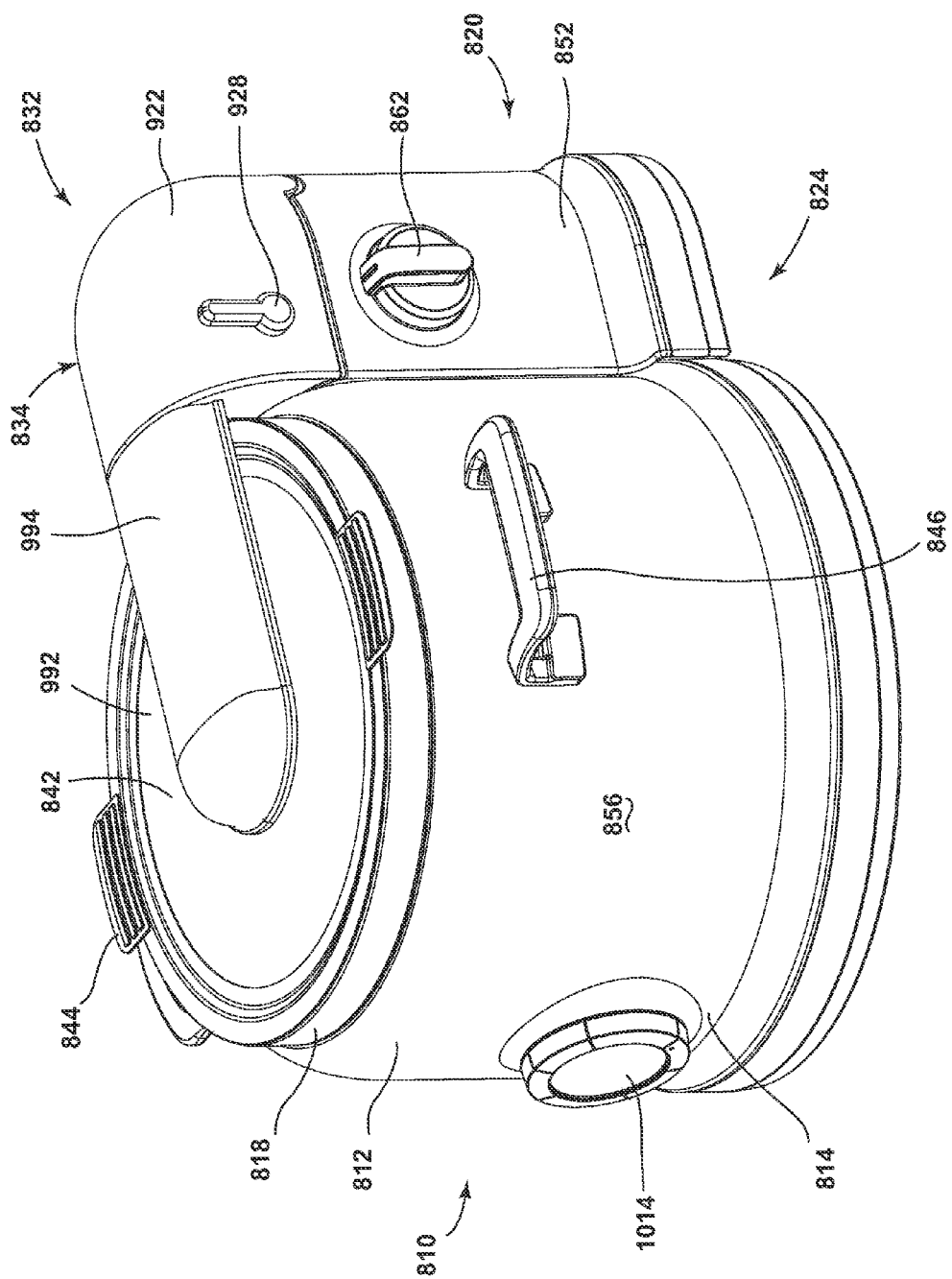
FIG. 50 is a first top perspective view of another embodiment of the cooking appliance.

Referring now to FIGS. 10 and 48-49, and as discussed above, the user interface 254 can be disposed on the housing exterior 124 proximate the front panel 110, wherein the user interface 254 is configured to control the various cooking and mixing functions of the cooking appliance kit 10. In one embodiment of the user interface 254, a designated premium interface 700 can be included with the cooking appliance kit 10. The premium interface 700 can include various features that include, but are not limited to, a stirring interface 702, a heating interface 704, a timer interface 706, a program interface 706, and a power interface 710.

As illustrated in FIG. 48, the stirring interface 702 includes an outer stirring interface 712 comprising a selective click knob for the user to adjust the speed of the stirring function or to set the stirring function to an intermittent stirring configuration. A center stirring interface 714 disposed within the outer stirring interface 712 can be depressed to override the selected stirring speed and initiate a "Quick Stir" function for a pre-selected number of rotations of the stirring, flipping and combination wands 42, 44, 590. The stirring interface 702 contains both auditory and tactile stirring indicia 706 to the user as to the selected stirring function.

Additionally, as shown in FIG. 48, the heating interface 704 can include an outer heating interface 720 having a selective click knob to selectively and independently control the voltage to the first and second distinct heater plates 28, 30 and thereby control the temperature of the first and second wells 24, 26 collectively or independently. The interior of the heating interface 704 includes a heating power on/off button. In alternative embodiments, this power button can be also used as the power interface 710 for the cooking appliance kit 10. The heating interface 704 can include various auditory, visual and tactile heating indicia 724 that instructs the user as to the selected heat settings for the cooking appliance kit 10.

As also shown in FIG. 48, the timer interface 706 can include an outer timer interface 730 to select the desired cook time or stir time for the cooking appliance kit 10. The interior portion of the timer interface includes a visual display with timer indicia 732 that can instruct the user as to the selected timer setting, the remaining cook time, and the remaining stir time.

According to FIG. 48, the program interface 708 can include a selection interface 742 where the user can select from preset recipes stored within a processor or can create a program sequence where mixing, heating and timer settings can be selected in a predetermined sequence to accommodate the user's needs. "Forward" and "Backward" interface members 744, 746 can be configured to allow the user to go through the preselected program steps whereby the user can modify any of the preselected steps programmed into the user interface 254. When the desired program sequence is achieved, the user can select a "Finished" or "Done" interface 748 to finalize the desired sequence. Visual program indicia 750 provide the user with information regarding the program sequence, the time remaining in the program sequence, the steps within the program sequence, and the current step in the program sequence. The program interface 708 can also include a "Learn" interface 752, where the "Learn" interface 752 can store a desired program sequence in the processor for later use.

In alternate embodiments, as shown in FIG. 49, a designated full function user interface 760 can also be included that contains substantially the same user functions as the designated premium interface 700. This designated full function user interface 760 can include substantially similar stirring and heating interfaces 702, 704 with similar outer stirring and heating interfaces 712, 720 and similar stirring and heating indicia 716, 724 to instruct the user as to the selected heating and stirring settings. A program interface 708 is also included where the steps of a preselected sequence or a custom program sequence are indicated by a series of command indicia 762, shown in FIG. 49, as circles, where each command indicia 762 corresponds to a selected or predetermined command sequence. Program indicia 750 relating to the current command sequence can be provided in a scrolling text portion within the program display. The program indicia 750 can also include visual displays for the time remaining in each command sequence and the overall time remaining are also included in the program display. Directional indicia 764 allow the user to navigate the various programs and command sequences to select a pre-loaded program or to create a custom program. The power interface 710 can be included between the directional indicia 764. Also, a "Quick Stir" interface 772, as discussed above, and a timed interface 706 can be included to select the desired cook or stir time, or both. The "Quick Stir" interface and the timer interface 706, as illustrated in FIG. 49, are included in the program interface 708. Additionally, the "Done" or "Finished" interface 748 can also be included in the program interface 708.

As illustrated in FIG. 49, in alternate embodiments of the premium and full function interfaces 700, 760, the directional interface 764 for navigating the program selection interface can include first and second rocker switches to navigate through the various command sequences and also to set the desired time for each command sequence. In addition, in various embodiments, the stirring and heating interfaces 702, 704 can include internal dials that can be turned to select the desired temperature or stirring configuration and where an outer ring includes the stirring and heating indicia 716, 724 that instructs the user as to the selected temperature and stirring configuration.

Referring now to FIGS. 50-72, another embodiment of a cooking appliance kit is illustrated. The reference numeral 810 generally refers to the cooking appliance. It will be understood that features of this embodiment may be used with previously disclosed embodiments and that features of the previously disclosed embodiments may be used with this embodiment. The reference numeral 810 generally refers to an alternate embodiment of a cooking appliance 810 that includes a housing 812 having at least one outer wall 814 that defines a heating cavity 816. The heating cavity 816 is configured to receive a cooking vessel 818. A stirring tower 820 having a supporting foot 822 is selectively operable with the housing 812 between a proximal position 824, wherein the stirring tower 820 is engaged with the housing 812, and a distal position 826, wherein the stirring tower 820 is disengaged from the housing 812. A base 828 of the housing 812 defines a foot receptacle 830 for selectively receiving the supporting foot 822 of the stirring tower 820 when the stirring tower 820 is in the engaged position. A mixing arm 832 is hingedly coupled to the stirring tower 820 and is pivotally operable between a mixing position 834 that is defined by the mixing arm 832 being engaged with a tower drive system 836 of the stirring tower 820, and an idle position 838 that is defined by the mixing arm 832 being disengaged from the tower drive system 836. At least one mixing wand 840 is configured for alternative removable engagement with the mixing arm 832. A lid 842 having at least one lid handle 844 is configured to selectively cover the heating cavity 816. The housing 812 can also include at least one appliance handle 846 disposed on the outer wall 814 of the housing 812.

As shown in FIGS. 53 and 61-64, the supporting foot 822 of the stirring tower 820 includes a base panel 850 for the stirring tower 820. The base panel 850 supports the enclosure for the stirring tower 820, wherein the enclosure includes a primary enclosure member 852 and a secondary enclosure member 854. The secondary enclosure member 854 is configured to include a curved profile that matches the curved profile of an outer surface 856 of the housing 812 of the cooking appliance 810. The primary and secondary enclosure members 852, 854 rest upon the base panel 850 to define a drive system cavity 858 that houses a tower engagement mechanism 860, the tower drive system 836, and a mixing user interface 1014.

Figure 61:
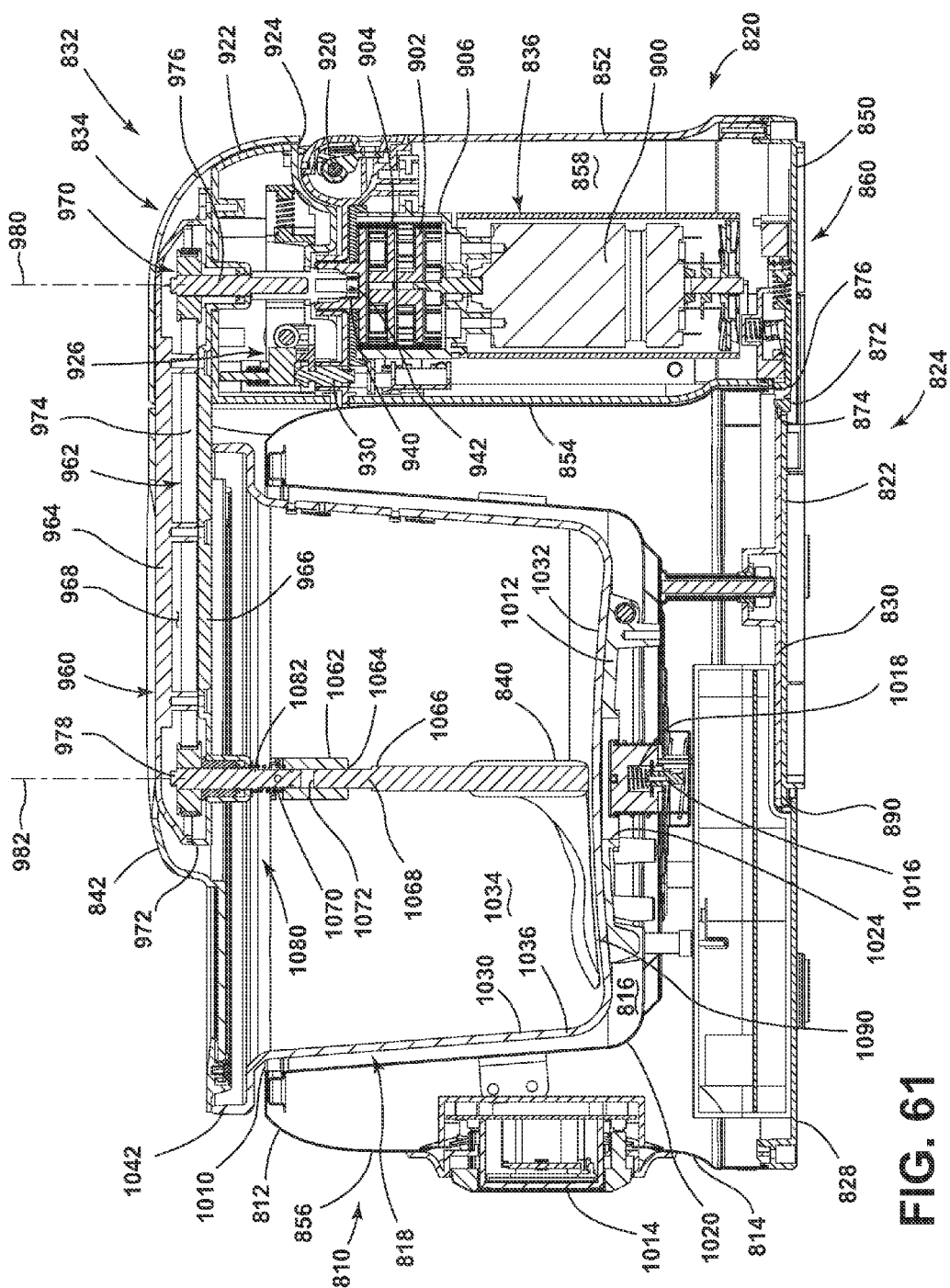
FIG. 61 is a cross-sectional view of the cooking appliance of FIG. 59 taken at line LXI-LXI.
Figure 62:
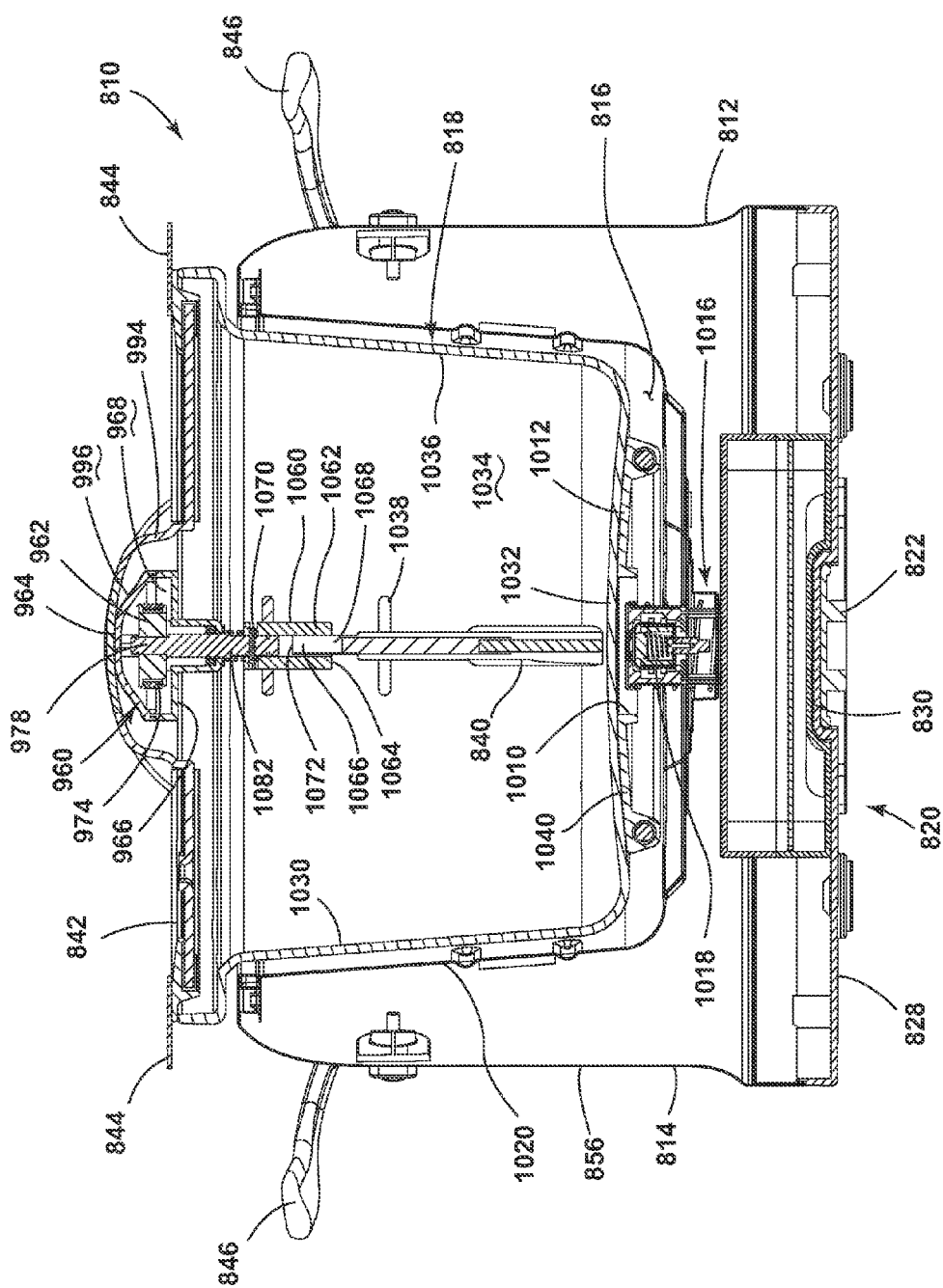
FIG. 62 is a cross-sectional view of the cooking appliance of FIG. 55 taken at line LXII-LXII.
Figure 64:
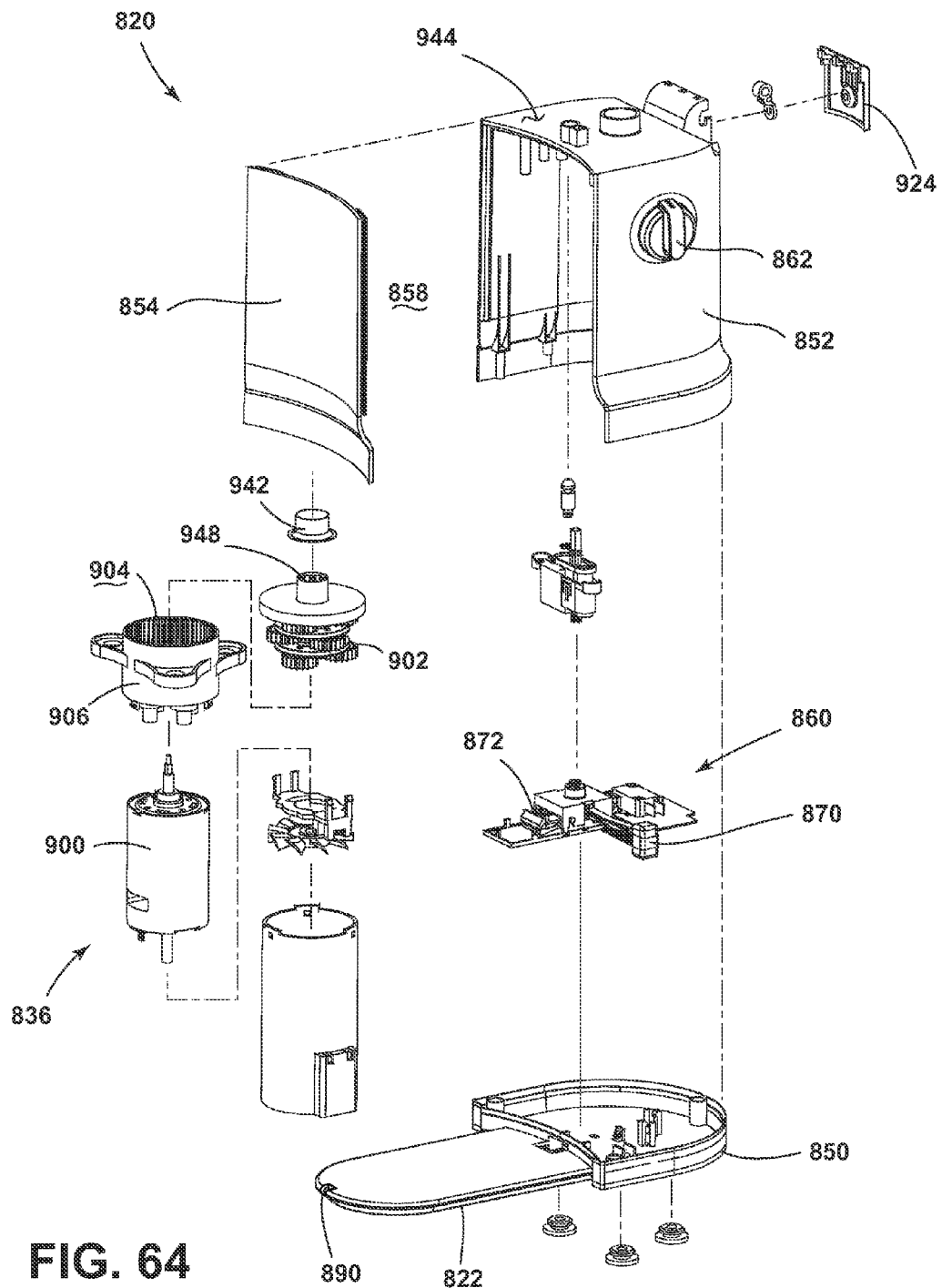
FIG. 64 is an exploded perspective view of one embodiment of the stirring tower.

Referring now to FIGS. 61 and 64, the tower engagement mechanism 860 includes a spring biased latch system having an operable button or switch 870 that is engaged to move a latch member 872 between a coupling position and a release position. A biasing mechanism is configured to maintain the latch member 872 in the coupling position. When the button or switch 870 is engaged, the operation of the button or switch 870 overcomes a biasing force to place the latch member 872 in the release position. When the stirring tower 820 is moved into the proximal position 824, the tower engagement mechanism 860 is configured to interface with the housing 812 and a latch receptacle 874 defined by the outer surface 856 of the housing 812. As the tower 820 is moved into the proximal position 824, an interference member of the latch receptacle 874 first biases the latch member 872 into the release position before the latch member 872 fully engages the latch receptacle 874 of the housing 812. When the tower 820 is fully in the proximal position 824, the latch receptacle 874 of the housing 812 receives the latch member 872. The tower 820 can be released from engagement with the housing 812 and placed in the distal position 826 by the user engaging the button or switch 870 to move the latch member 872 to the downward release position, such that the latch member 872 can pass by an interference member 876 as the tower 820 is slidably removed from engagement with the housing 812. It should be understood that other engagement mechanisms can be disposed within the tower 820 to connect the tower 820 with the housing 812. These engagement mechanisms can include clasps, hasps, clips, latches, and other interference type connections that are configured to selectively dispose the tower 820 proximate the housing 812 in the proximal position 824. It should also be understood that in various embodiments, the cooking appliance 810 does not include the tower engagement mechanism 860 as described above.

Figure 63:
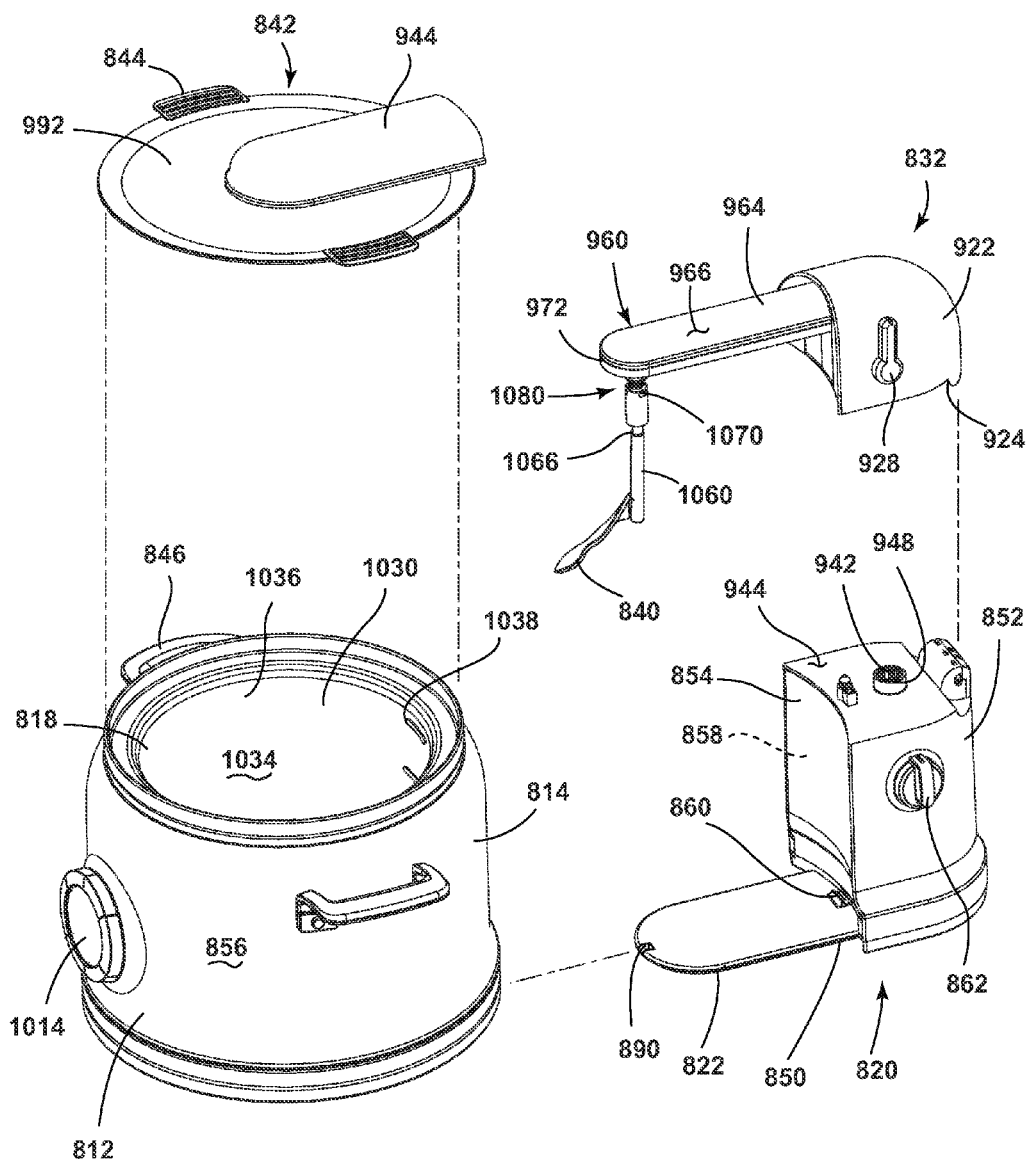
FIG. 63 is a partially exploded top perspective view of the cooking appliance of FIG. 50.

Referring now to FIGS. 61 and 63, when the stirring tower 820 is disposed in the proximal position 824 relative to the housing 812, the stirring tower 820 is in select electrical communication with the housing 812, wherein the stirring tower 820 is configured to receive electrical power, at least from an electrical interface 890 disposed proximate the housing 812. In various embodiments, the electrical interface 890 can be disposed proximate the supporting foot 822 of the stirring tower 820 and the foot receptacle 830 of the base 828 of the housing 812, such that when the stirring tower 820 is selectively disposed within the proximal position 824 and the supporting foot 822 engages the foot receptacle 830, the electrical interface 890 is engaged, and electrical power can be provided to the stirring tower 820. In alternate embodiments, the electrical interface 890 can be disposed proximate the location where the secondary enclosure member 854 of the stirring tower 820 engages the outer surface 856 of the housing 812. In other various embodiments, the stirring tower 820 can include a separate electrical interface 890, such that the stirring tower 820 can draw electrical power from a source other than the cooking appliance 810, such as a household electrical outlet. A data connection can also be included in the electrical interface 890 such that data can be transferred between the housing 812 and the stirring tower 820, during operation of the cooking appliance 810 and the stirring tower 820.

Referring again to FIG. 64, the tower drive system 836 is disposed within the drive system cavity 858. The tower drive system 836 includes a motor 900 and a gearing system 902 that is driven by the motor 900. The gearing system 902 can include a plurality of planetary gears, wherein each of the plurality of planetary gears can be selectively engaged to provide different output speeds of the tower drive system 836. The planetary gears are configured to selectively engage cogs disposed on an inner surface 904 of a gear housing 906 disposed proximate the motor 900. It should be understood that different gearing systems 902 can be included in the tower drive system 836 for the stirring tower 820. Such gearing systems 902 can include, but are not limited to, parallel gear shafts, worm gears, and other similar gears that can be used to operate the tower drive system 836 at different speeds. In addition, it should be understood that the motor 900 disposed within the tower drive system 836 can be a multi-speed motor that provides for alternate output speeds for the tower drive system 836.

The mixing user interface 862, as will be more fully described below, is disposed proximate the primary enclosure member 852. The mixing user interface 862 can include a touch screen, physical switches or buttons, dials, or other similar user interface configured to operate the tower drive system 836.

Referring now to FIGS. 50-52 and 65, the mixing arm 832 is disposed on top of the stirring tower 820 and is hingedly connected to the stirring tower 820 via a hinge pin 920. The mixing arm 832 includes a rotational housing 922 that encloses the hinge assembly and a drive interface 940 that selectively transfers power from the tower drive system 836 into the mixing arm 832.

Figure 51:
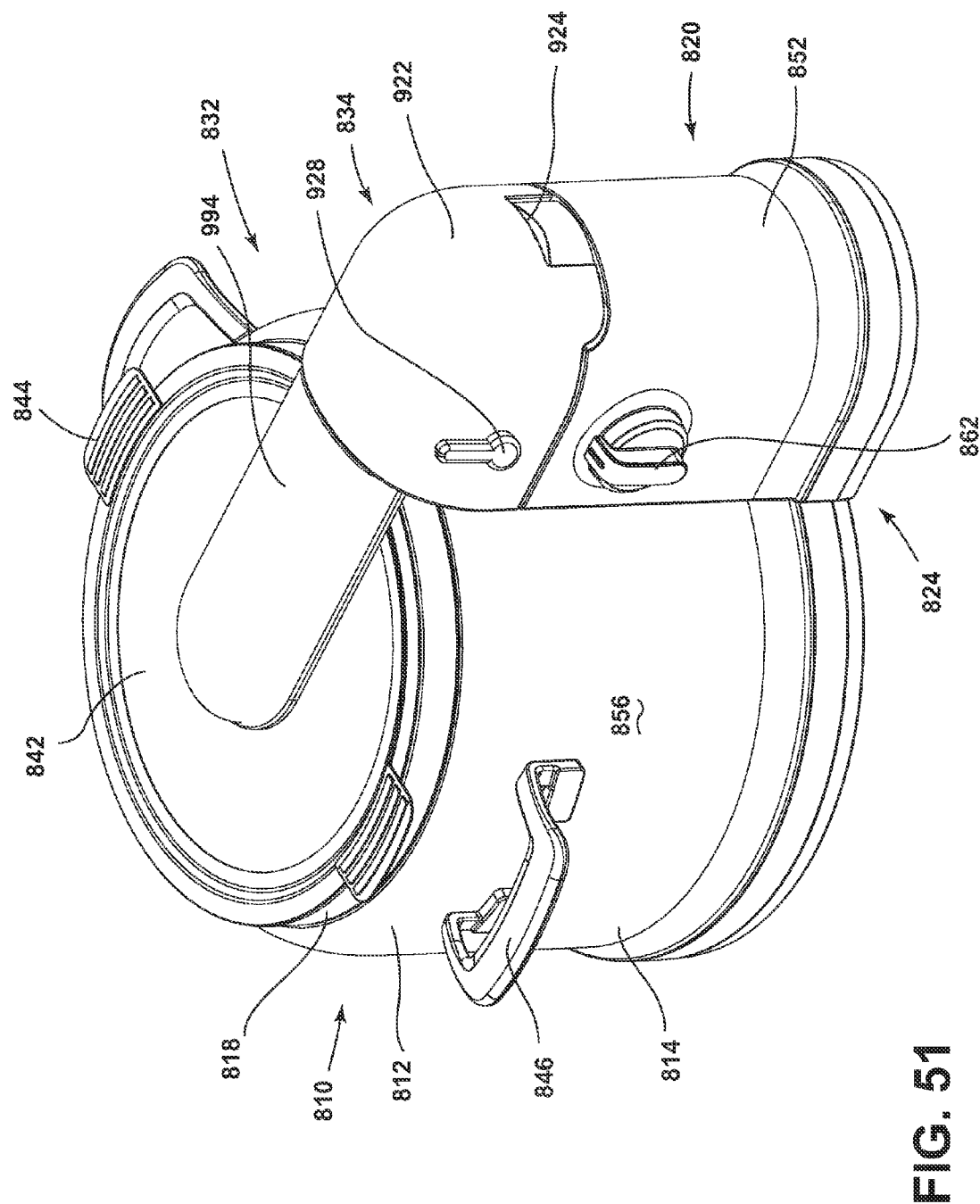
FIG. 51 is a second top perspective view of the cooking appliance of FIG. 50.
Figure 52:
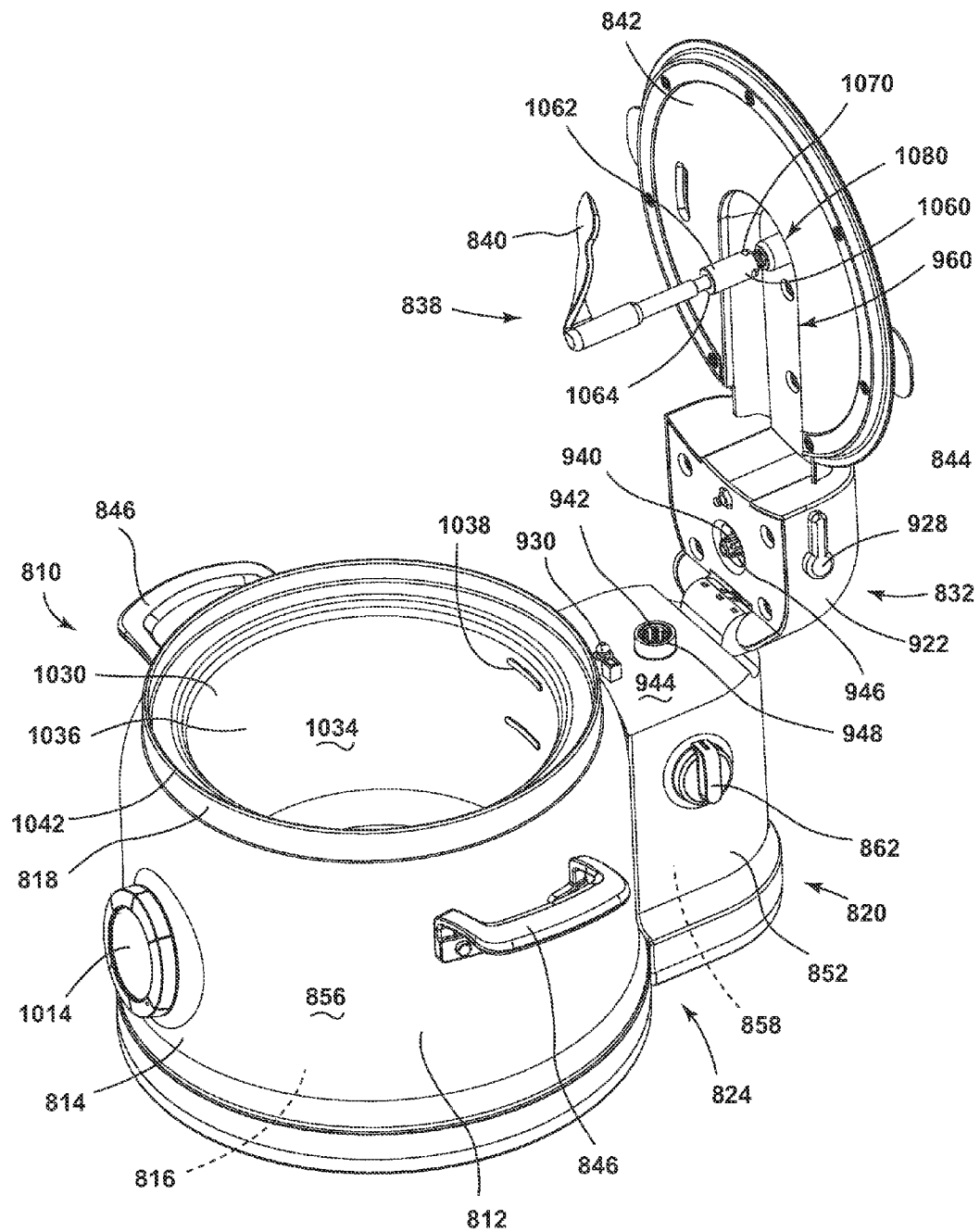
FIG. 52 is a top perspective view of the cooking appliance of FIG. 50, with the mixing arm in the idle position.
Figure 65:
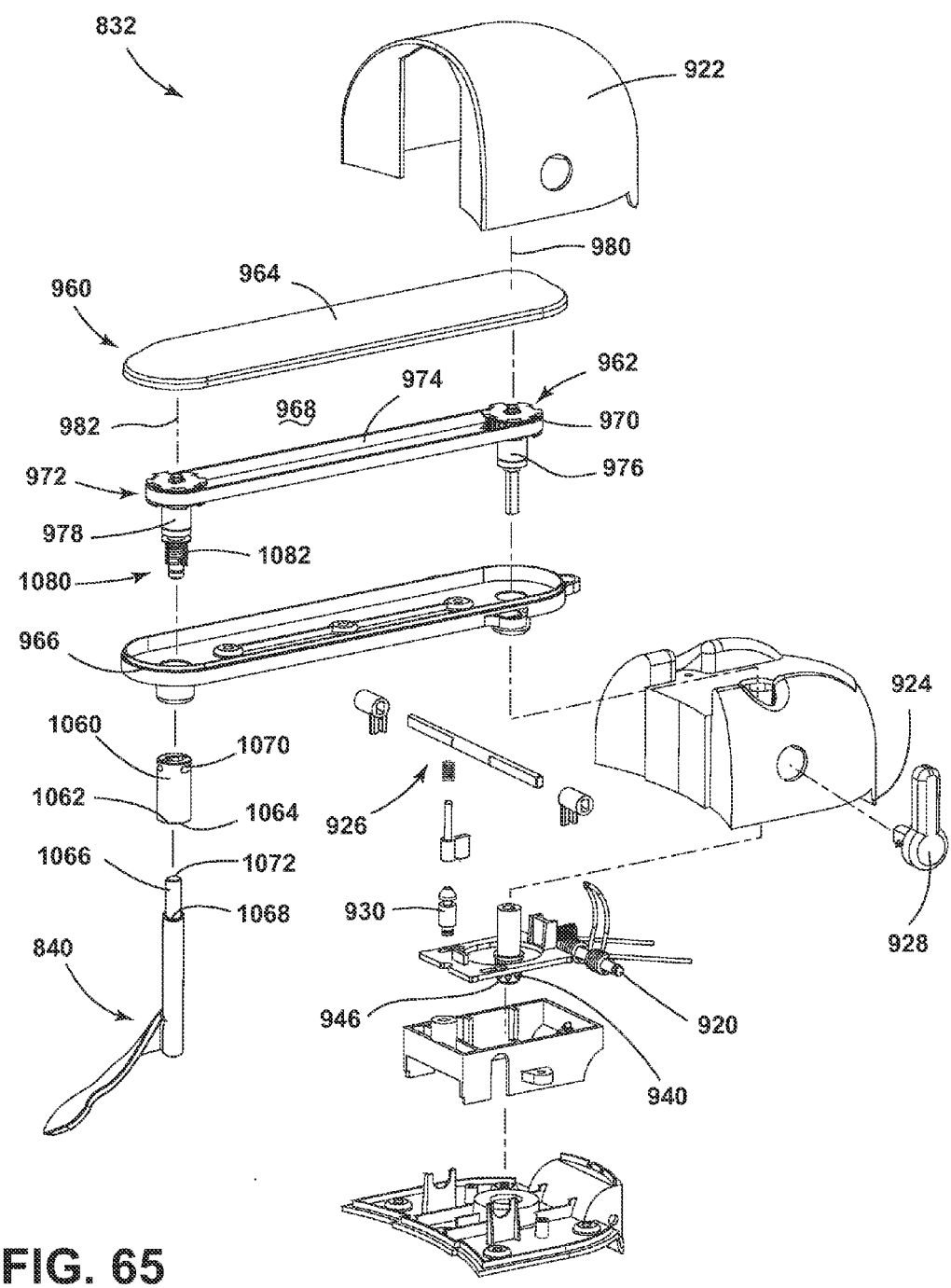
FIG. 65 is an exploded perspective view of one embodiment of the mixing arm for the cooking appliance.
Figure 66:
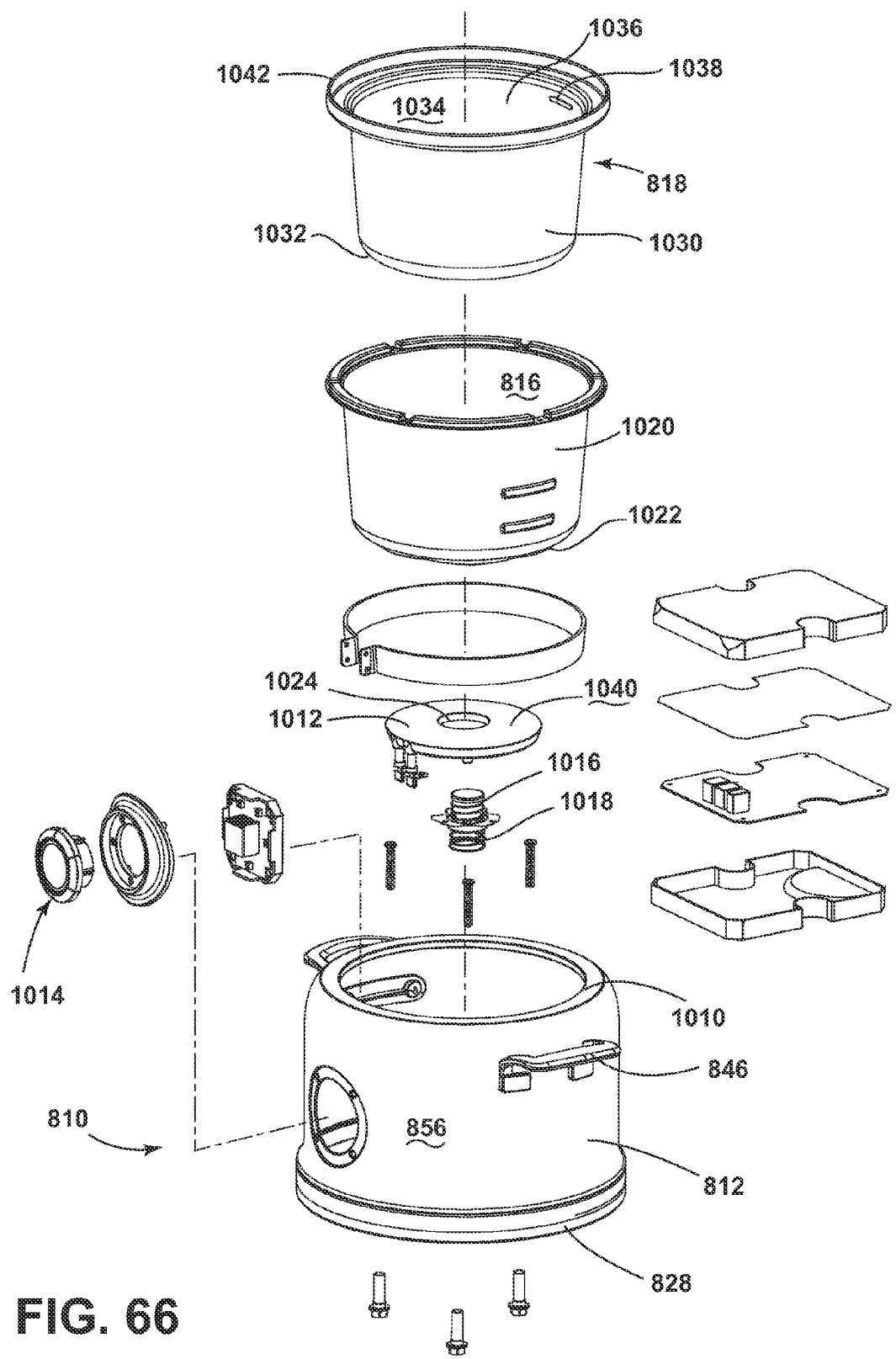
FIG. 66 is an exploded perspective view of one embodiment of the cooking portion of the cooking appliance.

As illustrated in FIGS. 51, 52 and 65, the hinge assembly includes the hinge pin 920 that couples the rotational housing 922 to the stirring tower 820. A stop mechanism 924 of the rotational housing 922 is configured to engage the primary enclosure member 852 of the stirring tower 820 to define the outer extent of the idle position 838 of the mixing arm 832. The mixing arm 832 is disposed between the mixing and idle positions 834, 838 through the use of a release mechanism 926 having at least one release lever 928 disposed on the primary enclosure member 852 of the rotational housing 922, wherein the release lever 928 is rotated to selectively disengage the rotational housing 922 from a connection pin 930 that selectively couples the mixing arm 832 to the stirring tower 820 in the mixing position 834. As the release lever 928 of the release mechanism 926 is rotated, the connection pin 930 is disengaged, such that the mixing arm 832 can be rotated into the idle position 838.

As further illustrated in FIGS. 52, 64 and 65, the rotational housing 922 includes a drive interface 940 that is configured to selectively engage a drive receptacle 942 of the tower drive system 836. The drive receptacle 942 of the tower drive system 836 is disposed proximate a top surface 944 of the stirring tower 820, proximate where the release mechanism 926 of the mixing arm 832 engages with the connection pin 930 of the stirring tower 820. The drive interface 940 of the mixing arm 832 includes gearing that matingly couples with the gearing of the drive receptacle 942 of the tower drive system 836. In this manner, as the mixing arm 832 is disposed in the engaged position, the drive interface 940 couples with the drive receptacle 942, such that the rotational force of the tower drive system 836 can be transferred from the stirring tower 820 into the mixing arm 832. The release mechanism 926 of the stirring tower 820 ensures that the mixing arm 832 is selectively secured in the engaged position, and the drive interface 940 is similarly selectively secured within the drive receptacle 942 to substantially prevent slippage between the drive receptacle 942 and the drive interface 940. The drive interface 940 includes a substantially arcuate outward surface 946 with cogs that are also substantially arcuate. The drive receptacle 942 of the stirring tower 820 also includes an arcuate inward surface 948 having arcuate cogs that match the arcuate cogs of the drive interface 940. In this manner, when the mixing arm 832 is removed from the engaged position, the drive interface 940 can be removed from the drive receptacle 942 without the drive interface 940 colliding with portions of the stirring tower 820 as the mixing arm 832 is rotated to the idle position 838. It should be understood that the shape of the drive interface 940 and the drive receptacle 942 can also be other configurations that include, but are not limited to, tapered, angled, pointed, or other shapes that allow the drive interface 940 to be easily removed from the drive receptacle 942 without colliding with portions of the stirring tower 820. In various embodiments, the drive interface 940 and drive receptacle 942 are switched to be on the stirring tower 820 and the mixing arm 832, respectively.

Referring now to FIGS. 54, 61, 62 and 65, the mixing arm 832 also includes an arm enclosure 960 that is configured to enclose an arm drive 962 of the mixing arm 832. The arm enclosure 960 includes a top enclosure member 964 and a bottom enclosure member 966 that cooperate to form an arm drive cavity 968 within which the arm drive 962 is disposed. The arm enclosure 960 is configured to engage the rotational housing 922, such that a drive end 970 of the arm drive 962 can be coupled to the drive interface 940 disposed within the rotational housing 922. In this manner, as the drive interface 940 receives rotational force from the tower drive system 836, the rotational force is transferred to the drive end 970 of the arm drive 962, and is then transferred to a mixing end 972 of the arm drive 962 disposed distal from the rotational housing 922 of the mixing arm 832. The mixing end 972 and the drive end 970 of the arm drive 962 are connected by a belt 974 such that a drive axle 976 disposed at the drive end 970 of the arm drive 962 rotates cooperatively and simultaneously with a mixing axle 978 disposed at the mixing end 972 of the arm drive 962. In this manner, the rotational force provided by the tower drive system 836 can be delivered to the mixing arm 832 along a rotational drive axis 980, wherein the arm drive 962 transfers this rotational force to a rotational mixing axis 982 through the use of the belt 974 that simultaneously rotates the drive axle 976 and the mixing axle 978 of the arm drive 962. It should be understood that a chain or other continuous member can be used instead of a belt 974. Additionally, in various alternate embodiments, a drive train consisting of various gearing members and/or a transverse axle can be used instead of a belt drive to transfer the rotational force from the rotational drive axis 980 to the rotational mixing axis 982.

Figure 54:
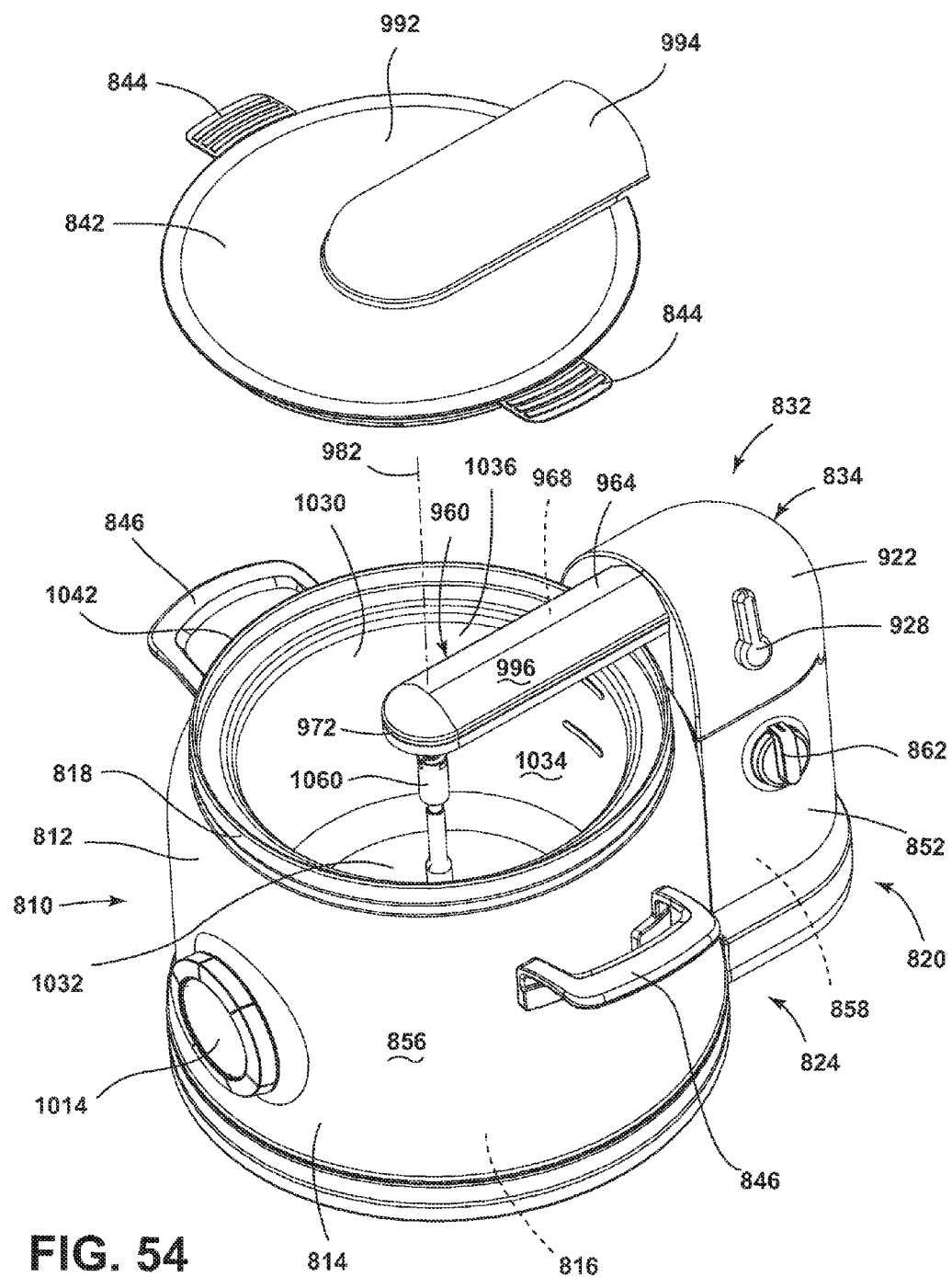
FIG. 54 is a partially exploded top perspective view of another embodiment of the cooking appliance with the lid removed.
Figure 68:
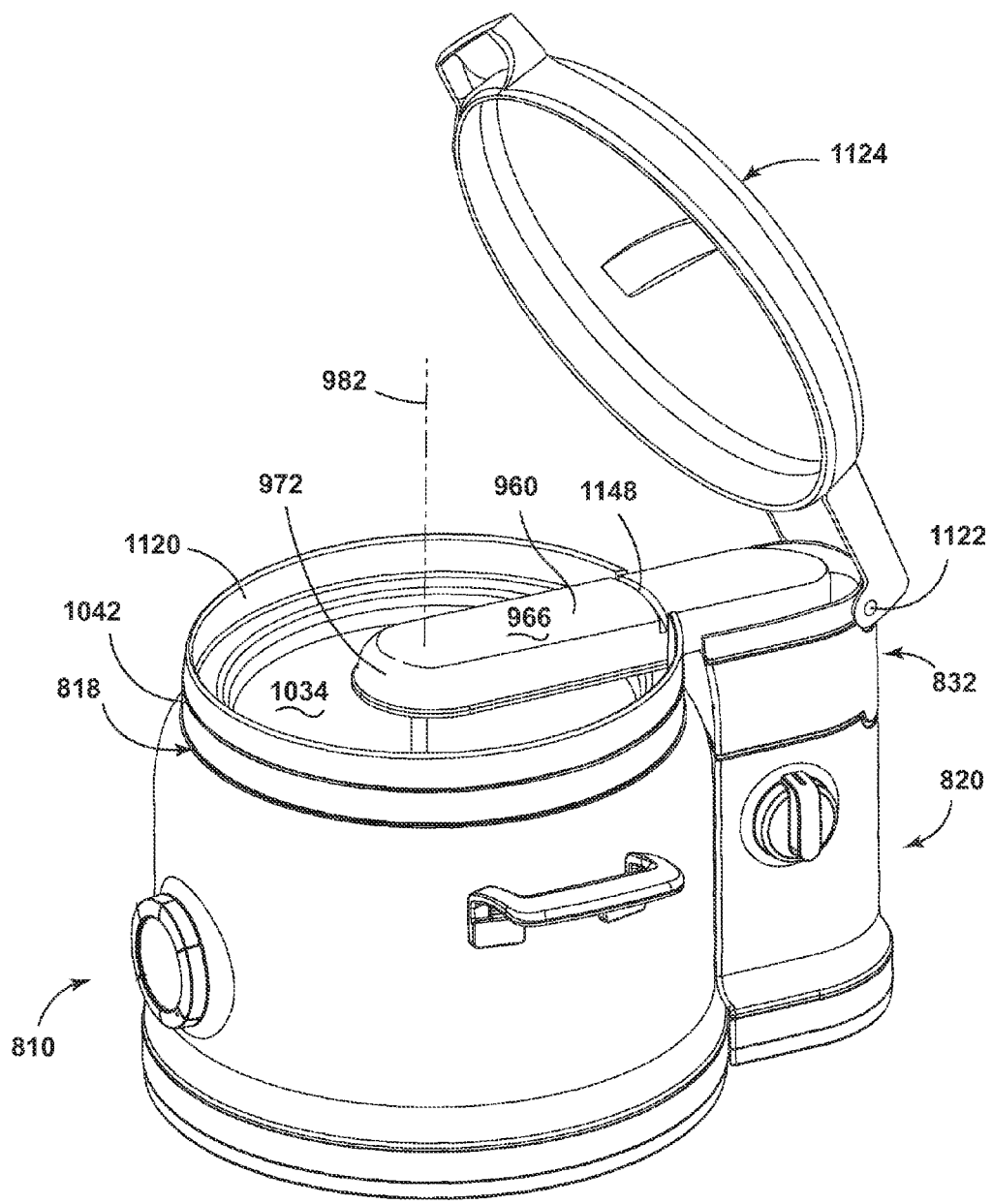
FIG. 68 is a top perspective view of another embodiment of the cooking appliance with the operable lid in the open position.

Referring now to FIGS. 54 and 68, the lid 842 includes a circular cover 992 that is configured to engage the cooking vessel 818 when the cooking vessel 818 is disposed within the heating cavity 816. The lid 842 also includes an arm receptacle 994 that is configured to engage an upper surface 996 of the arm enclosure 960 such that the cooking vessel 818 can be substantially enclosed during operation of the mixing arm 832 when the mixing arm 832 is in the mixing position 834. In various embodiments, a lid hinge member extends from the operable lid 842 to the rotational housing 922 of the mixing arm 832. In such an embodiment, the operable lid 842 is configured such that it is rotatable independent of the rotation of the mixing arm 832 between the mixing and idle positions 834, 838. In this manner, the operable lid 842 is independently operable between open and closed positions relative to the mixing arm 832. In such an embodiment, a separate cooking lid 998 is provided to cover the cooking vessel 818 when the stirring tower 820 is not in use.

Referring now to FIGS. 50-59 and 66, the housing 812 of the cooking appliance 810 includes the substantially cylindrical outer wall 814 having an aperture 1010 that provides access to the heating cavity 816 defined by the cylindrical outer wall 814. A heater plate 1012 is disposed within the heating cavity 816 proximate the base 828 of the housing 812 and is in electrical communication with the heating user interface 862 of the housing 812, wherein the user interface 862 selectively controls the flow of electricity from an external power source to the heater plate 1012. The heater plate 1012 includes a selectively operable pressure switch 1016 that becomes disengaged when the cooking vessel 818 is not disposed within the heating cavity 816. When the cooking vessel 818 is disposed within the heating cavity 816, the weight of the cooking vessel 818 presses down upon an upward biasing mechanism 1018 of the pressure switch 1016 to selectively engage the pressure switch 1016 and activate the heater plate 1012 such that electrical power can be delivered to the heater plate 1012 to operate the cooking appliance 810. The housing 812 can also include an inner wall 1020 that is coupled to the cylindrical outer wall 814 proximate the aperture 1010, wherein an inner surface 1036 of the inner wall 1020 defines the heating cavity 816 of the cooking appliance 810. The inner wall 1020 includes a bottom wall 1022 that, with the heater plate 1012, defines an opening 1024 through which the pressure switch 1016 is disposed for operation of the heater plate 1012 when the cooking vessel 818 is disposed in the heating cavity 816.

The cooking vessel 818 includes a substantially frusto-conical wall 1030 having a substantially convex base 1032 that protrudes upwards into a mixing cavity 1034 defined by the inner surface 1036 of the cooking vessel 818 within which food items can be cooked or mixed. Volume indicia 1038 providing information regarding the volume of contents contained within the cooking vessel 818 are disposed on the inner surface 1036 of the cooking vessel 818. The convex base 1032 of the cooking vessel 818 is configured to match a convex upper surface 1040 of the heater plate 1012. The convex configuration of the heater plate 1012 and the base of the cooking vessel 818 increases the contact area between the heater plate 1012 and the cooking vessel 818. The cooking vessel 818 also includes a rim that is configured to extend over the aperture 1010 of the heating cavity 816 and also selectively receive the lid 842.

Figure 53:
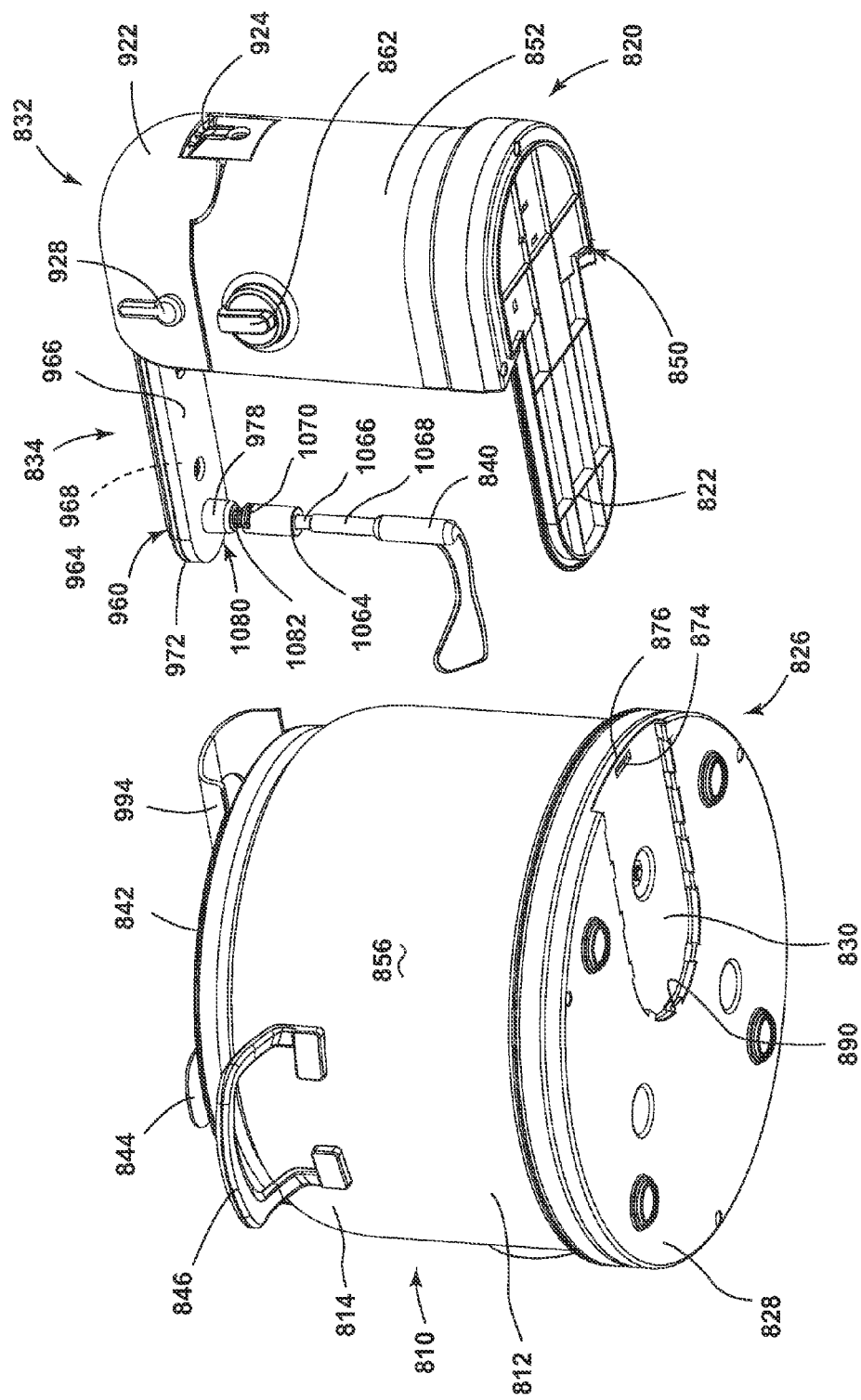
FIG. 53 is a bottom perspective view of the cooking appliance with the stirring tower in the distal position.

Referring now to FIGS. 52 and 53, the stirring tower 820 and the mixing arm 832 can be placed in the proximal position 824 relative to the housing 812 such that the arcuate surface of the secondary housing 812 of the stirring tower 820 engages the similarly arcuate outer surface 946 of the outer wall 814 of the housing 812.

Figure 56:
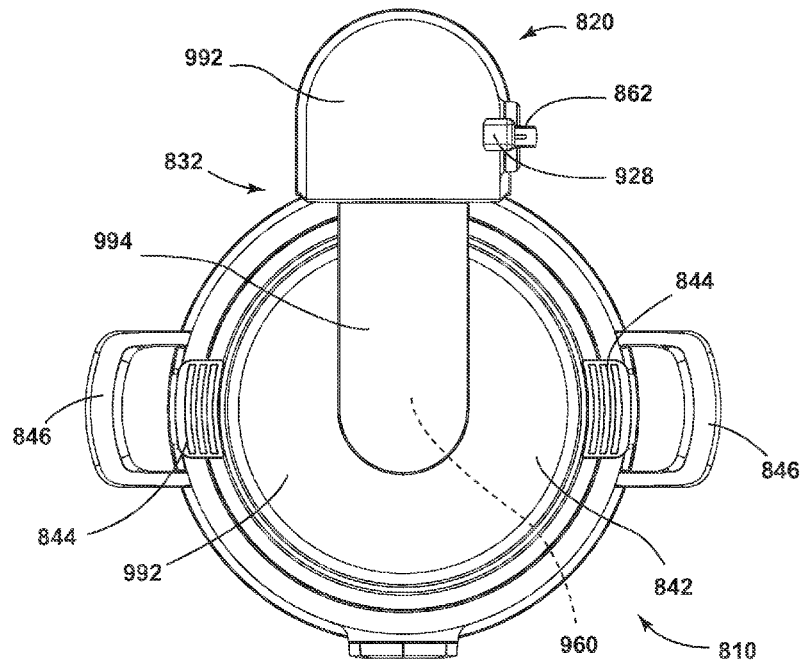
FIG. 56 is a top plan view of the cooking appliance of FIG. 50.
Figure 57:
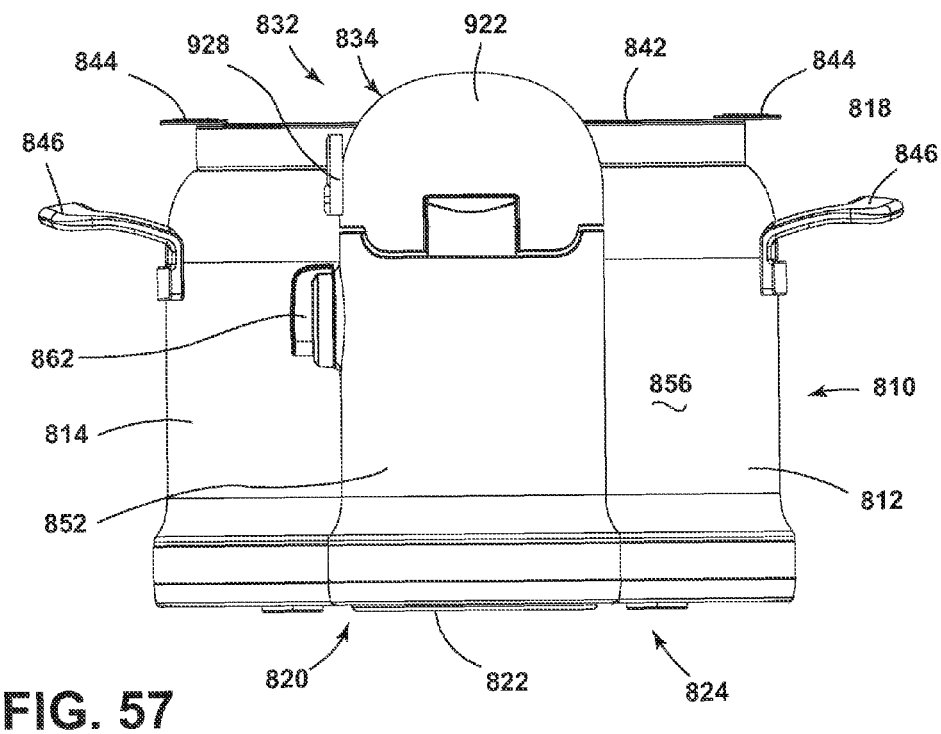
FIG. 57 is a second side elevation of the cooking appliance of FIG. 50.
Figure 58:
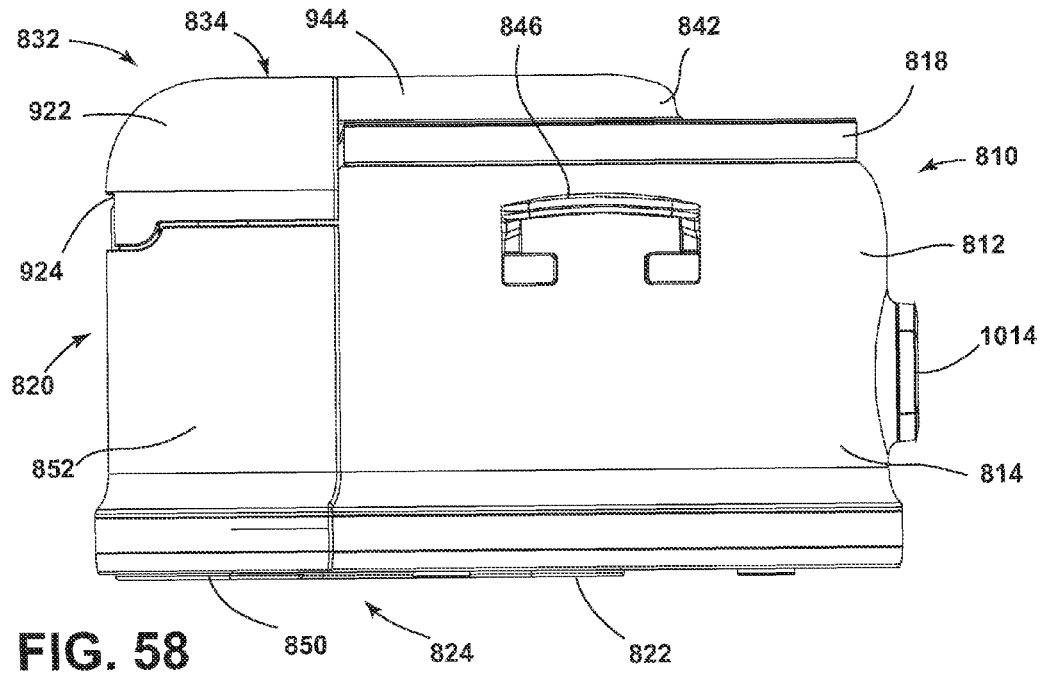
FIG. 58 is a third side elevation of the cooking appliance of FIG. 50.

Referring now to FIGS. 54 and 56, when the stirring tower 820 is placed in the proximal position 824, the rotational mixing axis 982 of the mixing arm 832 is disposed over the center of the heating cavity 816. In this manner, the mixing wand 840 is coupled with the mixing axle 978 of the arm drive 962 and is configured to rotate within the mixing cavity 1034 defined by the inner surface 1036 of the cooking vessel 818. In this manner, the mixing wand 840 is configured to stir the contents of the cooking vessel 818 at a predetermined speed.

Referring again to FIG. 65, the mixing axle 978 of the arm drive 962 is coupled with the mixing wand 840 through an operable tool impeller 1060 coupled with a lower end 1062 of the mixing axle 978. The tool impeller 1060 includes a tool receptacle 1064 that is configured to receive a connection portion 1066 of a coupling arm 1068 of the mixing wand 840, which can be the stirring wand 42, the flipping wand 44, or the combination stirring/flipping wand 590, substantially similar to that shown in FIGS. 25-47, and described above. The tool impeller 1060 can define an impeller notch 1070 into which a portion of the coupling arm 1068 of the mixing wand 840 can be located to selectively secure a coupling end 1072 of the mixing wand 840 within the tool receptacle 1064 of the tool impeller 1060. In various embodiments, the tool impeller 1060 and the tool receptacle 1064 have a vertical configuration along the rotational mixing axis 982. In this embodiment, the coupling arm 1068 of the mixing wand 840 also includes a vertical configuration, such that the coupling arm 1068 of the mixing wand 840 can be inserted upward into the tool receptacle 1064 of the tool impeller 1060 along the rotational mixing axis 982 of the mixing arm 832.

In various embodiments, the tool impeller 1060 can be a separate piece that is selectively and toollessly engaged with the lower end 1062 of the mixing axle 978. Separate tool impellers 1060 can be used depending on the configuration (vertical or horizontal) of the mixing wand 840 to be coupled with the mixing axle 978. As discussed herein, certain mixing wands 840 can include a horizontal coupling arm. Separate alternate impellers, or impellers with multiple tool receptacles 1064 can be configured to accommodate these and other varying mixing wand 840 configurations. In the various embodiments, each mixing wand 840 includes a tool impeller 1060 that is selectively and toollessly coupled to the lower end 1062 of the mixing axle 978.

Referring again to FIG. 65, the tool impeller 1060 of the mixing arm 832 includes a wand release 1080, whereby the tool impeller 1060 slides along the lower end 1062 of the mixing axle 978 and is biased in a downward position by an impeller biasing member 1082, such as a spring. To insert the coupling end 1072 of the mixing arm 832 into the tool receptacle 1064, the user moves the tool impeller 1060 in an upward direction against the biasing force of the impeller biasing member 1082 disposed in the mixing axle 978 to define a tool release position, wherein the mixing wand 840 can be inserted into or removed from the impeller notch 1070 and the tool receptacle 1064. When the user releases the tool impeller 1060, the impeller biasing member 1082 of the mixing axle 978 biases the tool impeller 1060 in a downward direction to a tool securing position, wherein the mixing wand 840 is selectively and toollessly secured within the tool receptacle 1064 of the tool impeller 1060 to prevent slippage of the mixing wand 840 during operation of the stirring tower 820.

Referring now to FIG. 61, the mixing wand 840 can include a convex bottom surface 1090 that substantially cooperates with the convex base 1032 of the mixing vessel 818. In such an embodiment, food items are biased down the convex base 1032 of the cooking vessel 818 and the bottom surface of the mixing wand 840 is configured to engage substantially all of the convex base 1032 of the cooking vessel 818 as the mixing wand 840 rotates within the mixing cavity 1034. In this manner, minimal amounts of the food items placed within the cooking vessel 818 avoid being mixed by the mixing wand 840. The mixing wand 840 can also include one or more flexible or rubberized edges that serve to enhance the engagement between the mixing wand 840 and the cooking vessel 818 without damaging the cooking vessel 818 as the mixing wand 840 slides along the inner surface 1036 of the cooking vessel 818.

Figure 67:
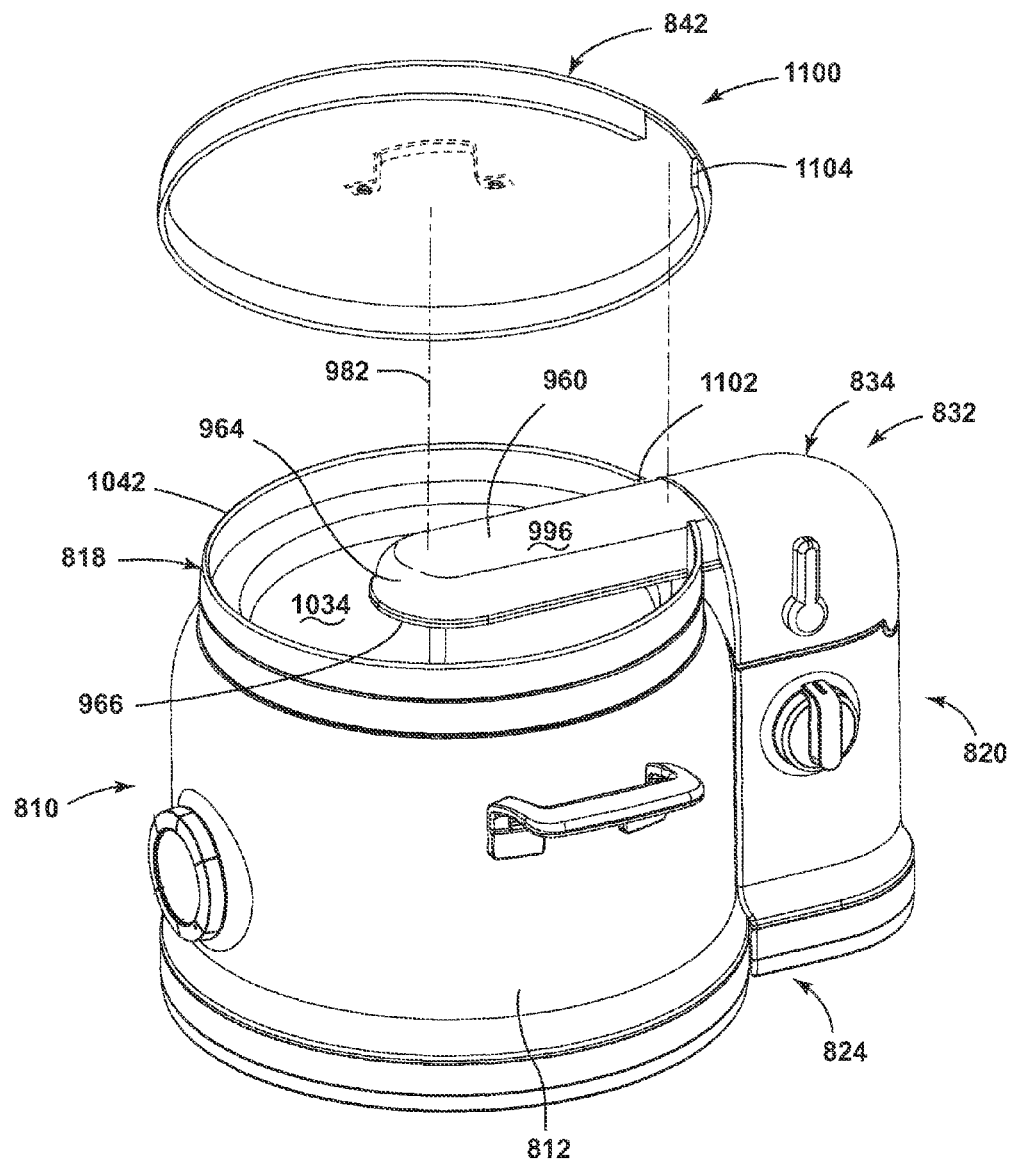
FIG. 67 is a partially exploded top view of another embodiment of the cooking appliance.

Referring now to FIG. 67, the cooking appliance 810 can include an alignment mechanism 1100 for aligning the mixing arm 832 over the cooking vessel 818, such that the rotational mixing axis 982 is aligned over the center of the cooking vessel 818. In various embodiments, the cooking vessel 818 can include a vessel notch 1102 for receiving a portion of the mixing arm 832 when the stirring tower 820 is in the proximal position 824 and the mixing arm 832 is in the mixing position 834. In various embodiments, the vessel notch 1102 in the cooking vessel 818 can be approximately as deep as the height of the arm enclosure 960 or some lesser distance, such that the upper surface 996 of the arm enclosure 960 is above a rim 1042 of the cooking vessel 818. In various embodiments, the vessel notch 1102 in the cooking vessel 818 can also be used as a pour spout for the cooking vessel 818 when the user wishes to remove contents from the cooking vessel 818. In various embodiments, the lid 842 can also include a lid notch 1104, wherein the lid notch 1104 is configured to be received by a portion of the arm enclosure 960. In various other embodiments, the cooking vessel 818 and the lid 842 can each include notches 1102, 1104 for aligning the mixing arm 832 within the cooking appliance 810, such that the mixing arm 832 is aligned by and surrounded by the vessel notch 1102 below, and the lid notch 1104 above.

Referring now to FIGS. 68-72, the cooking appliance 810 can include an alignment ring or an alignment hub 1120 that serves to align the mixing end 972 of the mixing arm 832 and the rotational mixing axis 982 over the center of the mixing cavity 1034. In various embodiments, as illustrated in FIG. 68, the mixing arm 832 can include at least one pivot point 1122, wherein certain features of the mixing arm 832 can be lowered on top of the cooking vessel 818. A pivoting alignment ring 1120, which can be a separate ring or can be integral with the mixing arm 832, can be pivoted into selective engagement with the rim 1042 of the cooking vessel 818 when the stirring tower 820 is in the proximal position 824. In such an embodiment, a separate mixing arm 832 can be individually pivoted between the mixing and idle positions 834, 838, wherein the mixing position 834 is defined by the mixing arm 832 being aligned within the alignment ring or the alignment hub 1120. The alignment ring 1120 can also be an alignment hub in various embodiments. The mixing arm 832, in various embodiments, can be integral with the alignment ring 1120. A separate pivoting lid 1124 can also be pivotally coupled with the mixing arm 832 and individually operable between open and closed positions, such that when the pivoting lid 1124 is in the closed position, it can engage the alignment ring or the alignment hub 1120 of the mixing arm 832 and an arm alignment feature 1148 disposed in the upper surface 996 of the arm enclosure 960. Additionally, in embodiments where a pivoting lid 1124 is coupled with the mixing arm 832, the cooking appliance 810 will include a separate cooking lid 998 that can be used with the cooking vessel 818 when the stirring tower 820 is disposed in the distal position 826.

Figure 69:
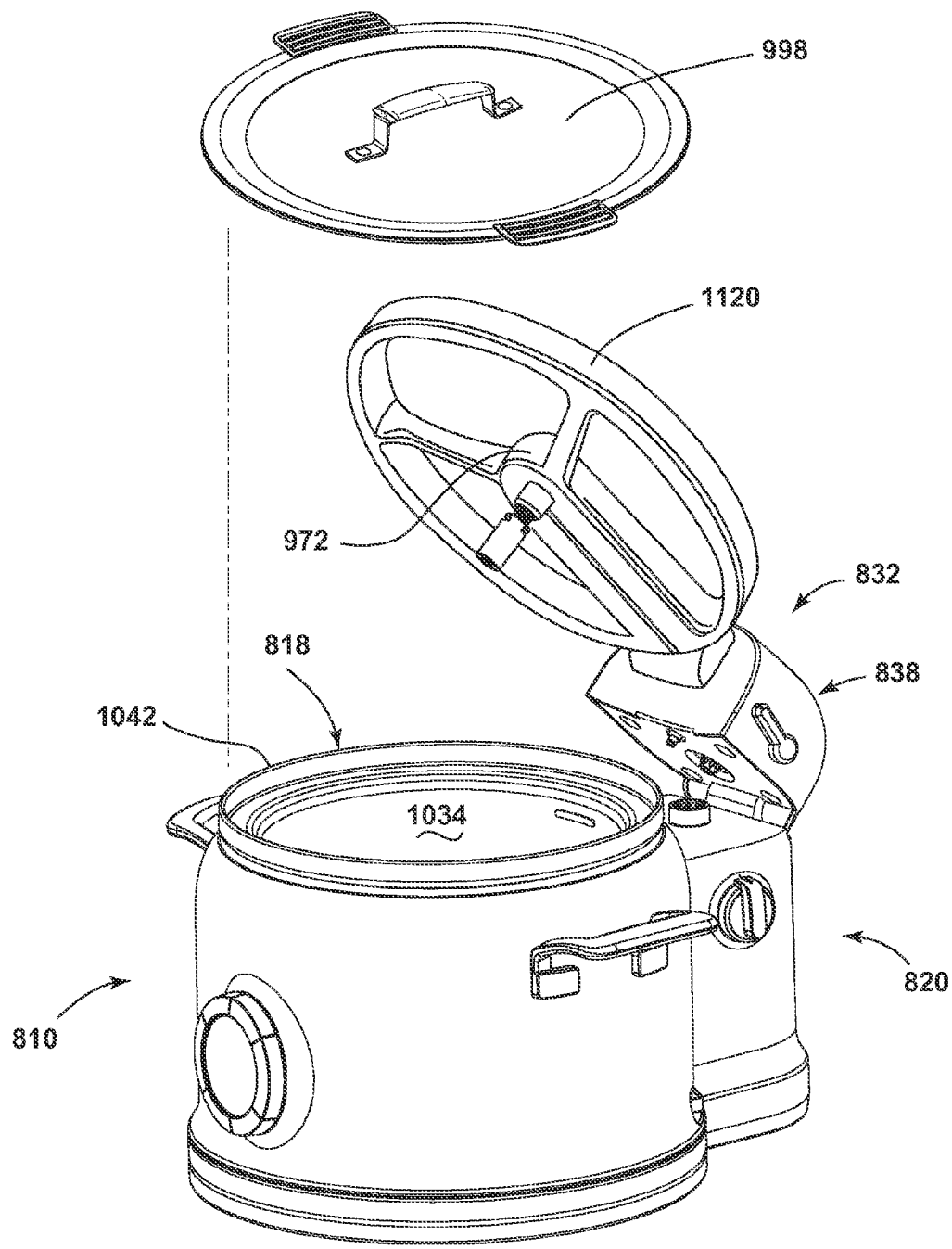
FIG. 69 is a partially exploded top perspective view of another embodiment of the cooking appliance with the lid removed and the mixing arm having an integral alignment ring in the idle position.

As shown in FIG. 69, the alignment ring 1120 can be integral with the mixing arm 832, wherein the alignment ring 1120 is configured to rest upon the rim 1042 of the cooking vessel 818 to align the mixing end 972 of the mixing arm 832 over the mixing cavity 1034. Such an embodiment includes a separate cooking lid 998 that can be used on the cooking appliance 810 when the stirring tower 820 is distal from the housing 812, or can be placed upon the alignment hub 1120 when the stirring tower 820 is being used in the proximal position 824.

Figure 70:
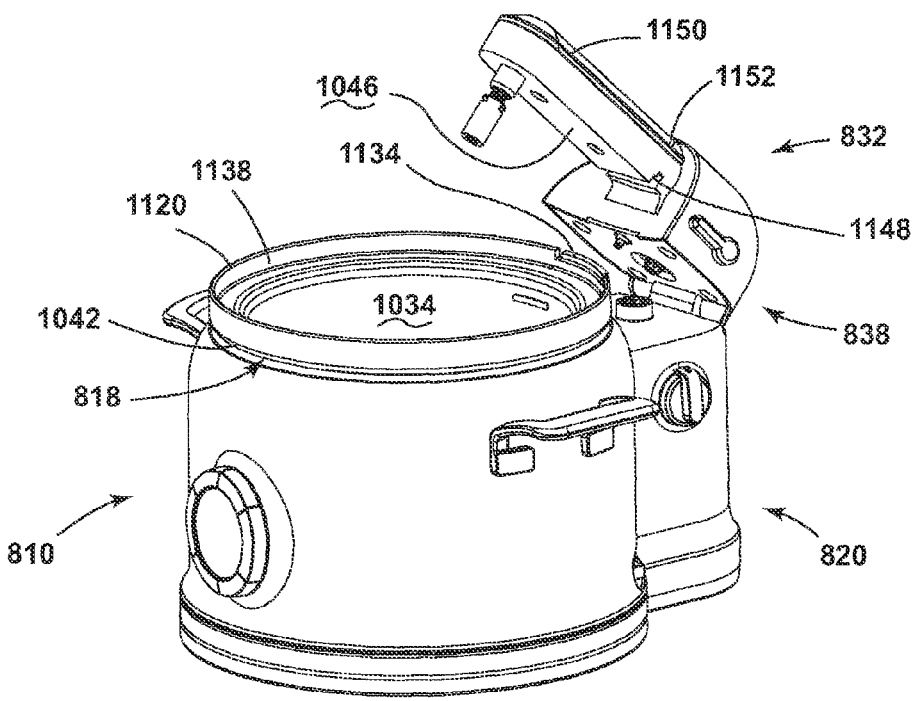
FIG. 70 is a partially exploded top perspective view of another embodiment of the cooking appliance with the alignment ring installed and the mixing arm in the idle position.
Figure 71:
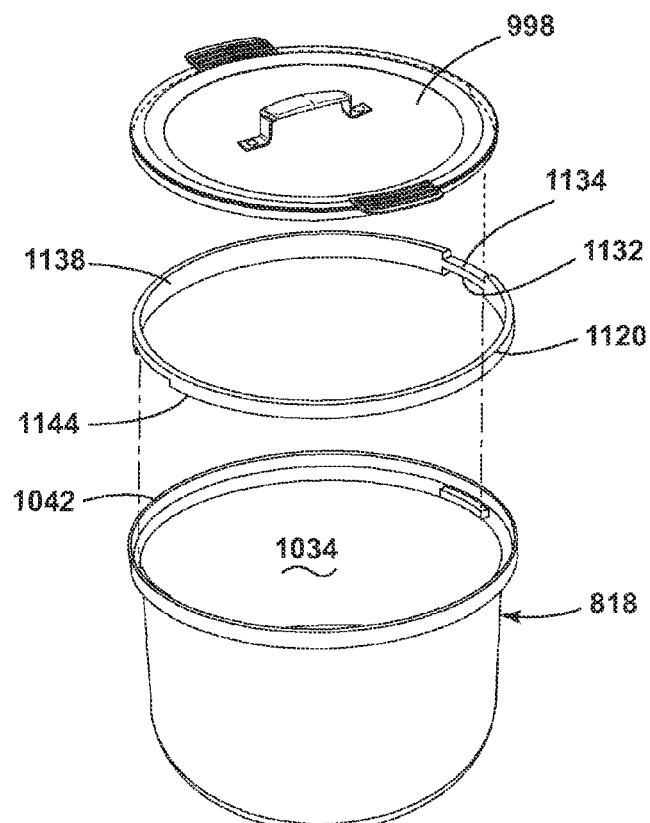
FIG. 71 is a partial exploded perspective view of the cooking appliance of FIG. 70.

Referring now to FIGS. 70 and 71, the alignment ring 1120 can be a separate piece that can be disposed upon the rim 1042 of the cooking vessel 818. Various embodiments can include a vessel alignment feature 1130 disposed proximate the rim 1042 of the cooking vessel 818 and a cooperating lower notch 1132 disposed on a lower edge 1144 of the alignment ring 1120, such that the lower notch 1132 of the alignment ring 1120 engages with the vessel alignment feature 1130 to properly orient the alignment ring 1120. The alignment ring 1120 can also include an upper notch 1134 configured to receive a portion of a lower surface 1146 of the mixing arm 832 at an arm alignment feature 1148 and to orient the mixing arm 832 over the mixing cavity 1034. The upper notch 1134 of the alignment ring 1120 and the lower surface 1146 of the mixing arm 832 can also include the arm alignment feature 1148 to further orient and align the mixing arm 832 in the proper position over the mixing cavity 1034. In the various embodiments, the alignment features of the cooking vessel 818, the alignment ring 1120 and the mixing arm 832, can include, but are not limited to, tongue-and-groove alignment features, cooperating notches and protrusions, alignment pins and cooperating recesses, and other similar alignment features. The upper surface 1150 of the mixing arm 832 can also include an alignment recess 1148 that cooperates with and is configured to be at the same level as a top edge 1138 of the alignment ring 1120, thereby creating a continuous seat into which the cooking lid 998 can be placed to substantially enclose the vessel 818 during mixing.

Figure 72:
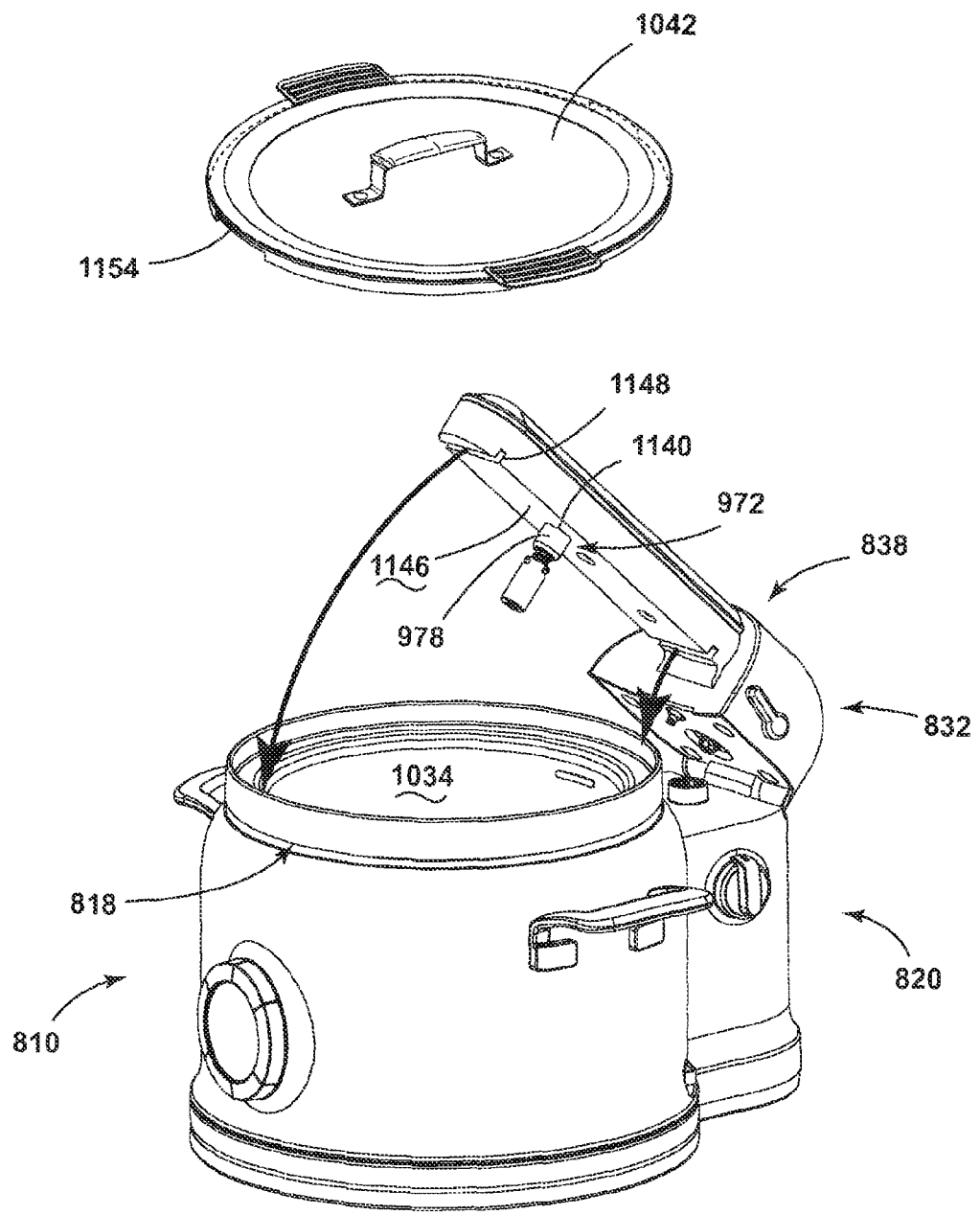
FIG. 72 is a partially exploded top perspective view of another embodiment of the cooking appliance with the notched lid removed and the mixing arm in the idle position.

Referring now to FIG. 72, the mixing arm 832 can extend across the entire cooking vessel 818, wherein the lower surface 1146 of the mixing arm 832 includes two arm alignment features 1148 for engaging opposing sides of the cooking vessel 818. In such an embodiment, the mixing end 972 of the arm drive 962 is disposed proximate a mid-point 1140 of the mixing arm 832 such that the mixing axle 978 and the rotational mixing axis 982 are disposed over the center of the mixing cavity 1034 and the cooking vessel 818. In such an embodiment, a mixing lid 1142 includes lid recesses 1154 for receiving the mixing arm 832 such that the lid recesses 1154 of the mixing lid 1142 are configured to surround at least a portion of the mixing arm 832 to substantially cover the mixing cavity 1034 and the cooking vessel 818. A separate cooking lid 998 may be included that does not include lid recesses 1154 and that can be used with the cooking vessel 818 when the stirring tower 820 is in the distal position 826 and not in use.

Figure 55:
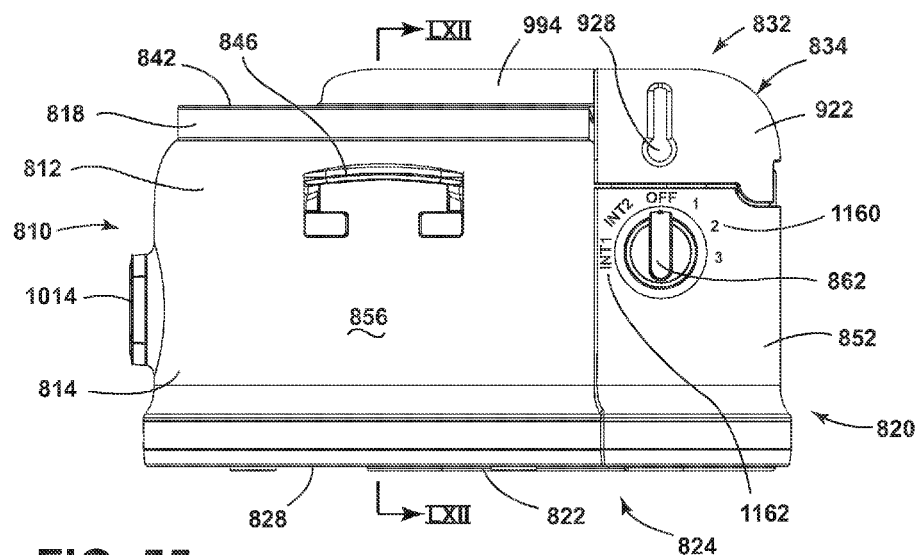
FIG. 55 is a first side view of the cooking appliance of FIG. 50.

Referring now to FIG. 55, the stirring tower 820 includes the mixing user interface 862 that includes a speed interface 1160 and a mode interface 1162. The speed interface 1160 and the mode interface 1162 can be disposed within the same mixing user interface 862 wherein a dial, a selection of buttons, switches, or a touch screen interface is disposed proximate the primary enclosure member 852 of the stirring tower 820 to allow the user to make the desired selection for the stirring mode and speed. The speed interface 1160 includes separate speed selection interfaces that include, but are not limited to, slow, medium, and fast. The speed interface 1160 can also include a touch screen having a finger slide interface. The mode interface 1162 includes a plurality of dial positions or engagement members that define a series of modes for the stirring tower 820. These modes can include, but are not limited to, off, intermittent, increase or decrease intermittent modes, timed modes, reverse stirring modes, continuous stirring modes, and the like. The mode interface 1162, similar to the speed interface 1160, can include a dial, buttons, switches, a touch screen interface, or other similar user interface 862.

Figure 59:
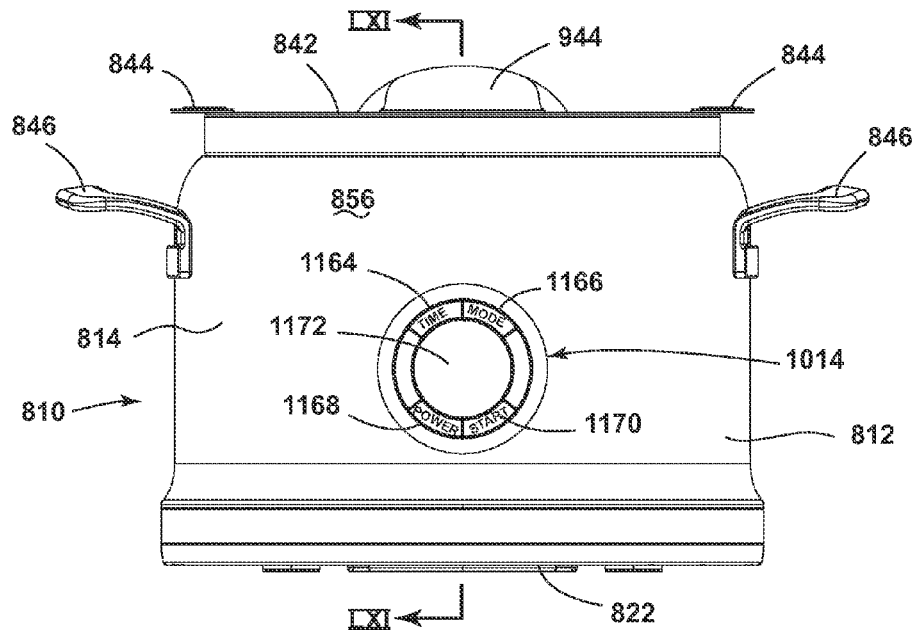
FIG. 59 is a fourth side elevation of the cooking appliance of FIG. 50.
Figure 60:
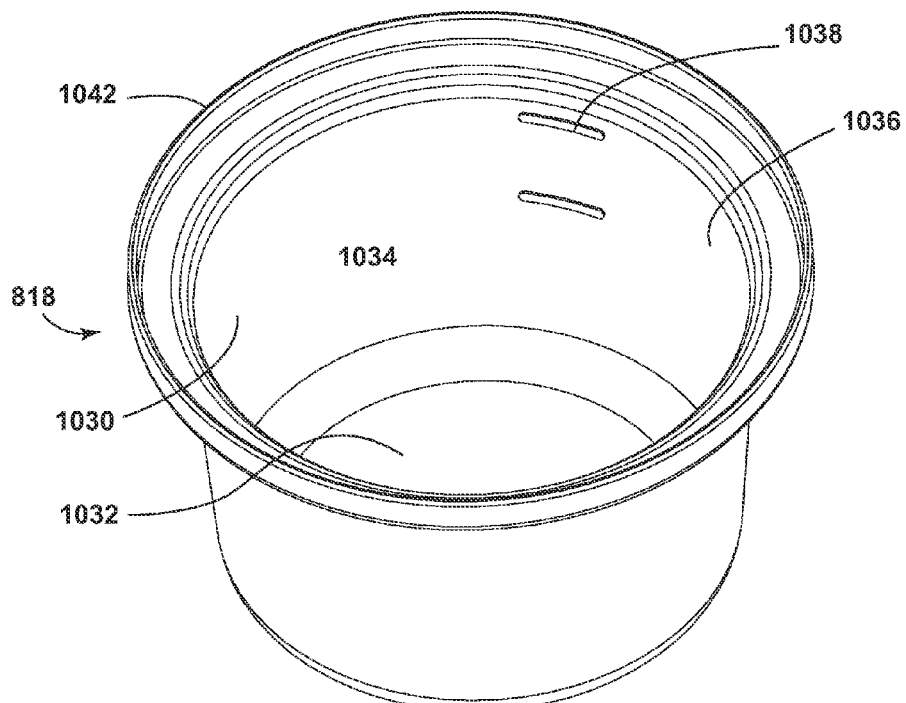
FIG. 60 is a top perspective view of an embodiment of the cooking vessel for the cooking appliance.

As illustrated in FIG. 59, the housing 812 of the cooking appliance 810 also includes the heating user interface 1014 for the heating unit of the cooking appliance 810. The heating user interface 1014 can have various interfaces that may include, but are not limited to, a time interface 1164, a mode interface 1166, a temperature interface, a power interface 1168, a start/stop interface 1170, a program interface, and other similar interface portions that are configured to operate the heating functions of the cooking appliance 810. The heating user interface 1014 can also include a display 1172 providing indicia to the user regarding temperature, time remaining in a particular program, the program selection, the mode selected, and other information concerning the cooking appliance 810. Additionally, the heating user interface 1014 can include interface members for operating the mixing functions of the stirring tower 820, when the stirring tower 820 is disposed in the proximal position 824. In such an embodiment, a data connection is provided between the stirring tower 820 and the housing 812, such that when the stirring tower 820 is disposed in the proximal position 824, the data connection allows for communication between the housing 812, the user interface 862, and the stirring tower 820, such that the heating user interface 1014 can control the stirring features of the stirring tower 820.

In use, when operating the stirring tower 820 with the housing 812 of the cooking appliance 810, the user can slide, push, or otherwise dispose the stirring tower 820 in the proximal position 824, such that the supporting foot 822 of the stirring tower 820 is disposed within the foot receptacle 830 of the base 828 of the housing 812. The supporting foot 822 and the foot receptacle 830 can include various interference mechanisms that are configured to selectively retain the supporting foot 822 within the foot receptacle 830. These interference mechanisms include, but are not limited to, opposing protrusions, tabs, clasps, and other interference mechanisms. Once in the proximal position 824, the electrical interface 890 between the stirring tower 820 and the housing 812, as described above, is engaged and the electrical power can be delivered from the housing 812 to the stirring tower 820 for operating the various features of the stirring tower 820. The user can then place various food items within the cooking vessel 818 and, using the user interface 862 of the stirring tower 820, can select the appropriate mode and speed desired to mix the various food items within the cooking vessel 818. The user can also use the heating user interface 1014 on the outer surface 856 of the housing 812 to simultaneously cook the items that are being mixed within the cooking vessel 818. The various cooking and mixing features of the cooking appliance 810 can be timed, or various pre-programmed or user-programmed cooking recipes or cooking cycles can be selected by the user, such that the user can place food items within the cooking vessel 818 and gauge the desired program, and wait for the cooking appliance 810 to complete the cooking and stirring functions of the pre-configured program until the program is completed. Upon completion of the desired stirring function of the cooking appliance 810, the user can then slide the stirring tower 820 away from the housing 812 to dispose the stirring tower 820 in the distal position 826, thereby disengaging the electrical interface 890 between the housing 812 and the stirring tower 820.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A cooking appliance comprising:
    a cooker housing including at least one outer wall defining a heating cavity that selectively receives a cooking vessel;
    a stirring tower having a supporting foot, the stirring tower being selectively removable from the cooker housing;
    a foot receptacle disposed in a base of the cooker housing for selectively receiving the supporting foot when the stirring tower is in an engaged position, wherein the engaged position includes the supporting foot laterally supporting the base relative to the stirring tower and wherein the cooker housing is free of vertical support from the stirring tower and the supporting foot;
    a mixing arm hingedly removably coupled to the stirring tower;
    at least one mixing wand removably engaged with the mixing arm; and
    a lid pivotally coupled to the mixing arm and operable between an open position and a closed position in which the lid covers the heating cavity.

2. The cooking appliance of claim 1, wherein the stirring tower is in electrical communication with the cooker housing, and wherein the cooker housing and the stirring tower include a fastening mechanism for selectively securing the stirring tower to the cooker housing, and wherein the stirring tower can be removed from engagement with the cooker housing by hand and without the use of tools.

3. The cooking appliance of claim 1, further comprising:
a heating member disposed proximate the heating cavity; and
a user interface in electrical communication with the heating member and a drive system.

4. The cooking appliance of claim 3, wherein the user interface includes a heating user interface disposed on an exterior surface of the cooker housing in electrical communication with the heating member, and a mixing user interface disposed on an exterior surface of the stirring tower and in electrical communication with the drive system.

5. The cooking appliance of claim 1, wherein the lid includes an arm cover that engages a top surface of the mixing arm when the lid is in the closed position.

6. The cooking appliance of claim 1, wherein the at least one mixing wand is selected from the group consisting of: a flipping wand, a stirring wand, and a combination flipping and stirring wand.

7. The cooking appliance of claim 1, wherein the lid and the mixing arm selectively operate independent of one another such that operation of the lid between the open and closed positions is independent of operation of the mixing arm between a mixing state and an idle state.

8. A cooking appliance comprising:
a housing including a bottom wall defining a receptacle;
a stirring tower having an outwardly extending supporting foot that is selectively disposed in the receptacle of the housing, wherein the receptacle surrounds the supporting foot and conceals the supporting foot of the stirring tower from view when the stirring tower is in an engaged position with respect to the housing;
a mixing arm operably coupled to the stirring tower and operable between a mixing position defined by a drive system being in operable communication with the mixing arm, and an idle position defined by the drive system being out of operable communication with the mixing arm;
a lid pivotally coupled to the mixing arm and operable between open and closed positions; and
a cooking vessel that is selectively inserted into a heating cavity, and wherein the cooking vessel selectively receives the lid.

9. The cooking appliance of claim 8, wherein the stirring tower is in selective electrical communication with the housing, and wherein the stirring tower selectively receives electrical power at least from an electrical interface disposed proximate the housing.

10. The cooking appliance of claim 8, further comprising:
a heating element disposed proximate the heating cavity; and
a user interface in electrical communication with the heating element and the drive system.

11. The cooking appliance of claim 10, wherein the user interface includes a heating user interface disposed on an exterior surface of the housing in electrical communication with the heating element, and a mixing user interface disposed on an exterior surface of the stirring tower in electrical communication with the drive system.

12. The cooking appliance of claim 8, wherein the lid includes a recess for engaging a top surface of the mixing arm when the lid is in the closed position.

13. The cooking appliance of claim 8, further comprising:
at least one mixing wand selected from the group consisting of: a flipping wand, a stirring wand, and a combination flipping and stirring wand.

14. The cooking appliance of claim 8, wherein operation of the lid between the open and closed positions is independent of operation of the mixing arm between the mixing and idle positions.

15. The cooking appliance of claim 8, wherein a user interface is disposed on an outer surface of the housing, wherein the user interface is in electrical communication with a heating member disposed proximate the heating cavity, and wherein the user interface is in selective electrical communication with the drive system when the supporting foot is disposed in a receptacle of a base.

16. A cooking appliance comprising:
a stirring tower having a supporting foot;
a mixing arm hingedly coupled to the stirring tower and operably coupled with a drive system;
a cooker housing including a plurality of walls and a base defining a heating cavity, the base defining a base receptacle that selectively receives the supporting foot to define a proximal position of the stirring tower with the cooker housing, wherein the proximal position is further defined by the base selectively positioned to cover and extend around the supporting foot, wherein the base and the supporting foot are substantially co-planar when in the proximal position;
a lid pivotally coupled to the mixing arm and operable between open and closed positions; and
a cooking vessel that is selectively inserted into the heating cavity, and wherein the cooking vessel selectively receives the lid when the stirring tower is in the proximal position.

17. The cooking appliance of claim 16, wherein the stirring tower is in selective electrical communication with the cooker housing, and wherein the stirring tower selectively receives electrical power at least from an electrical interface disposed proximate the cooker housing.

18. The cooking appliance of claim 16, further comprising:
a heating element disposed proximate the heating cavity; and
a user interface in electrical communication with the heating element and the drive system.

19. The cooking appliance of claim 16, further comprising:
at least one mixing wand selected from the group consisting of a flipping wand, a stirring wand, and a combination flipping and stirring wand.

20. The cooking appliance of claim 18, wherein the user interface includes a heating user interface disposed on an exterior surface of the cooker housing in electrical communication with the heating element, and a mixing user interface disposed on an exterior surface of the stirring tower and in electrical communication with the drive system.

* * * * *